US012739886B2

(12) United States Patent
Rastegardoost et al.

(10) Patent No.: US 12,739,886 B2
(45) Date of Patent: Sep. 15, 2026

(54) RANDOM ACCESS IDENTIFIER FOR REDUCED CAPABILITY DEVICE

(71) Applicant: Ofinno, LLC, Reston, VA (US)

(72) Inventors: Nazanin Rastegardoost, McLean, VA (US); Esmael Hejazi Dinan, McLean, VA (US); Yunjung Yi, Vienna, VA (US); Hua Zhou, Vienna, VA (US); Ali Cagatay Cirik, Chantilly, VA (US); Kai Xu, Great Falls, VA (US); Jonghyun Park, Syosset, NY (US)

(73) Assignee: Ofinno, LLC, Reston, VA (US)

( * ) Notice: Subject to any disclaimer, the term of this patent is extended or adjusted under 35 U.S.C. 154(b) by 350 days.

(21) Appl. No.: 18/210,930

(22) Filed: Jun. 16, 2023

(65) Prior Publication Data

US 2024/0032103 A1 Jan. 25, 2024

Related U.S. Application Data

(63) Continuation of application No. PCT/US2021/064449, filed on Dec. 20, 2021.

(Continued)

(51) Int. Cl.

*H04W 74/0833* (2024.01)
*H04W 74/0836* (2024.01)
*H04W 74/0838* (2024.01)

(52) U.S. Cl.

CPC .... *H04W 74/0833* (2013.01); *H04W 74/0836* (2024.01); *H04W 74/0838* (2024.01)

(58) Field of Classification Search

CPC ......... H04W 74/0833; H04W 74/0836; H04W 74/0838; H04W 74/006

See application file for complete search history.

(56) References Cited

U.S. PATENT DOCUMENTS 10,631,340 B2 4/2020 Shao et al.
11,310,836 B2 * 4/2022 MolavianJazi ... H04W 74/0833

(Continued)

FOREIGN PATENT DOCUMENTS

WO 2012/177060 A2 12/2012
WO 2018/175809 A1 9/2018
WO WO-2020216552 A1 * 10/2020 ............ H04W 72/23

OTHER PUBLICATIONS

3GPP TS 36.321 V16.0.0 (Mar. 2020); Technical Specification; 3rd Generation Partnership Project; Technical Specification Group Radio Access Network; Evolved Universal Terrestrial Radio Access (E-UTRA); Medium Access Control (MAC) protocol specification; (Release 16).

(Continued)

*Primary Examiner* — Cheikh T Ndiaye
(74) *Attorney, Agent, or Firm* — Brett K. Gardner; Kavon Nasabzadeh; Jacob L. Mangan

(57) ABSTRACT

A wireless device receives one or more radio resource control (RRC) messages comprising random access (RA) configuration parameters of a bandwidth part (BWP) of a cell, indicating one or more random access channel occasions (ROs) multiplexed in frequency domain and a physical resource block (PRB) offset with respect to a first PRB of the BWP. The wireless device may further determine frequency resource indexes of the one or more ROs, in an increasing order starting from a first frequency resource index of the first RO. The wireless device may transmit a preamble via a second RO selected from the one or more ROs and determine a frequency resource index of the second RO based on the frequency resource indexes determined based on the frequency index offset applied to the first RO. The wireless device may receive, based on an RA identifier, a response to the preamble.

18 Claims, 31 Drawing Sheets

Related U.S. Application Data

(60) Provisional application No. 63/127,201, filed on Dec. 18, 2020.

(56) References Cited

U.S. PATENT DOCUMENTS

| | | | | |
|---|---|---|---|---|
| 2019/0141742 | A1 | 5/2019 | Zhou et al. | |
| 2021/0058971 | A1* | 2/2021 | MolavianJazi | H04L 1/189 |
| 2022/0015019 | A1* | 1/2022 | Park | H04W 72/0453 |

OTHER PUBLICATIONS

3GPP TS 36.331 V16.0.0 (Mar. 2020); Technical Specification; 3rd Generation Partnership Project; Technical Specification Group Radio Access Network; Evolved Universal Terrestrial Radio Access (E-UTRA); Radio Resource Control (RRC); Protocol specification; (Release 16).

3GPP TS 38.211 V16.3.0 (Sep. 2020); Technical Specification; 3rd Generation Partnership Project; Technical Specification Group Radio Access Network; NR; Physical channels and modulation; (Release 16).

3GPP TS 38.212 V16.3.0 (Sep. 2020); Technical Specification; 3rd Generation Partnership Project; Technical Specification Group Radio Access Network; NR; Multiplexing and channel coding; (Release 16).

3GPP TS 38.213 V16.3.0 (Sep. 2020); Technical Specification; 3rd Generation Partnership Project; Technical Specification Group Radio Access Network; NR; Physical layer procedures for control; (Release 16).

3GPP TS 38.214 V16.3.0 (Sep. 2020); Technical Specification; 3rd Generation Partnership Project; Technical Specification Group Radio Access Network; NR; Physical layer procedures for data; (Release 16).

3GPP TS 38.321 V16.2.1 (Sep. 2020); Technical Specification; 3rd Generation Partnership Project; Technical Specification Group Radio Access Network; NR; Medium Access Control (MAC) protocol specification; (Release 16).

3GPP TS 38.331 V16.2.0 (Sep. 2020); Technical Specification; 3rd Generation Partnership Project; Technical Specification Group Radio Access Network; NR; Radio Resource Control (RRC) protocol specification; (Release 16).

R1-2007533; 3GPP TSG-RAN WG1 Meeting #103-e; e-Meeting, Oct. 26-Nov. 13, 2020; Agenda Item: 8.6.5; Source: Ericsson; Title: UE identification and access restriction for RedCap; Document for: Discussion, Decision.

R1-2007672; 3GPP TSG RAN WG1 #103-e; e-Meeting, Oct. 26-Nov. 13, 2020; Source: vivo, Guangdong Genius; Title: RRM relaxation for Reduced Capability NR devices; Agenda Item: 8.6.5; Document for: Discussion and Decision.

R1-2007951; 3GPP TSG RAN WG1 Meeting #103-E; e-Meeting, Oct. 26-Nov. 13, 2020; Agenda Item: 8.6.5; Source: Intel Corporation; Title: On identification of and access control for RedCap UEs; Document for: Discussion/Decision.

R1-2008052; 3GPP TSG RAN WG1 Meeting #103-e; Online, Oct. 26-Nov. 13, 2020; Agenda Item: 8.6.5; Source: LG Electronics Inc.; Title: Other aspects for reduced capability NR devices; Document for: Discussion and decision.

R1-2008072; 3GPP TSG-RAN WG1 Meeting #103-e; e-Meeting, Oct. 26-Nov. 13, 2020; Agenda item: 8.6.5; Title: Initial access for Redcap UEs; Source: Nokia, Nokia Shanghai Bell; Document for: Discussion and Decision.

R1-2008174; 3GPP TSG RAN WG1 #103-e; e-Meeting, Oct. 26-Nov. 13, 2020; Agenda Item: 8.6.5; Source: Samsung; Title: UE identification and access barring; Document for: Discussion and decision.

R1-2008183; 3GPP TSG RAN WG1 #103-e; e-Meeting, Oct. 26-Nov. 13, 2020; Agenda Item: 8.8.2.3; Source: Samsung; Title: Coverage enhancement for channels other than PUSCH and PUCCH ; Document for: Discussion.

R1-2008264; 3GPP TSG RAN WG1 #103-e; e-Meeting, Oct. 26-Nov. 13, 2020; Source: OPPO; Title: Other considerations for reduced UE capability; Agenda Item: 8.6.5; Document for: Discussion.

R1-2008291; 3GPP TSG RAN WG1 Meeting #103-e; e-Meeting, , Oct. 26-Nov. 6, 2020; Source: Panasonic; Title: On RedCap device identification; Agenda item: 8.6.5; Document for: Internal Discussion.

R1-2008329; 3GPP TSG RAN WG1 Meeting #103-e; E-meeting, Oct. 26-Nov. 13, 2020; Agenda Item: 8.6.5; Source: Huawei, HiSilicon; Title: Other aspects for reduced capability devices; Document for: Discussion and Decision.

R1-2008556; 3GPP TSG RAN WG1 #103-e; e-Meeting, Oct. 26-Nov. 13, 2020; Source: NTT Docomo, Inc.; Title: Discussion on UE identification for RedCap; Agenda Item: 8.6.5; Document for: Discussion and Decision.

R1-2008585; 3GPP TSG RAN WG1 #103-e; e-Meeting, Oct. 26-Nov. 13, 2020; Agenda Item: 8.6.5; Source: ASUSTeK; Title: Discussion on identification of reduced capability UE; Document for: Discussion and Decision.

R1-2008688; 3GPP TSG RAN WG1 #103-e; e-Meeting, Oct. 26-Nov. 13, 2020; Agenda Item: 8.6.5; Source: InterDigital, Inc.; Title: Device identification and access restriction for RedCap; Document for: Discussion.

R1-2009317; 3GPP TSG RAN WG1 Meeting #103-E; e-Meeting, Oct. 26-Nov. 13, 2020; Source: Moderator (Intel Corporation); Title: Moderator summary on RedCap—Others; Agenda item: 8.6. 5; Document for: Discussion and Decision.

R1-2009322; 3GPP TSG RAN WG1 #103-e; e-Meeting, Oct. 26-Nov. 13, 2020; Agenda item: 8.8.2.3; Title: Feature lead summary on coverage enhancement for channels other than PUSCH and PUCCH; Source: Moderator (ZTE Corporation); Document for: Discussion and Decision.

R1-2009404; 3GPP TSG RAN WG1 Meeting #103-E; e-Meeting, Oct. 26-Nov. 13, 2020; Source: Moderator (Intel Corporation); Title: Moderator summary #2 on RedCap—Others; Agenda item: 8.6.5; Document for: Discussion and Decision.

R1-2009608; 3GPP TSG RAN WG1 Meeting #103-E; e-Meeting, Oct. 26-Nov. 13, 2020; Source: Moderator (Intel Corporation); Title: Moderator summary #3 on RedCap—Others; Agenda item: 8.6.5; Document for: Discussion and Decision.

R1-2009735; 3GPP TSG RAN WG1 Meeting #103-E; e-Meeting, Oct. 26-Nov. 13, 2020; Source: Moderator (Intel Corporation); Title: Moderator summary #4 on RedCap—Others; Agenda item: 8.6.5; Document for: Discussion and Decision.

R1-2009771; 3GPP TSG RAN WG1 Meeting #103-E; e-Meeting, Oct. 26-Nov. 13, 2020; Source: Moderator (Intel Corporation); Title: Moderator summary #5 on RedCap—Others; Agenda item: 8.6.5; Document for: Discussion and Decision.

R1-2009780; 3GPP TSG RAN WG1 Meeting #103-E; e-Meeting, Oct. 26-Nov. 13, 2020; Source: Moderator (Intel Corporation); Title: Moderator summary #6 on RedCap—Others; Agenda item: 8.6.5; Document for: Discussion and Decision.

R2-1915607; 3GPP TSG-RAN WG2 #108; Reno, Nevada, USA, Nov. 18-22, 2019; Agenda Item: 6.13.2; Source: Ericsson; Title: RNTI design for 2-step RA; Document for: Discussion, Decision.

3GPP TSG RAN WG1 Meeting #103-e; e-Meeting, Oct. 26-Nov. 13, 2020; Title: RAN1 Chairman's Notes.

R2-2010702; 3GPP TSG-RAN WG2 Meeting #112 electronic; Online, Nov. 2-13, 2020; Agenda item: 10.2; Source: Vice Chairman (ZTE Corporation); Title: Report from Break-out session on R16 eMIMO, CLI, PRN, RACS and R17 NTN and Redcap; Document for: Approval.

International Search Report and Written Opinion of the International Searching authority mailed Apr. 19, 2022, in International Application No. PCT/US2021/064449.

R1-1908967; 3GPP TSG RAN WG 1 Meeting #98; Prague, Czech Republic, Aug. 26-Aug. 30, 2019; Source: Spreadtrum communications; Title: Discussion on 2-step RACH procedure; Agenda item: 7.2.1.2; Document for: Discussion and Decision.

* cited by examiner

100
Wireless Device 106
RAN 104
CN 102
DN(s)

150
UE 156A
Uu
gNB 160A
Xn
ng-eNB 162A
NG
NG
Xn
Xn
ng-eNB 162B
NG
NG
Xn
UE 156B
Uu
gNB 160B
AMF 158A
UPF 158B
AMF/UPF 158
DN(s)
5G-CN 152
UEs 156
NG-RAN 154

Logical Channels
Transport Channels
Physical Channels
Physical Signals

PCCH
BCCH
CCCH
DCCH
DTCH
PCH
BCH
DL-SCH
PBCH
PDSCH
DCI
PDCCH
PSS/SSS
CSI-RS
DM-RS
PT-RS
Downlink CCCH
DCCH
DTCH
UL-SCH
RACH
UCI
PUSCH
PUCCH
PRACH
DM-RS
PT-RS
SRS
Uplink 1 Frame (10 ms)

0 1 2 3 4 5 6 7 8 9

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

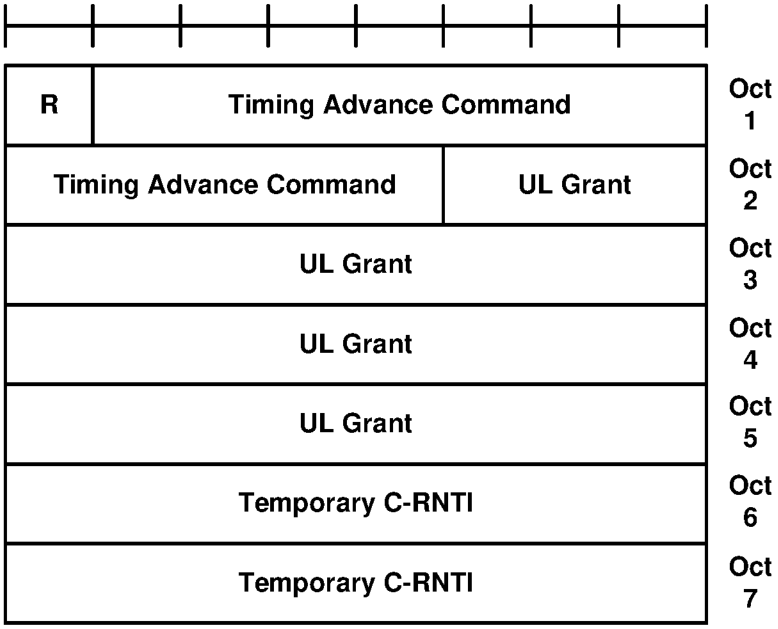

FIG. 20A

| RAR grant field | Number of bits |
|---|---|
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

FIG. 20B

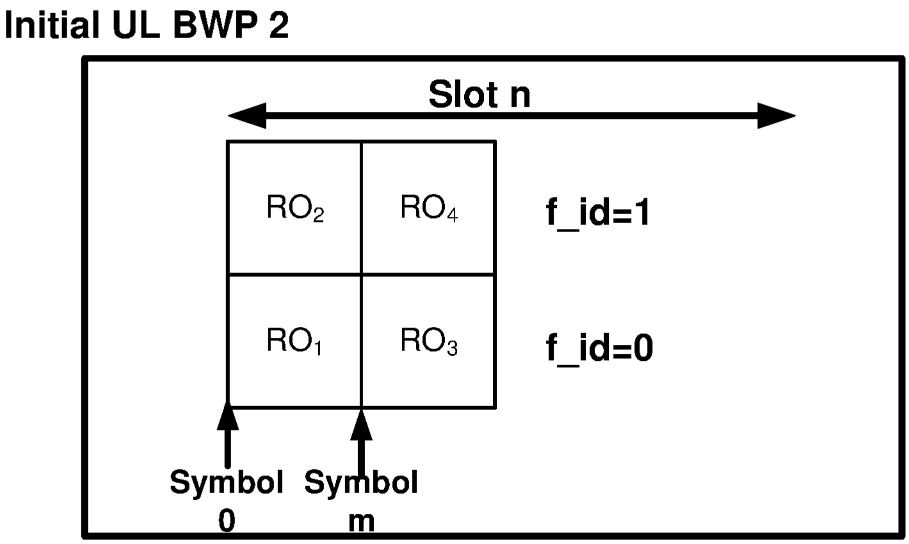
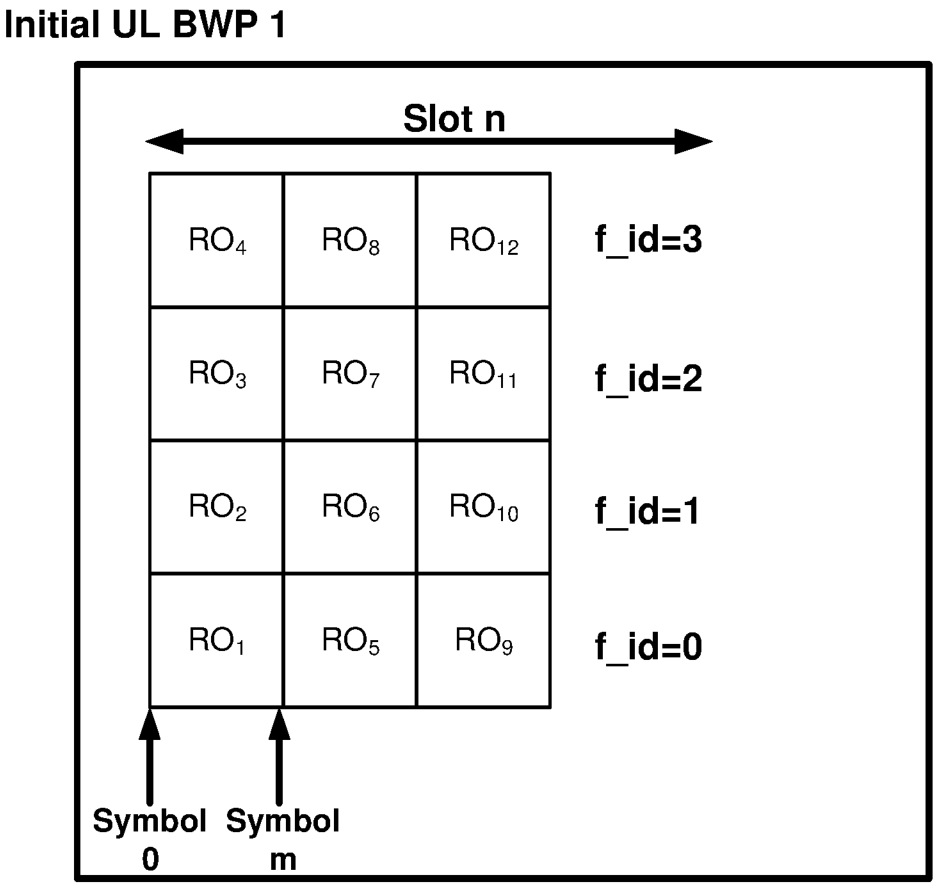
FIG. 25

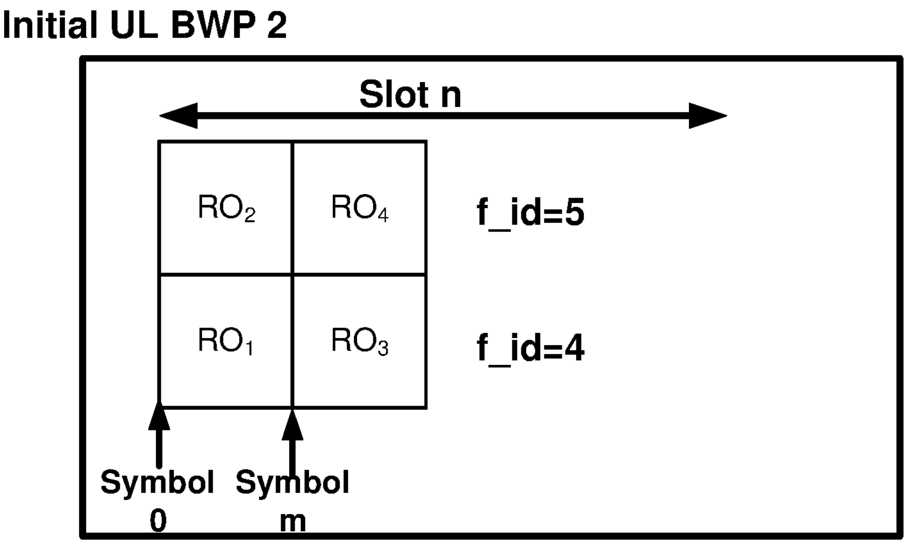
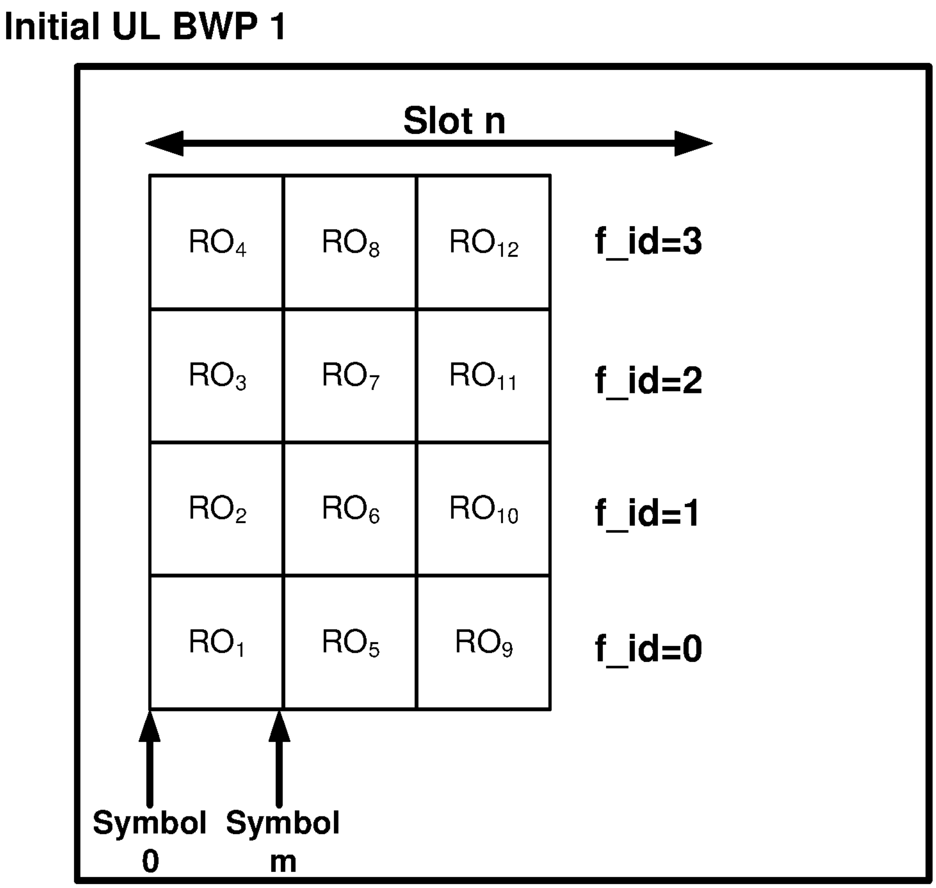
FIG. 27

RANDOM ACCESS IDENTIFIER FOR REDUCED CAPABILITY DEVICE

CROSS-REFERENCE TO RELATED APPLICATIONS

This application is a continuation of International Application No. PCT/US2021/064449, filed Dec. 20, 2021, which claims the benefit of U.S. Provisional Application No. 63/127,201, filed Dec. 18, 2020, which is herein incorporated by reference in its entirety.

BRIEF DESCRIPTION OF THE DRAWINGS

Examples of several of the various embodiments of the present disclosure are described herein with reference to the drawings.

FIG. 20A shows an example of a MAC RAR, according to some embodiments.

FIG. 20B shows an example of random access response (RAR) uplink grant contents, according to some embodiments.

FIG. 25 shows an example of RACH occasions in two initial UL BWPs, according to some embodiments.

FIG. 27 shows an example of indexing frequency resources of RACH, according to some embodiments.

DETAILED DESCRIPTION

Figure 1A:
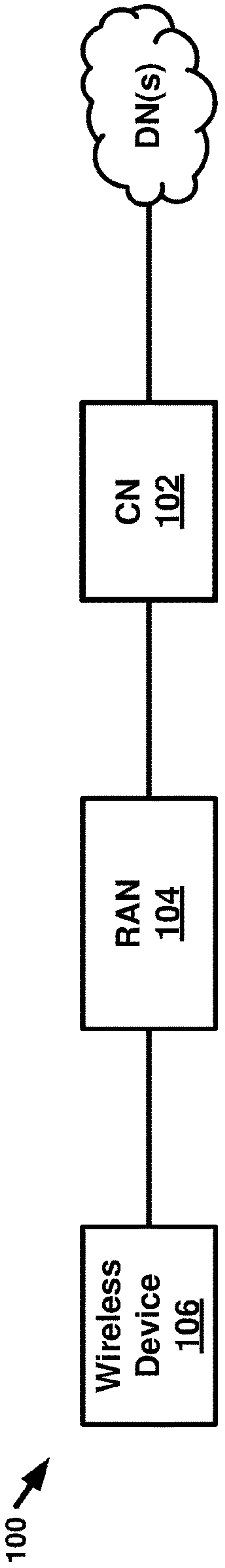
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module. FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
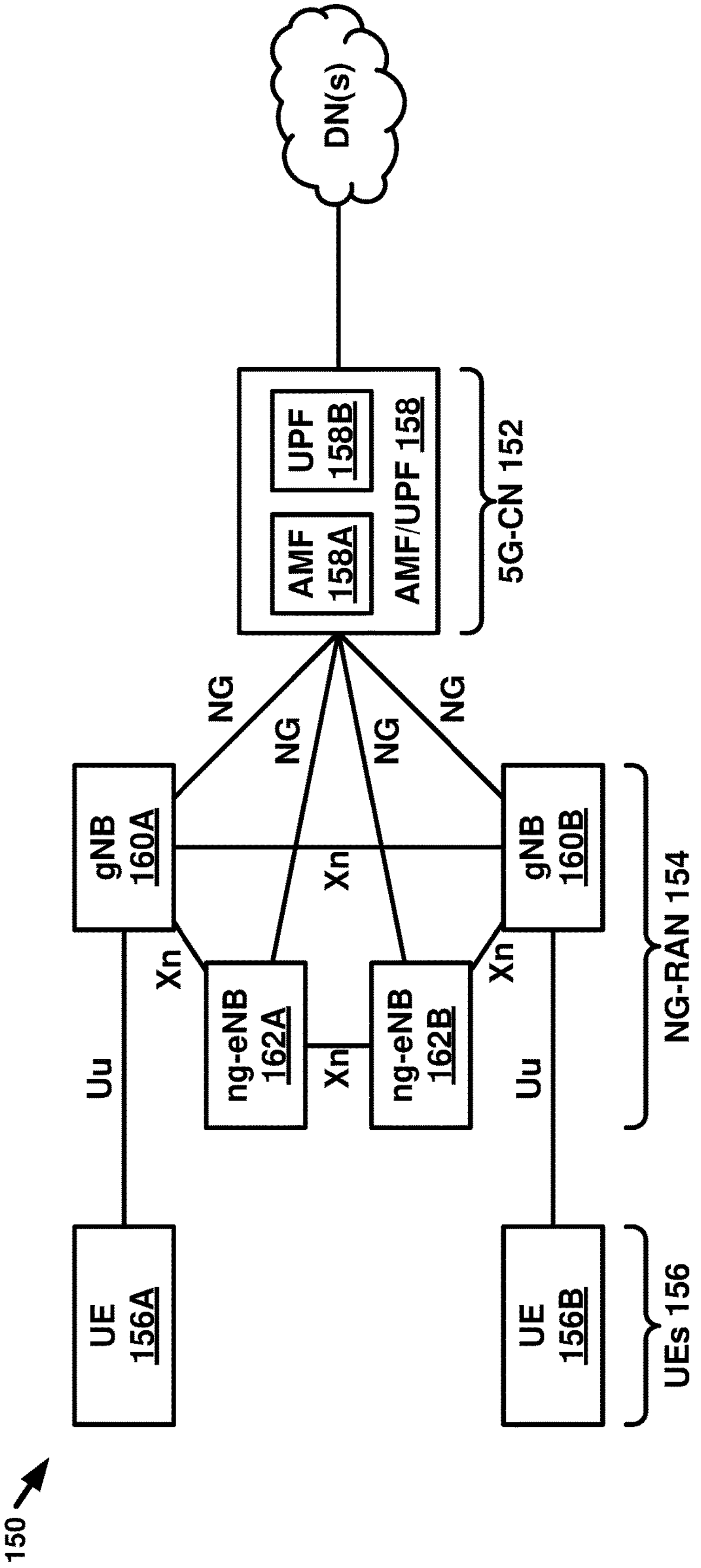

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes. As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
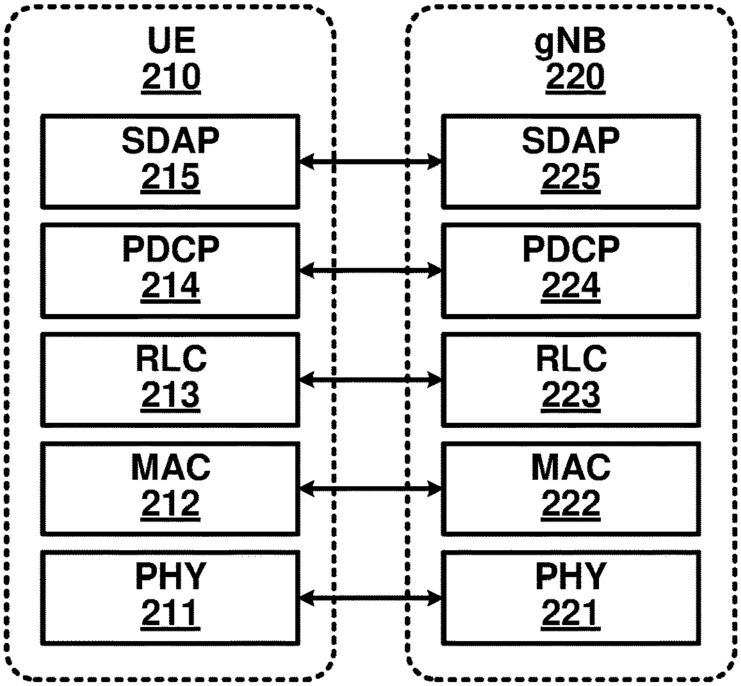
FIG. 2A and FIG. 2B respectively illustrate a New Radio (NR) user plane and control plane protocol stack.
Figure 2B:
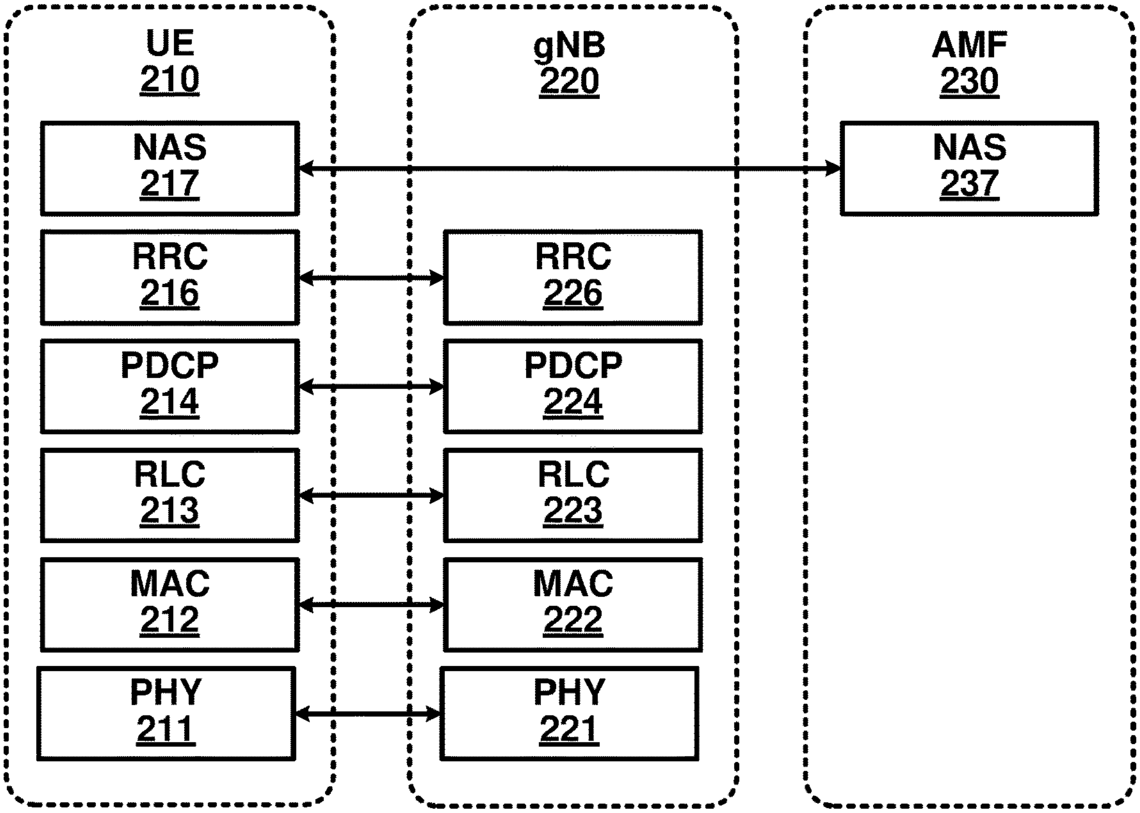

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
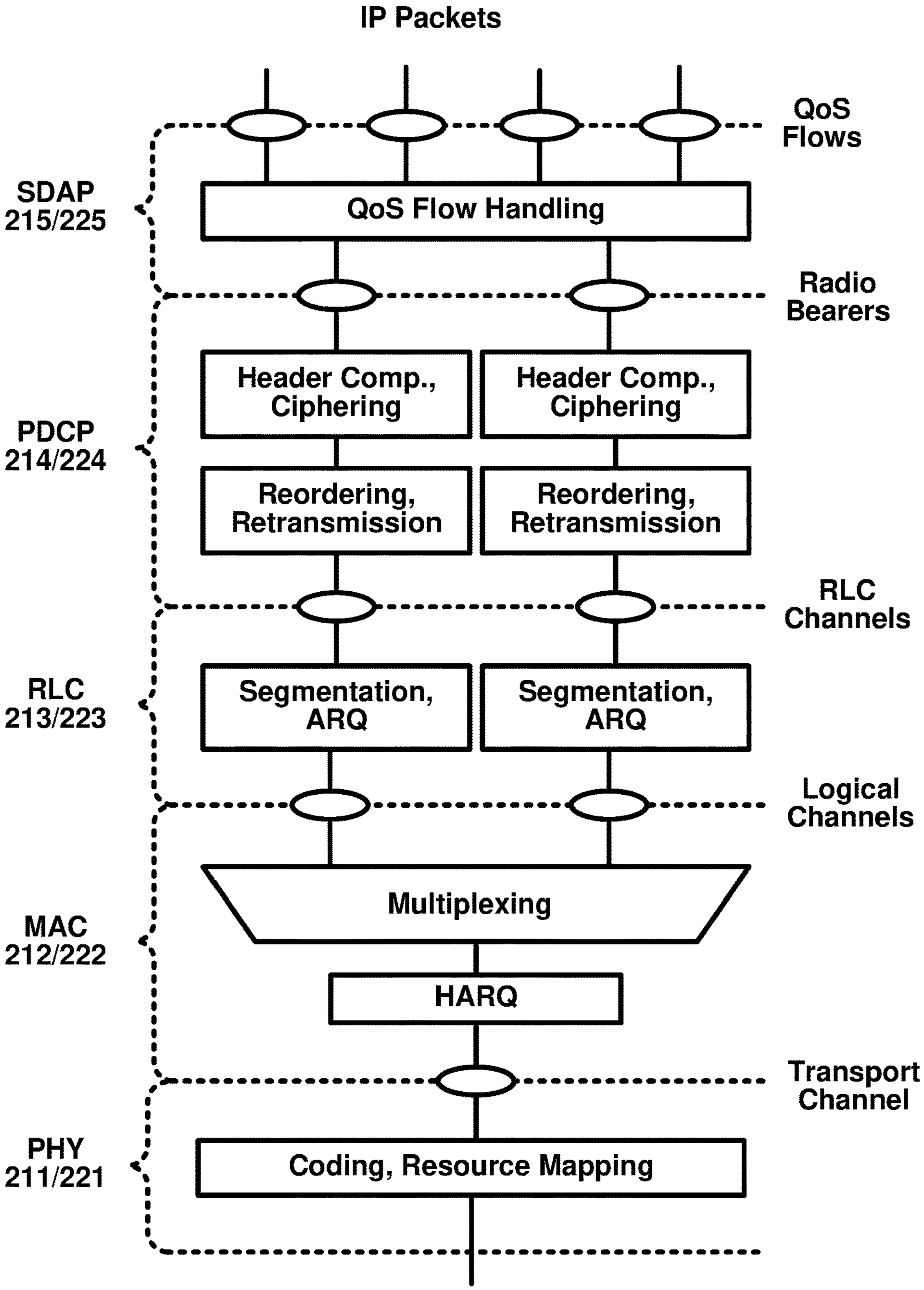
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
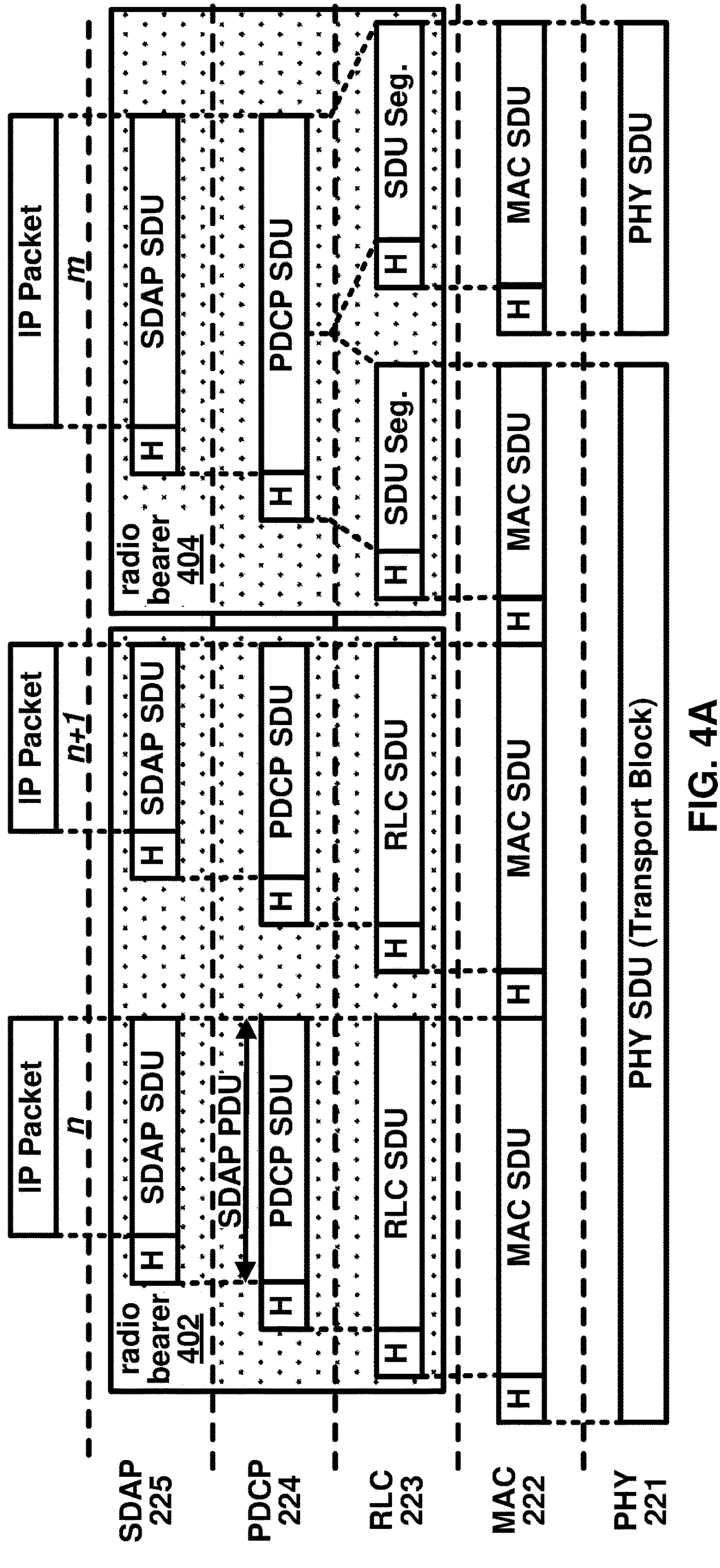
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
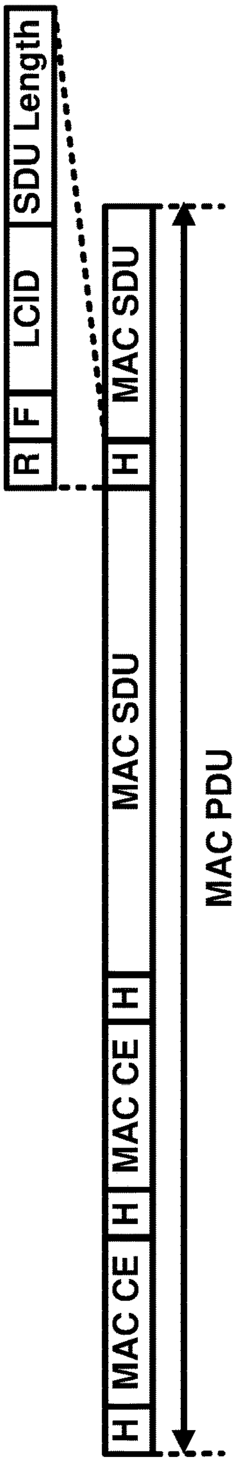
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
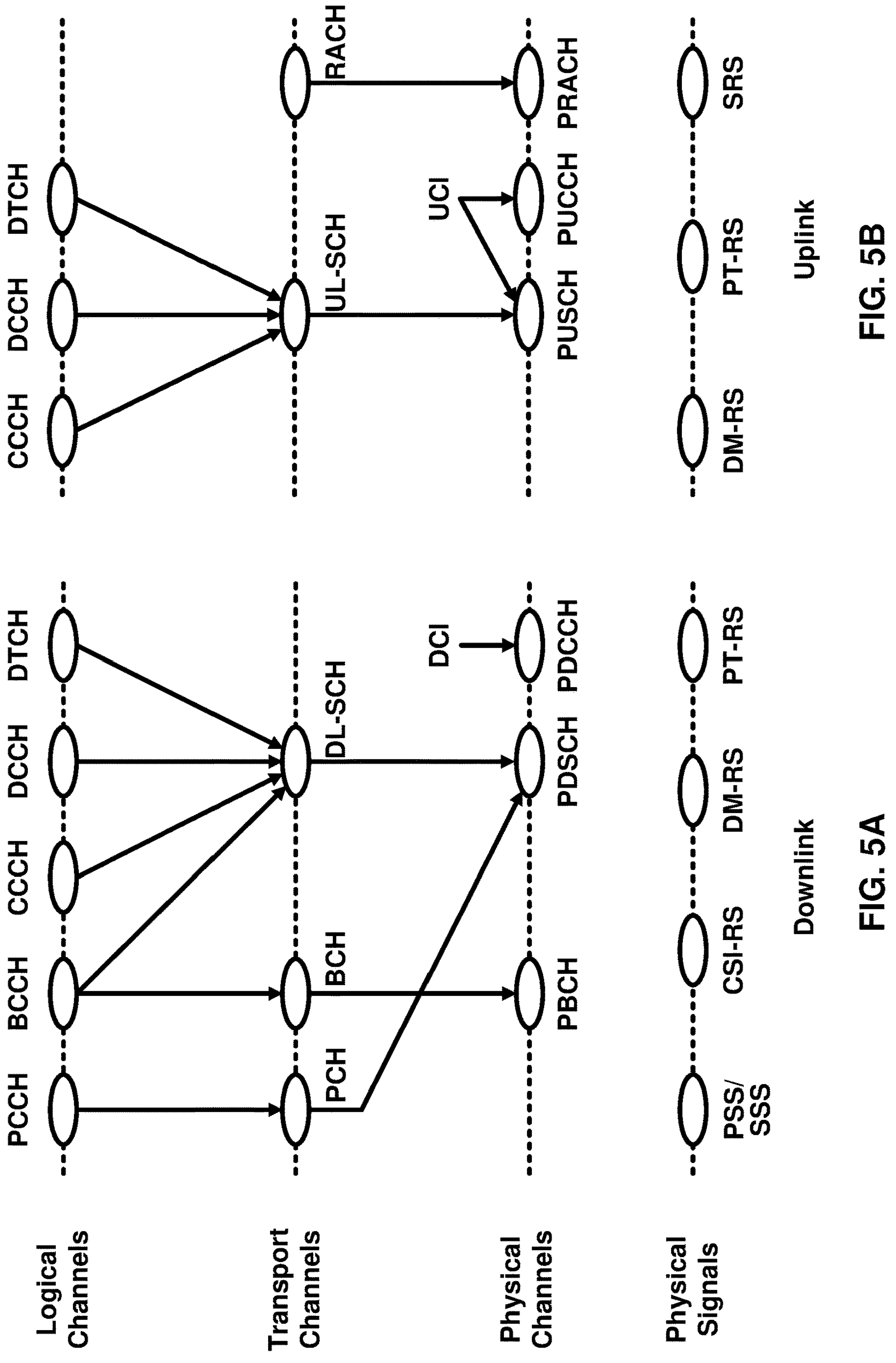
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries.

The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
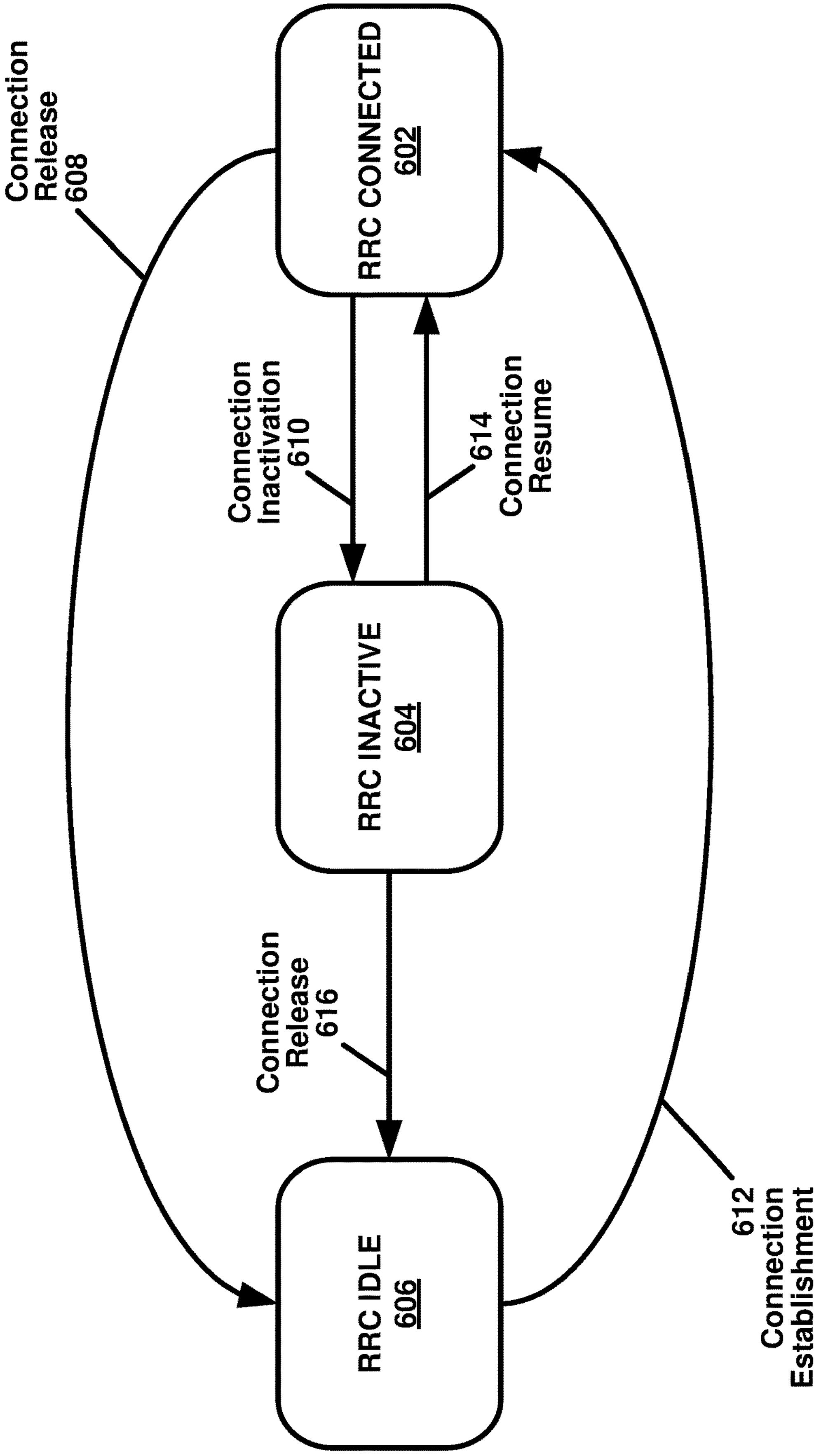
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
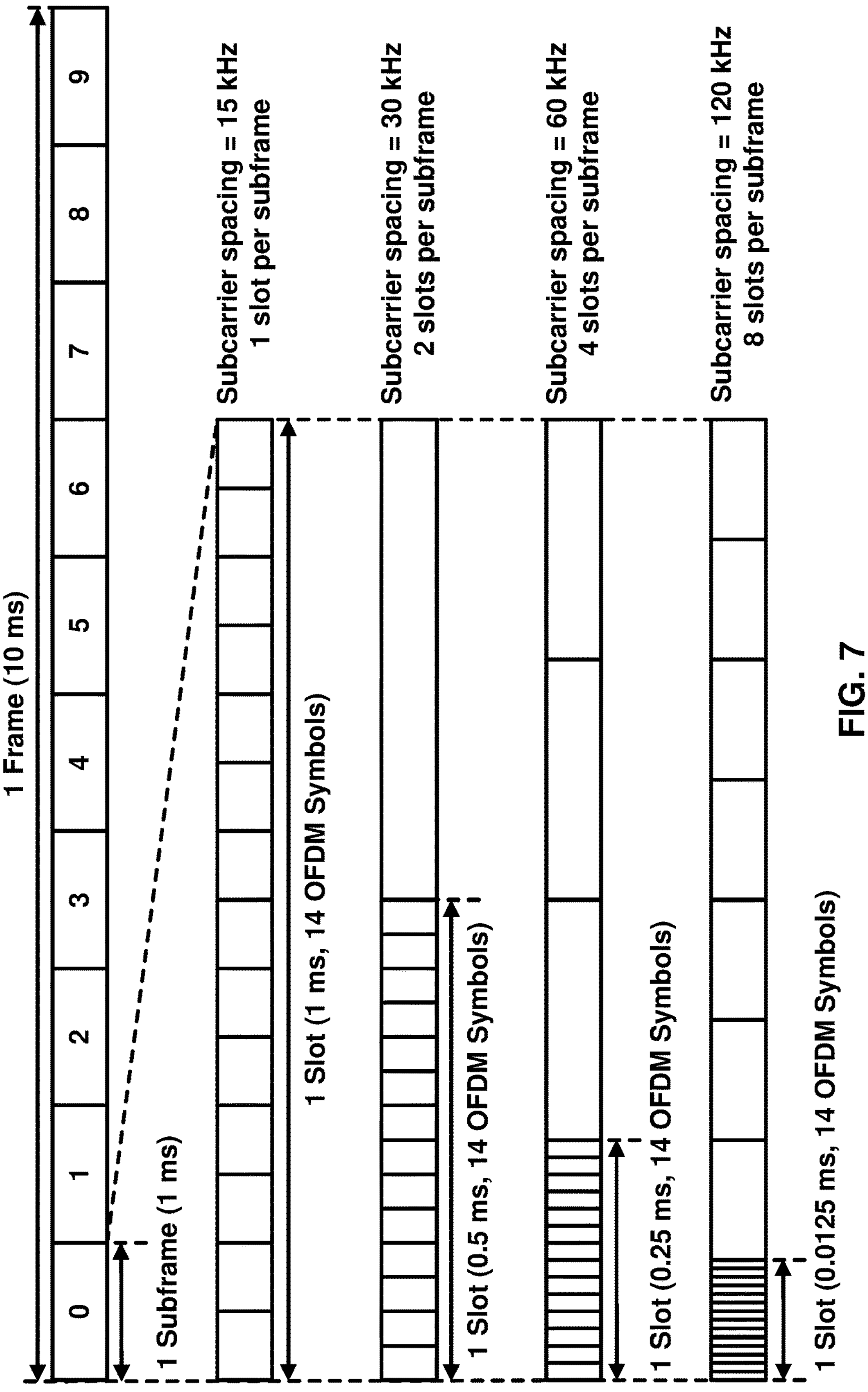
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
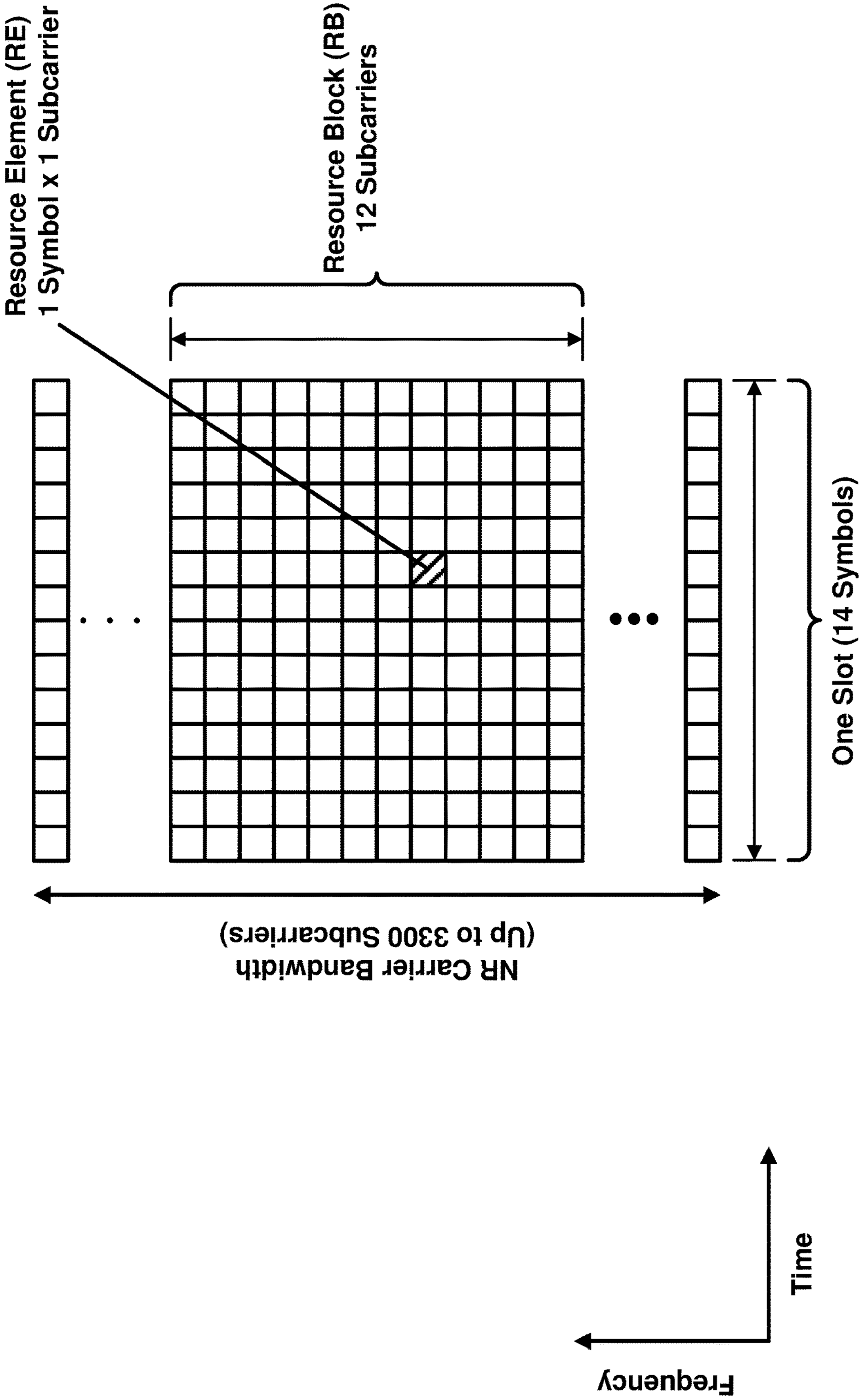
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
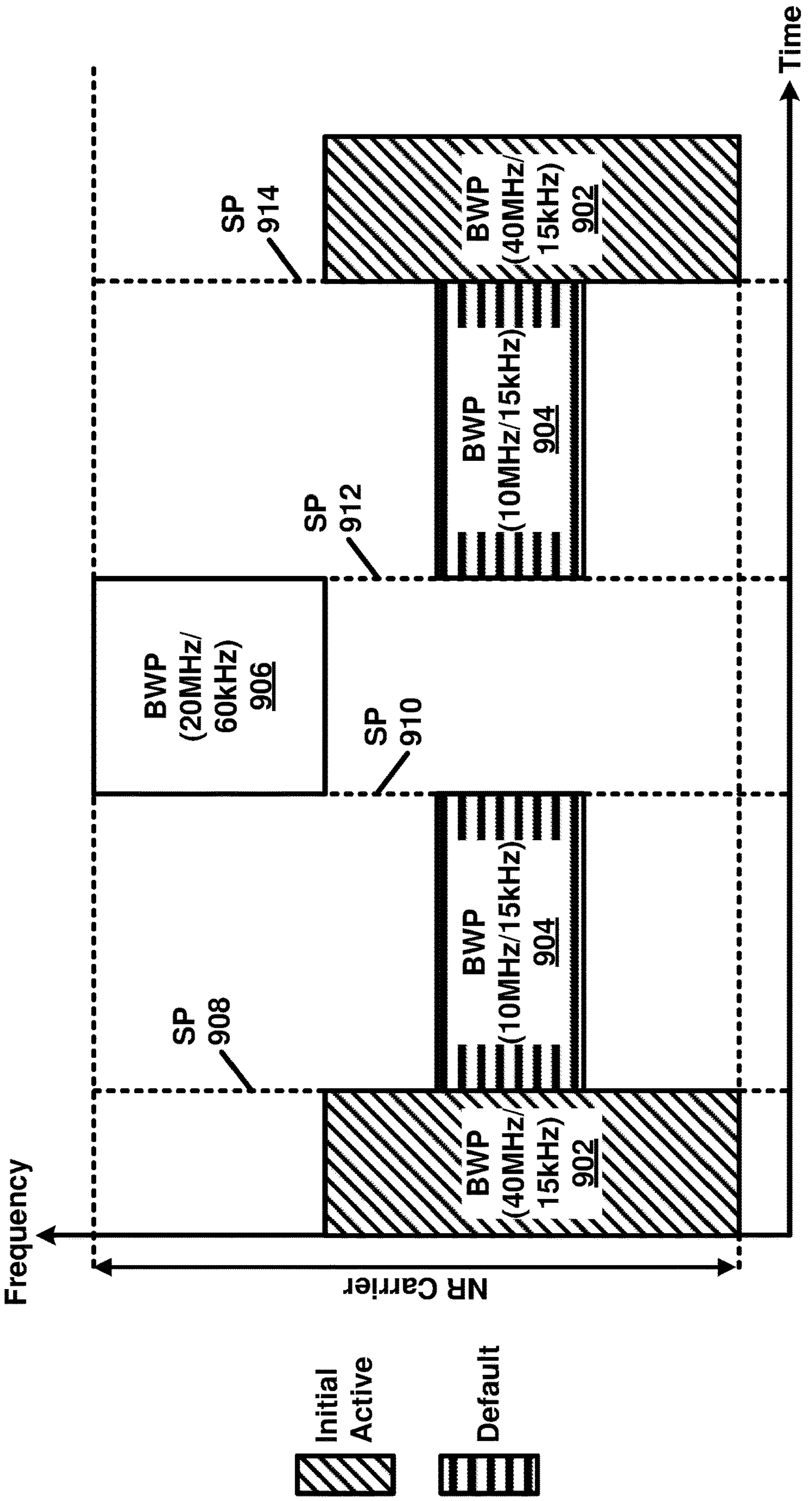
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
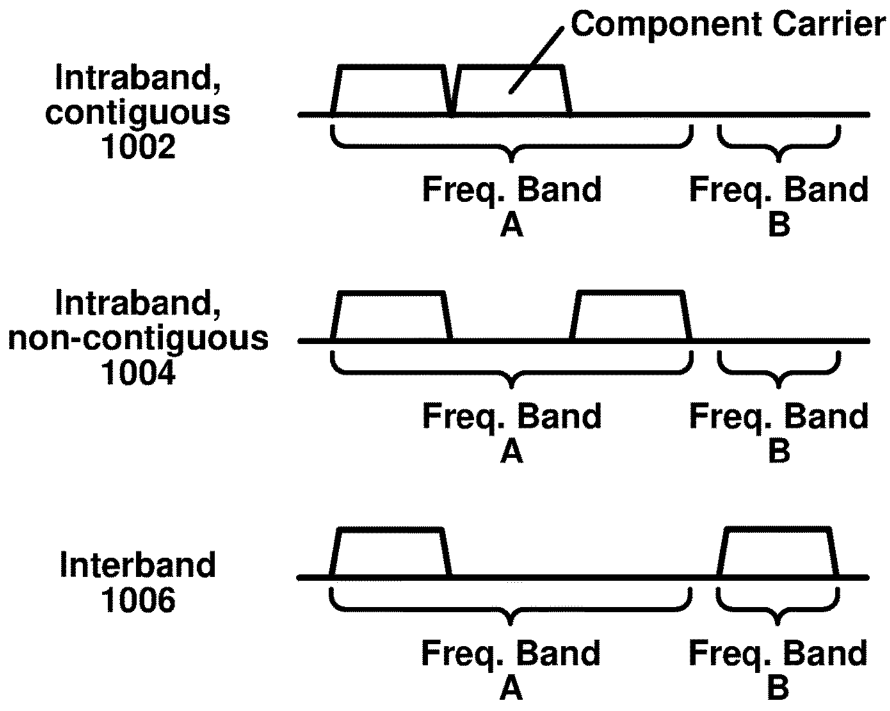
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
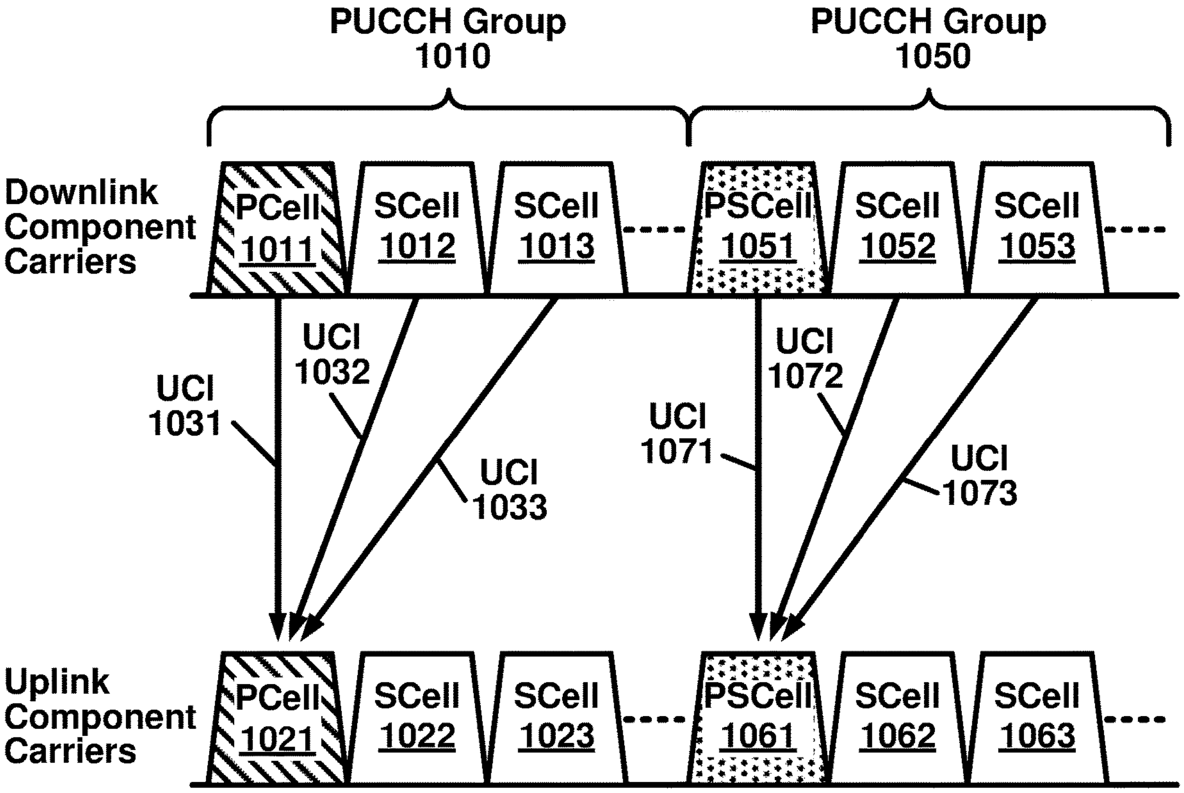
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
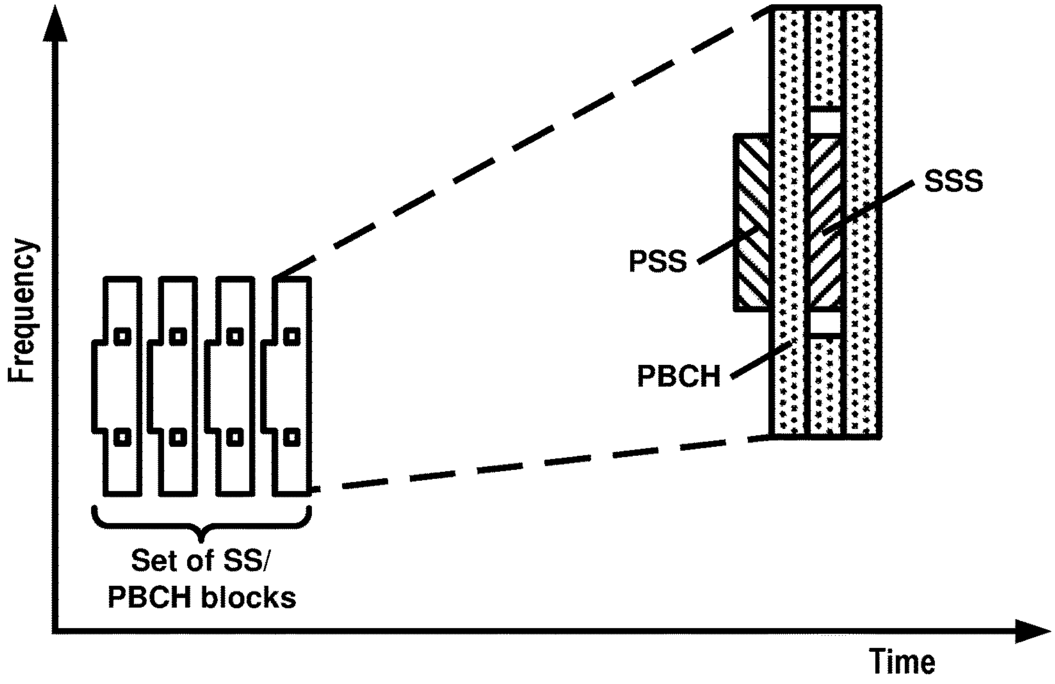
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling);

or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
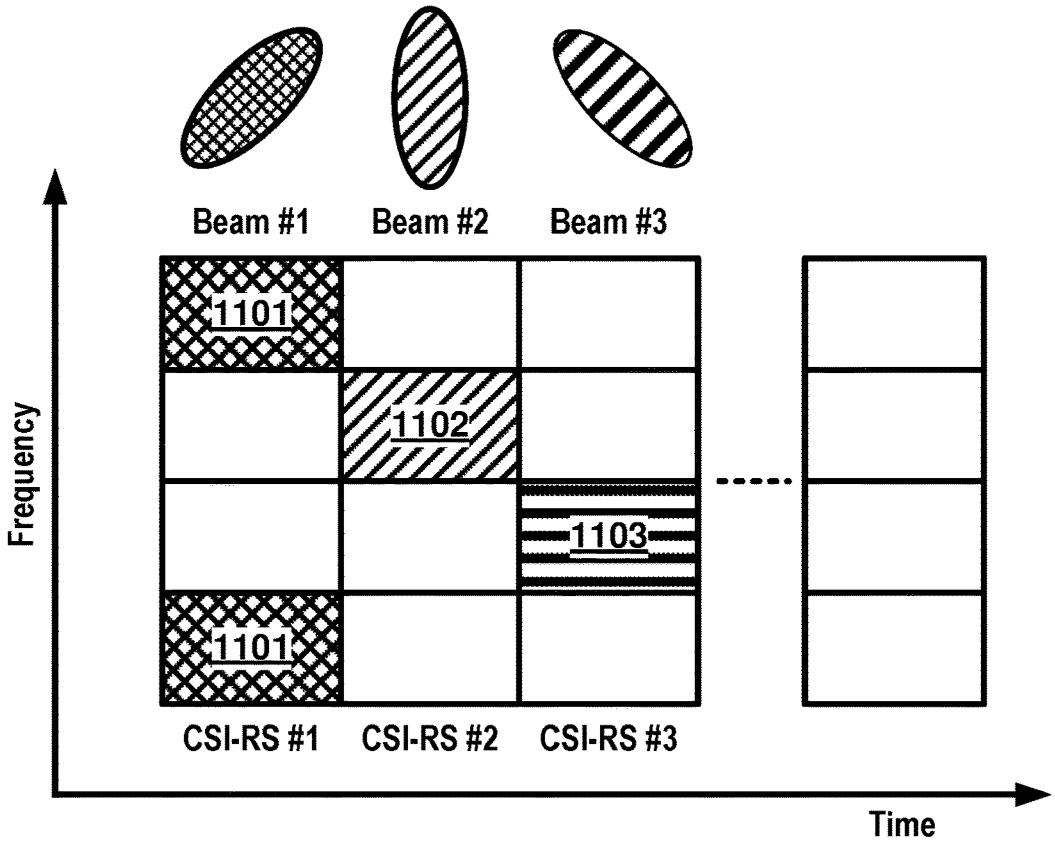
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
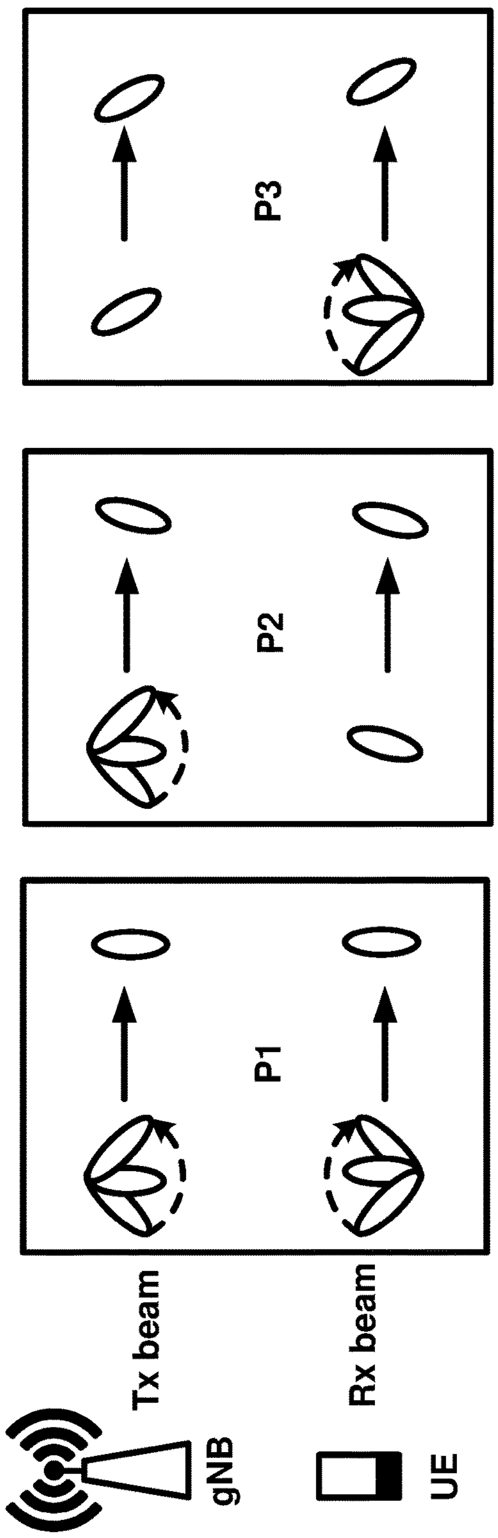
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
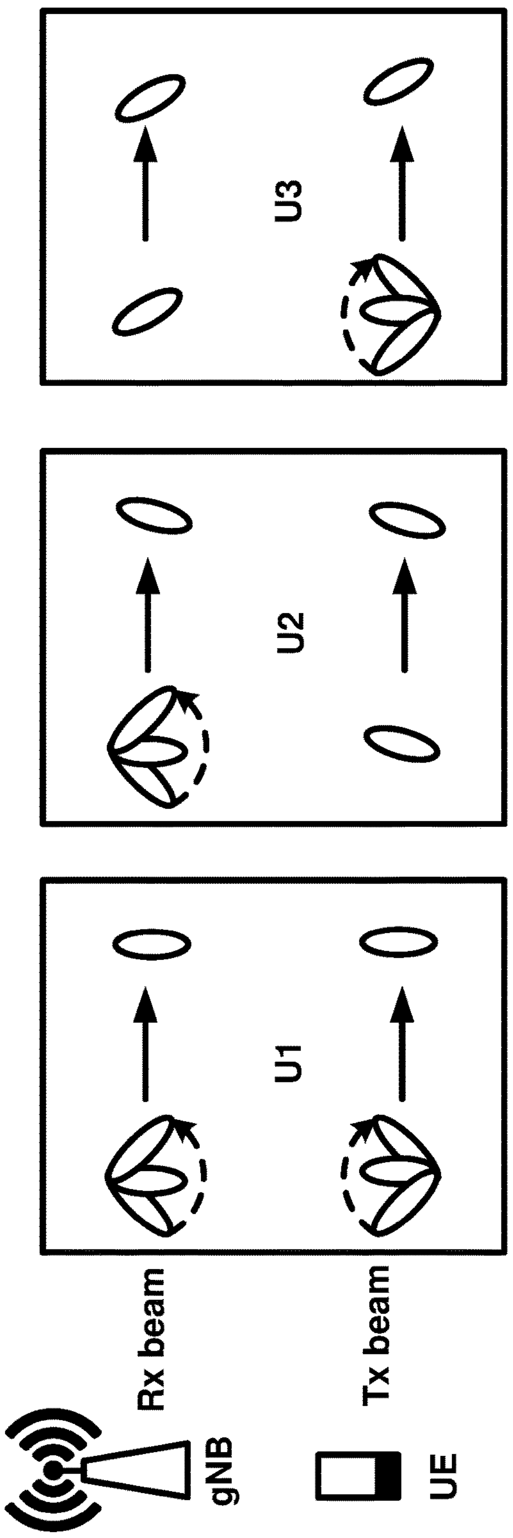

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
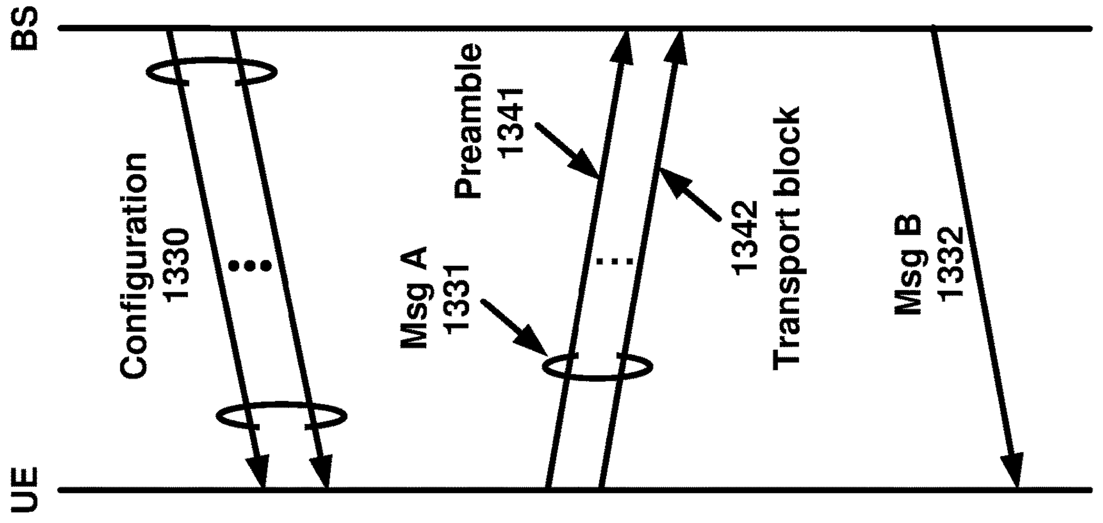
FIG. 13A, FIG. 13B, and FIG. 13C respectively illustrate a four-step contention-based random access procedure, a two-step contention-free random access procedure, and another two-step random access procedure.
Figure 13B:
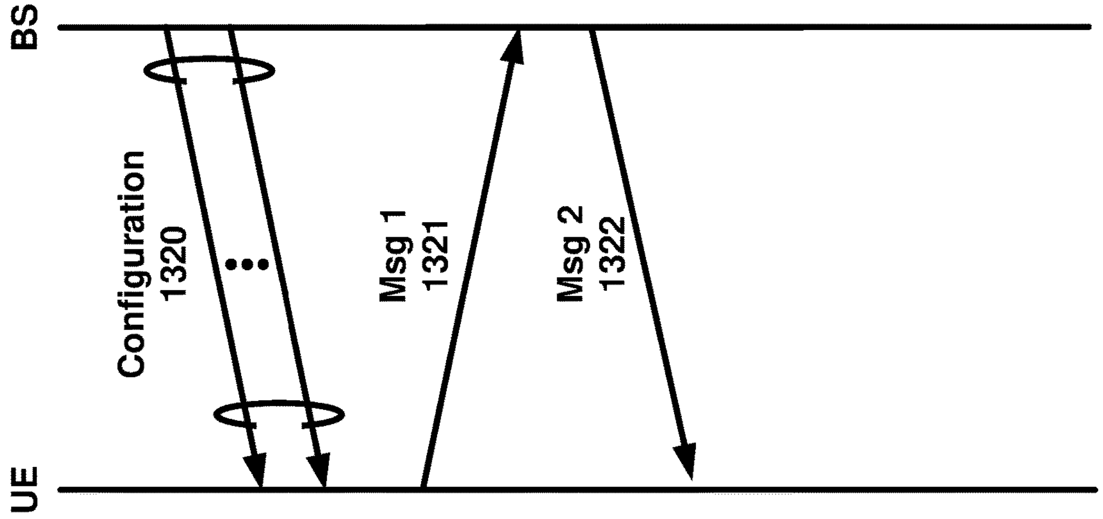
Figure 13A:
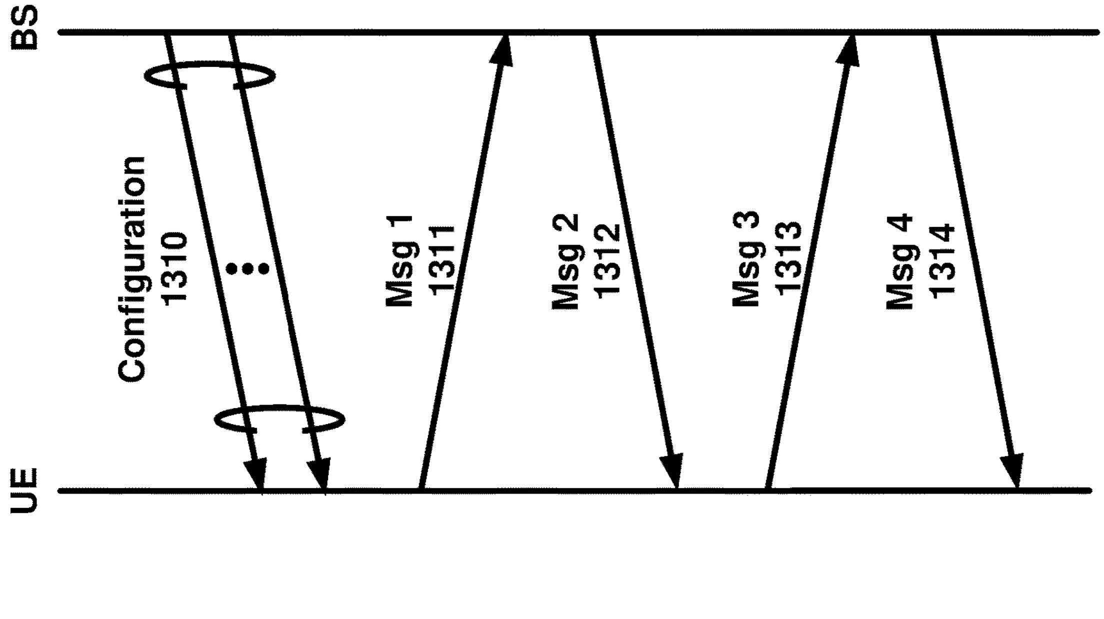

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
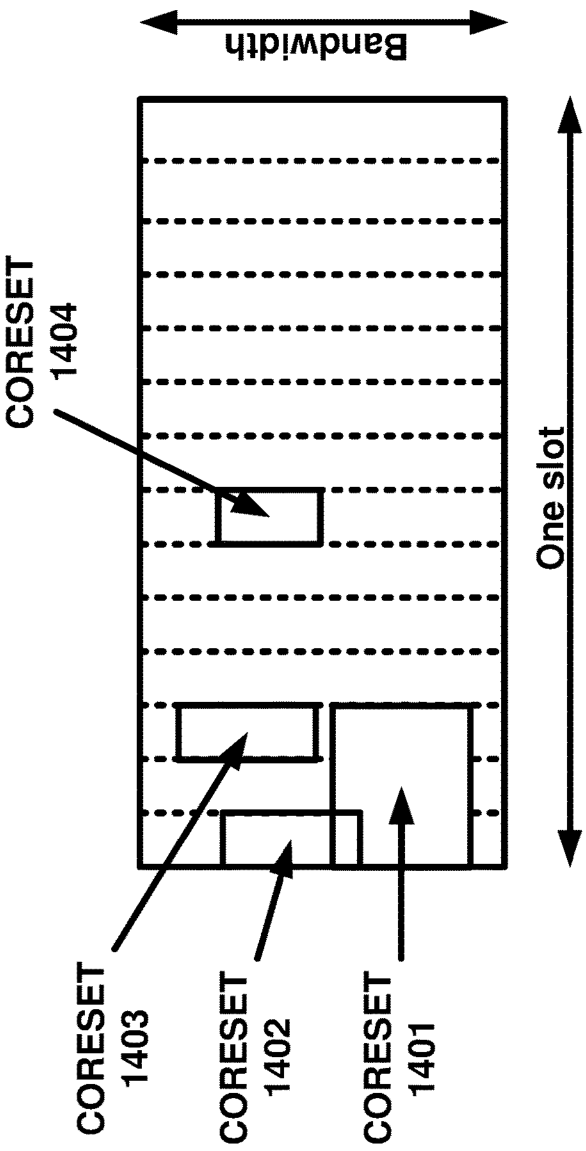
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
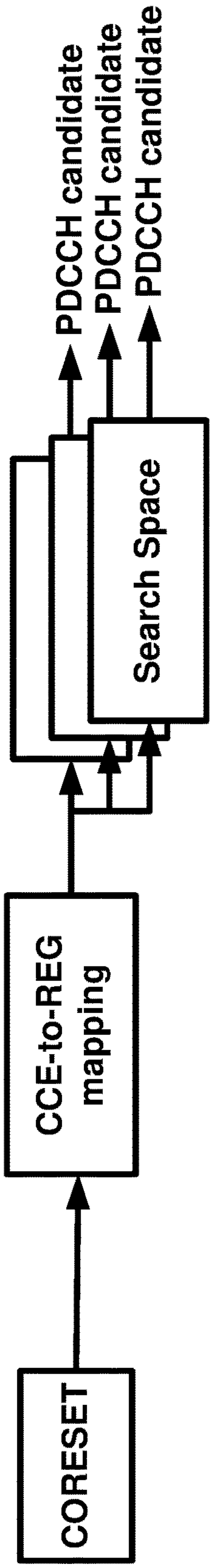
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
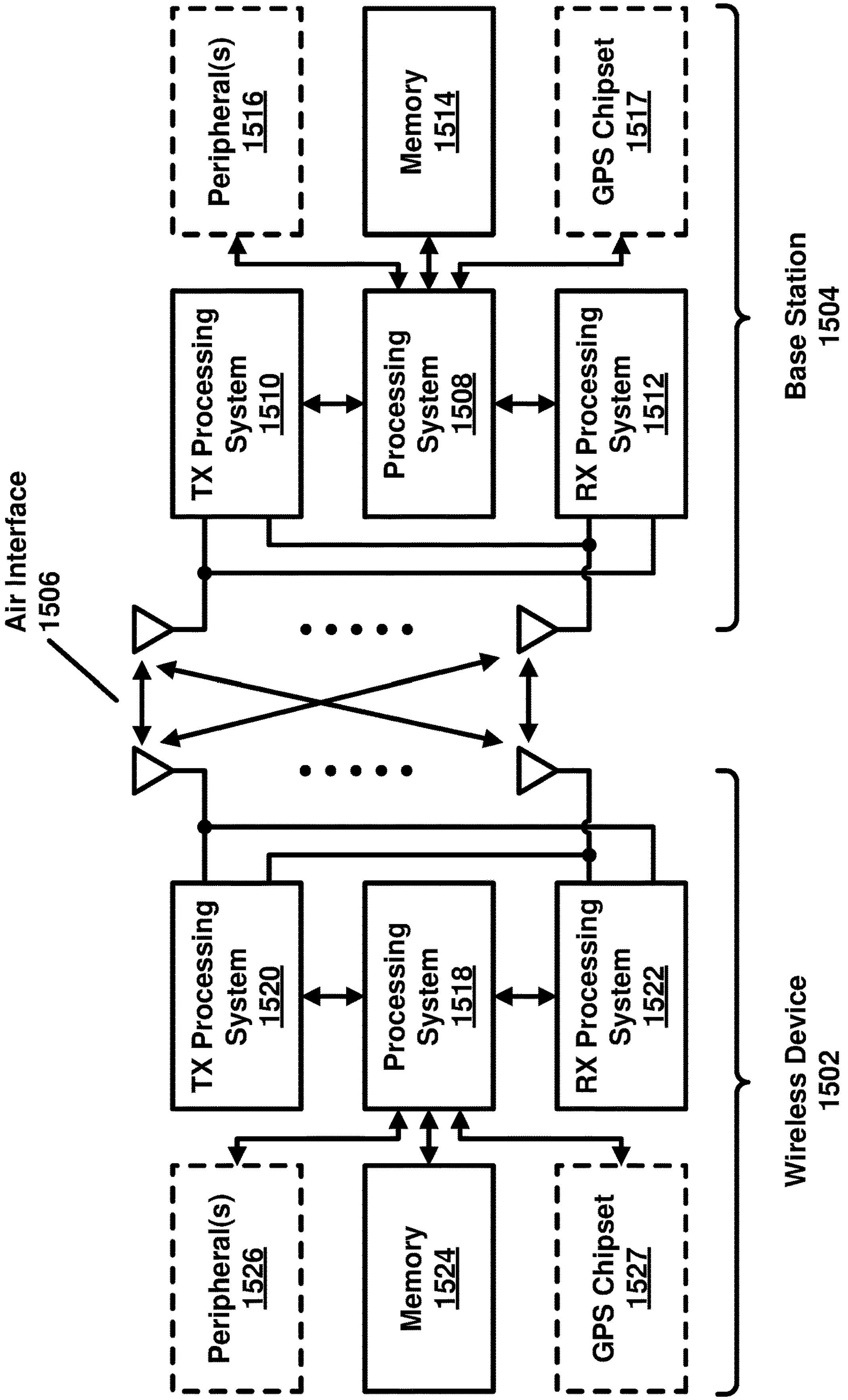
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
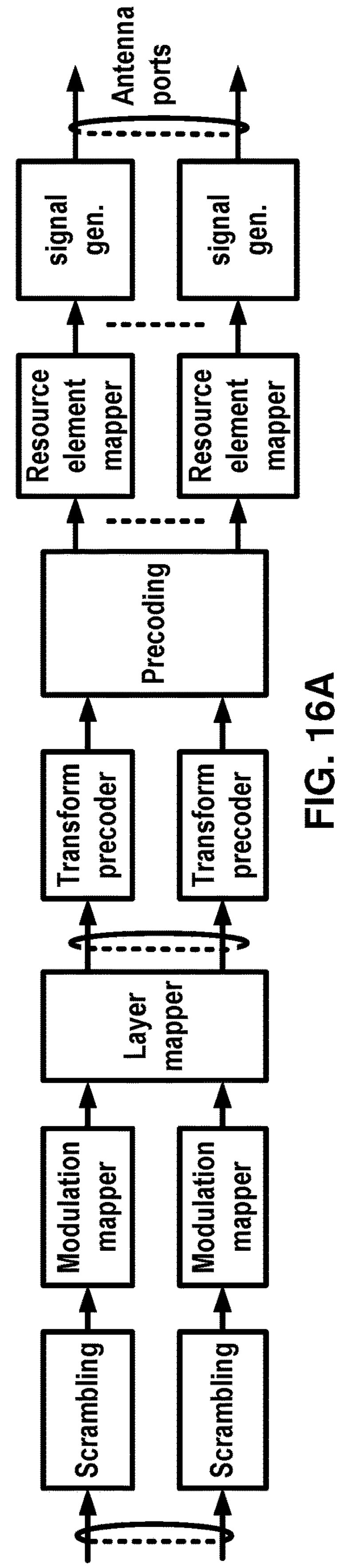
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
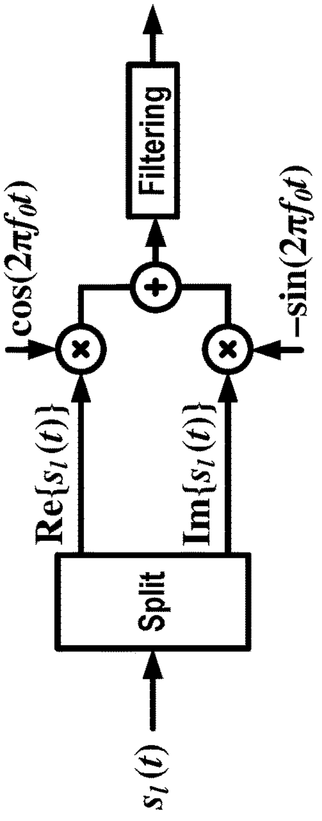

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
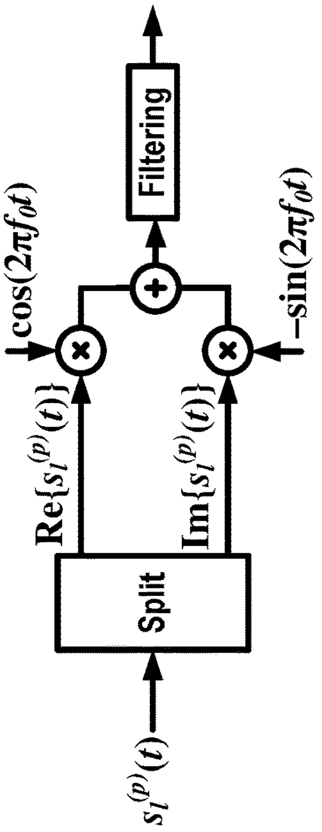
Figure 16C:
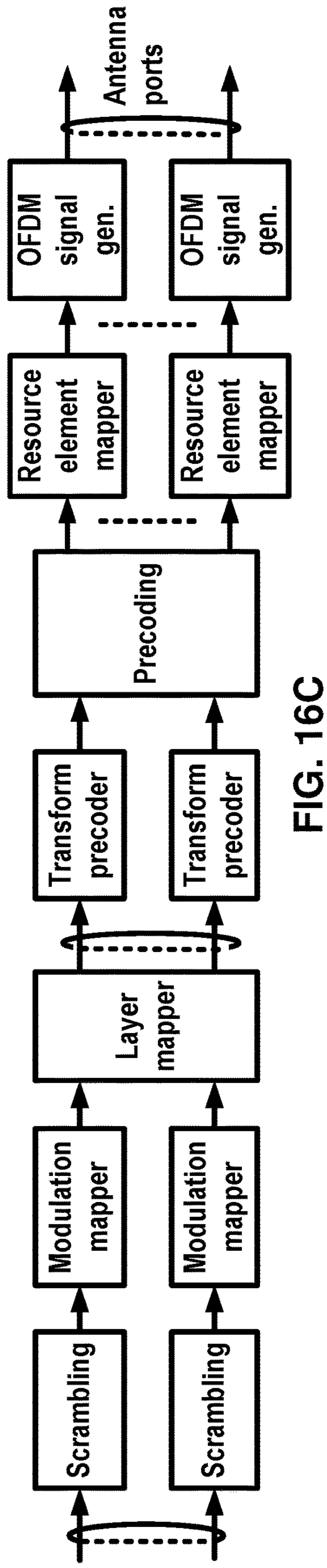

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may receive configuration parameters of a master information block (MIB) of a cell (e.g., PCell). In an example, a wireless device, based on receiving primary synchronization signal (PSS) and/or secondary synchronization signal (SSS), may receive a MIB via a PBCH. The configuration parameters of a MIB may comprise six bits (systemFrameNumber) of system frame number (SFN), subcarrier spacing indication (subCarrierSpacingCommon), a frequency domain offset (ssb-SubcarrierOffset) between SSB and overall resource block grid in number of subcarriers, an indication (cellBarred) indicating whether the cell is bared, a DMRS position indication (dmrs-TypeA-Position) indicating position of DMRS, parameters of CORESET and SS of a PDCCH (pdcch-ConfigSIB1) comprising a common CORESET, a common search space, or necessary PDCCH parameters.

In an example, a pdcch-ConfigSIB1 may comprise a first parameter (e.g., controlResourceSetZero) indicating a common ControlResourceSet (CORESET) with ID #0 (e.g., CORESET #0) of an initial BWP of the cell. controlResourceSetZero may be an integer between 0 and 15. Each integer between 0 and 15 may identify a configuration of CORESET #0. Based on a value of the integer of controlResourceSetZero, a wireless device may determine an SSB and CORESET #0 multiplexing pattern, a number of RBs for CORESET #0, a number of symbols for CORESET #0, an RB offset for CORESET #0, or a combination thereof.

In an example, a pdcch-ConfigSIB1 may comprise a second parameter (e.g., searchSpaceZero) common search space with ID #0 (e.g., SS #0) of the initial BWP of the cell. searchSpaceZero may be an integer between 0 and 15. Each integer between 0 and 15 may identify a configuration of SS #0. Based on a value of the integer of searchSpaceZero, a wireless device may determine one or more parameters (e.g., O, M) for slot determination of PDCCH monitoring, a first symbol index for PDCCH monitoring, and/or a number of search spaces per slot.

In an example, based on receiving a MIB, a wireless device may monitor PDCCH via SS #0 of CORESET #0 for receiving a DCI scheduling a system information block 1 (SIB1). The wireless device may receive the DCI with CRC scrambled with a system information radio network temporary identifier (SI-RNTI) dedicated for receiving the SIB1.

A system information block (SIB) (e.g., SIB1) may contain information related to evaluating if a wireless device is allowed to access a cell and may define scheduling of other system information. A SIB may contain radio resource configuration information that is common for all wireless devices and barring information applied to a unified access control. In an example, a base station may transmit to a wireless device (or a plurality of wireless devices) one or more SIB information. Parameters of the one or more SIB information may comprise: one or more parameters (e.g., cellSelectionInfo) for cell selection related to a serving cell, one or more configuration parameters of a serving cell (e.g., in ServingCellConfigCommonSIB IE), and one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, or other parameters.

In an example a DownlinkConfigCommonSIB IE may comprise parameters of an initial downlink BWP of the serving cell (e.g., SpCell). The parameters of the initial downlink BWP may be comprised in a BWP-DownlinkCommon IE. The BWP-DownlinkCommon IE may be used to configure common parameters of a downlink BWP of the serving cell. The base station may configure the locationAndBandwidth so that the initial downlink BWP contains the entire CORESET #0 of this serving cell in the frequency domain. The wireless device may apply the locationAndBandwidth upon reception of this field (e.g. to determine the frequency position of signals described in relation to this locationAndBandwidth) but may keep CORESET #0 until after reception of RRCSetup/RRCResume/RRCReestablishment.

In an example, an UplinkConfigCommonSIB IE may comprise parameters of an initial uplink BWP of the serving cell (e.g., SpCell). The parameters of the initial uplink BWP may be comprised in a BWP-UplinkCommon IE. The BWP-UplinkCommon IE may be used to configure common parameters of an uplink BWP. The common parameters of an uplink BWP are “cell specific”. The base station may ensure the necessary alignment with corresponding parameters of other wireless devices. The common parameters of the initial bandwidth part of the PCell may be provided via system information. For all other serving cells, the base station may provide the common parameters via dedicated signaling.

A base station may transmit to a wireless device (or a plurality of wireless devices) one or more configuration parameters of a downlink BWP (e.g., initial downlink BWP) of a serving cell. The one or more configuration parameters of the downlink BWP may comprise: one or more generic BWP parameters of the downlink BWP, one or more cell specific parameters for PDCCH of the downlink BWP (e.g., in pdcch-ConfigCommon IE), one or more cell specific parameters for the PDSCH of this BWP (e.g., in pdsch-ConfigCommon IE), or one or more other parameters. A pdcch-ConfigCommon IE may comprise parameters of CORESET #0 (e.g., controlResourceSetZero) which can be used in any common or UE-specific search spaces. A value of the controlResourceSetZero may be interpreted like the corresponding bits in MIB pdcch-ConfigSIB1. A pdcch-ConfigCommon IE may comprise parameters (e.g., in commonControlResourceSet) of an additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET #0. A pdcch-ConfigCommon IE may comprise parameters (e.g., in commonSearchSpaceList) of a list of additional common search spaces. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

A wireless device may receive RRC configuration of an uplink BWP of a serving cell and RACH parameters comprising two-step RA type and 4-step RA type. In an example, a base station may transmit to a wireless device one or more RRC messages (e.g., BWP-UplinkCommon IE) comprising configuration parameters of a RA procedure on an uplink BWP of a cell (e.g., PCell, or a SCell). The cell may comprise a first plurality of downlink BWPs and a second plurality of uplink BWPs. The cell may comprise a plurality of uplink carriers. The plurality of uplink carriers may comprise a normal uplink carrier (NUL) and/or a supplementary uplink carrier (SUL). The configuration parameters may comprise first configuration parameters (e.g., in a RA-ConfigCommon IE) of the RA procedure for a first RA type (e.g., a 4-step RA type) and second configuration parameters (e.g., in a RA-ConfigCommonTwoStepRA-r16 IE) of the RA procedure for a second RA type (e.g., a 2-step RA type). In an example, the configuration parameters may further comprise third configuration parameters (e.g., MsgA-PUSCH-Config IE) of PUSCH resources for message A (MSGA) transmission for the 2-step RA type. The first configuration parameters configured on a BWP may indicate configuration parameters of cell specific RA parameters which the wireless device may use for contention based (CB) and contention free (CF) RA as well as for CB BFR in the BWP. The second configuration parameters configured on a BWP may indicate configuration parameters of cell specific RA parameters which the wireless device may use for CB and CF 2-step RA type procedure as well as for 2-step RA type CB BFR in the BWP. The third configuration parameters configured on a BWP may indicate configuration parameters of cell-specific MsgA (Message A, MSGA or the like) PUSCH parameters which the wireless device may use for contention based MsgA PUSCH transmission of the BWP.

In an example, a base station may transmit to a wireless device, one or more RRC messages (e.g., RACH-ConfigCommon IE) indicating RACH parameters of 4-step RA type. The RACH parameters of 4-step RA type may comprise generic configuration parameters (e.g., in RACH-ConfigGeneric IE), a total number of preambles for the RA procedure (e.g., totalNumberOfRA-Preambles), an indication of association between RACH occasion and SSB (e.g., ssb-perRACH-OccasionAndCB-PreamblesPerSSB), one or more configuration parameters (e.g., TB size threshold for preamble Group B selection, pathloss/RSRP threshold for preamble Group B selection, number of preambles per SSB available in preamble group B) of preamble Group B, a contention resolution timer value (e.g., ra-ContentionResolutionTimer) for a contention resolution timer, a first RSRP threshold (e.g., rsrp-ThresholdSSB) for selection of SS block and corresponding PRACH resource, a second RSRP threshold (e.g., rsrp-ThresholdSSB-SUL) for selection of a SUL or a NUL for the RA procedure, an indication of PRACH root sequence index (e.g., prach-RootSequenceIndex), or one or more other parameters. The indication of association between RACH occasion and SSB may indicate, by a first field (CHOICE field), a number of SSBs per RACH occasion. A value oneEight may correspond to one SSB associated with 8 RACH occasions, value oneFourth correspond to one SSB associated with 4 RACH occasions, and so on. The indication of association between RACH occasion and SSB may indicate, by a second field (ENUMERATED field), a number of preambles per SSB. A value n4 may correspond to 4 preambles per SSB, value n8 correspond to 8 preambles per SSB, and so on.

In an example, a base station may transmit one or more RRC messages (e.g., RACH-ConfigCommonTwoStepRA IE) indicating RACH parameters of 2-step RA type. The RACH parameters of 2-step RA type may comprise generic configuration parameters (e.g., in RACH-ConfigGenericTwoStepRA IE), a total number of preambles for the RA procedure (e.g., msgA-TotalNumberOfRA-Preambles), an indication of association between RACH occasion and SSB (e.g., msgA-SSB-PerRACH-OccasionAndCB-Preambles-PerSSB), one or more configuration parameters (e.g., in GroupB-ConfiguredTwoStepRA) of preamble Group B, a contention resolution timer value (e.g., ra-ContentionResolution Timer) for a contention resolution timer, an indication of PRACH root sequence index (e.g., prach-RootSequenceIndex), or one or more other parameters. In an example, the indication of association between RACH occasion and SSB may indicate, by a first field (CHOICE field), a number of SSBs per RACH occasion. A value oneEight may correspond to one SSB associated with 8 RACH occasions, value oneFourth correspond to one SSB associated with 4 RACH occasions, and so on. The indication of association between RACH occasion and SSB may indicate, by a second field (ENUMERATED field), a number of preambles per SSB. A value n4 may correspond to 4 preambles per SSB, value n8 correspond to 8 preambles per SSB, and so on. In an example, the RACH parameters of 2-step RA type may further comprise one or more RSRP thresholds comprising a first RSRP threshold (e.g., msgA-RSRP-Threshold) for selection of 2-step RA type or 4-step RA type to perform the procedure (on a NUL), a second RSRP threshold (e.g., msgA-RSRP-ThresholdSUL) for selection of 2-step RA type or 4-step RA type to perform the procedure on a SUL, a third RSRP threshold (e.g., msgA-RSRP-ThresholdSSB) for selection of SS block and corresponding PRACH resource, a fourth RSRP threshold (e.g., msgA-RSRP-ThresholdSSB-SUL) for selection of a NUL or a SUL to perform the RA procedure.

In an example, a base station may transmit to a wireless device one or more RRC messages (e.g., RACH-ConfigGeneric IE) comprising generic configuration parameters of a RA procedure for 4-step RA type. The generic configuration parameters of the RA procedure for 4-step RA type may comprise: a PRACH configuration index (e.g., prach-ConfigurationIndex), a preamble target received power level (e.g., preambleReceivedTargetPower), a maximum number (e.g., preambleTransMax) of RA preamble transmission performed before declaring a failure, a Msg2 (RAR) window length (e.g., ra-Response Window) in number of slots, a power ramping step (e.g., powerRampingStep) for PRACH, an offset indication (e.g., msg1-FrequencyStart) of lowest PRACH transmission occasion in frequency domain with respective to PRB 0, a number (e.g., msg1-FDM) of PRACH transmission occasions FDMed in one time instance, and etc. In an example, a PRACH configuration index may identify a PRACH resource configured with a preamble format, a number of subframes, a periodicity and a offset, a starting symbol, a number of PRACH slots within a subframe, a number of time-domain PRACH occasions within a PRACH slot, a PRACH duration.

A base station may transmit to a wireless device one or more RRC messages (e.g., RACH-ConfigGenericTwoStepRA IE) comprising generic configuration parameters of a RA procedure for 2-step RA type on a cell (or a BWP of the cell). The generic configuration parameters of the RA procedure for 2-step RA type may comprise: a PRACH configuration index (e.g., msgA-PRACH-ConfigurationIndex), a preamble target received power level (e.g., msgA-PreambleReceivedTargetPower), a maximum number (e.g., msgA-TransMax) of MsgA preamble transmission performed before switching to a 4-step RA procedure, a maximum number (e., preambleTransMax) of RA preamble transmission performed before declaring a failure, a MsgB monitoring window length (e.g., msgB-ResponseWindow) in number of slots, a power ramping step (e.g., msgA-PreamblePowerRampingStep) for MsgA PRACH, a number (e.g., msgA-RO-FDM) of msgA PRACH transmission occasions multiplexed in one time instance, an offset indication (e.g., msgA-RO-FrequencyStart) of lowest PRACH transmissions occasion in frequency domain with respect to PRB 0 and etc.

The third configuration parameters (e.g., in MsgA-PUSCH-Config IE) of PUSCH resources may comprise a list of MsgA PUSCH resources (e.g., msgA-PUSCH-ResourceList) that the wireless device may use when performing MsgA transmission. The number of PUSCH resources may be consistent with the number of configured preamble groups in RACH-ConfigCommonTwoStepRA in the BWP. If field is not configured for the selected UL BWP, the wireless device may use the MsgA PUSCH configuration of initial UL BWP. The third configuration parameters may further comprise a power offset value (e.g., msgA-DeltaPreamble) of msgA PUSCH relative to a preamble received target power. Each MsgA PUSCH resource of the list of MsgA PUSCH resources may be associated with one or more parameters comprising a preamble group indication (e.g., msgA-PUSCH-PreambleGroup) indicating a preamble group that the msgA PUSCH configuration is tied to according to groupB-ConfiguredTwoStep in RACH-ConfigCommonTwoStepRA, one or more PUSCH resource time and/or frequency domain resource allocation parameters.

In an example, a base station may transmit to a wireless device one or more RRC messages comprising configuration parameters of a RA procedure on a cell (or a BWP of the cell). The cell may comprise a SUL and a NUL. The RA procedure may be a 2-step RA type (e.g., based on FIG. 13C) or a 4-step RA type (e.g., based on FIG. 13A and/or FIG. 13B). The wireless device may trigger the RA procedure based on the configuration parameters of the RA procedure. In response to triggering the RA procedure, the wireless device may initialize the RA procedure. The wireless device may initialize one or more parameters (e.g., transmission counter, transmission timer, transmission power settings, response windows etc.) of the RA procedure. The initializing the RA procedure may comprise at least one of: determining a SUL or a NUL for performing the RA procedure based on measured RSRP and determining a 2-step RA type or a 4-step RA type for performing the RA procedure.

In response to triggering the RA procedure, the wireless device may measure a RSRP of a pathloss RS of the cell. The wireless device may select the pathloss RS (e.g., SSB, or CSI-RS), from a plurality of RSs, with highest RSRP value among the plurality of RSs configured by a base station. The wireless device may select the pathloss RS based on measured L1-RSRP (e.g., without L3 filtering), or measured L3-RSRP (e.g., with L3 filtering) from the plurality of RSs. The wireless device may determine whether the measured RSRP is lower than a first RSRP threshold (e.g., rsrp-ThresholdSSB-SUL, a RSRP threshold configured for SUL or NUL selection).

In response to the RSRP being lower than the first RSRP threshold, the wireless device may select a SUL for performing the RA procedure. The wireless device may set a second RSRP threshold (e.g., RSRP_THRESHOLD_RA_TYPE_SELECTION) as a RSRP threshold (e.g., msgA-RSRP-ThresholdSUL) configured for RACH configuration on the SUL for RA type selection. In response to the RSRP being higher than the first RSRP threshold, the wireless device may select a NUL for performing the RA procedure. The wireless device may set the second RSRP threshold as a RSRP threshold (e.g., msgA-RSRP-Threshold) configured for RACH configuration on the NUL for RA type selection.

In response to selecting an uplink carrier (e.g., SUL or NUL) for performing the RA procedure, the wireless device may determine whether the RSRP is greater than the second RSRP threshold (e.g., RSRP_THRESHOLD_RA_TYPE_SELECTION). In response to the RSRP being greater than the second RSRP threshold, the wireless device may select 2-step RA type for performing the RA procedure on the NUL. After selecting the 2-step RA type and selecting the NUL for the RA procedure, the wireless device may perform RA resource selection. The RA resource selection may comprise selecting an SSB from a plurality of SSBs, selecting a preamble group, selecting a preamble from the preamble group, determining a RACH occasion based on the selected SSB, determining an UL grant and associated HARQ information for a PUSCH resource of MSGA (Message A) associated with the selected preamble and RACH occasion and etc. In an example, the wireless device may select the SSB, from the plurality of SSBs, with the RSRP being higher than a third RSRP threshold. The third RSRP threshold may be configured in RRC message (e.g., msgA-RSRP-ThresholdSSB). In an example, the wireless device may randomly select the SSB, from the plurality of SSBs, when none of the plurality of SSBs has RSRP higher than the third RSRP threshold. The wireless device, based on the RA resource selection, may transmit the MSGA using the selected RACH occasion and the associated PUSCH resource.

In response to selecting the NUL for performing the RA procedure, the wireless device may determine whether the RSRP is greater than the second RSRP threshold (e.g., RSRP_THRESHOLD_RA_TYPE_SELECTION). In response to the RSRP being lower than the second RSRP threshold, the wireless device may select 4-step RA type for performing the RA procedure on the NUL. After selecting the 4-step RA type and selecting the NUL for the RA procedure, the wireless device may perform RA resource selection. The RA resource selection may comprise selecting an SSB from a plurality of SSBs, selecting a preamble group, selecting a preamble from the preamble group, or determining a RACH occasion based on the selected SSB. In an example, the wireless device may select the SSB, from the plurality of SSBs, with the RSRP being higher than a fourth RSRP threshold. The fourth RSRP threshold may be configured in RRC message (e.g., RSRP-ThresholdSSB). In an example, the wireless device may randomly select the SSB, from the plurality of SSBs, when none of the plurality of SSBs has RSRP higher than the fourth RSRP threshold. The wireless device, based on the RA resource selection, may transmit the preamble using the selected RACH occasion.

A four-step contention-based RA procedure (Type-1 random access procedure), illustrated in FIG. 13A, may have an associated latency, which may be at least fourteen transmission time intervals (TTI). As an example, 3GPP TR 38.804 v14.0.0 indicates a minimum latency of fourteen TTIs comprising, e.g., 3 TTIs after a message from step 1 (e.g., Msg1) of a four-step RA procedure, 1 TTI for a message from step 2 (e.g., Msg2) of a four-step RA procedure, 5 TTIs after the message from step 2, 1 TTI for a message from step 3 (e.g., Msg 3) of a four-step RA procedure, 3 TTIs after the message from step 3, and 1 TTI for a message from step 4 (e.g., contention Resolution) of a four-step procedure (e.g., 3+1+5+1+3+1=14). Reducing the number of steps in an RA procedure may reduce latency. By using parallel transmissions, a four-step RA procedure may be reduced to a two-step RA procedure (e.g. as illustrated in FIG. 13C). A two-step RA procedure (Type-2 random access procedure) may have an associated latency, which may be a minimum of four TTIs and which may be less than an associated latency for a four-step RA procedure. As an example, 3GPP TR 38.804 v14.0.0 indicates a minimum latency of four TTIs comprising, e.g., 3 TTIs after a message from step 1 of a two-step RA procedure and 1 TTI for a message from step 2 of a two-step RA procedure.

A random access procedure (e.g., a four-step RACH) may comprise four steps for preamble transmission (Msg1), random access response reception (RAR/Msg2), uplink data transmission with a wireless device identity (Msg3), and contention resolution (Msg4). A random access procedure may comprise only two steps, e.g., a two-step RACH. In a two-step random access procedure, the wireless device may transmit a preamble sequence and a data signal in one transmission (MsgA; the first step). In response to detecting a MsgA, the base station may respond to the wireless device via a MsgB. The MsgB may comprise the detected preamble index, the wireless device identity, and a timing advance. A two-step RACH procedure may result in reduced delay for RACH transmission and/or reduced signaling overhead, for both licensed and unlicensed bands.

FIG. 13C is an example of a two-step RA procedure that may comprise an uplink (UL) transmission of a two-step MsgA 1331 that may comprise a random access preamble (RAP) transmission 1341 and one or more transport blocks transmission 1342, followed by a downlink (DL) transmission of a two-step MsgB 1332 that may comprise a response, e.g., random access response (RAR), corresponding to the uplink transmission. The response may comprise contention resolution information.

A two-step RACH procedure may be able to operate regardless of whether the wireless device has a valid TA or not. A two-step RACH procedure may be applicable to any cell size. A two-step RACH procedure may be applied for RRC_INACTIVE and/or RRC_CONNECTED and/or RRC_IDLE states. A two-step RACH procedure may support contention-based random access. Channel structure of MsgA may comprise preamble and PUSCH carrying payload. For example, existing PRACH preamble design may be used for a two-step RACH procedure. For example, PUSCH including DMRS for transmission of payload of MsgA may be used for a two-step RACH procedure. The PRACH preamble and the PUSCH in a MsgA may be TDMed. It may be important for the wireless device operating in unlicensed bands, that the gap between the preamble and PUSCH short enough such that the MsgA can be transmitted using one LBT. The PRACH preamble and/or PRACH occasion and the time-frequency resource of PUSCH in MsgA plus DMRS may be mapped. The MsgA configuration in two-step RACH may be broadcast by the base station to the wireless device (e.g., via system information) and/or configured using dedicated signaling (e.g., RRC signaling). For example, a base station may transmit one or more RRC messages to configure a wireless device with one or more parameters of a two-step RACH configuration. The one or more RRC messages may comprise parameters required for transmitting a two-step RACH MsgA. For example, the parameters may indicate at least one of followings: PRACH resource allocation, preamble format, SSB information (e.g., total number of SSBs, downlink resource allocation of SSB transmission, transmission power of SSB transmission, and/or other information), and uplink radio resources for one or more transport block transmissions (e.g., UL grant). The same PRACH resources may be shared for a four-step RACH procedure and a two-step RACH procedure. Four-step RACH resources may be configured regardless of whether two-step RACH is configured or not. The configuration of two-step RACH may reuse the configuration of four-step RACH with one or more additional information (e.g., UL grant, and/or UL grant to SSB association, and/or UL grant to PRACH occasion mapping, and/or UL grant to preamble mapping, etc.), for example to save duplicated signaling. Two-step RACH resources may be configured separately from four-step RACH resources, e.g., 2-step RACH occasions (ROs) may be separate from 4-step ROs (no shared ROs), and/or 2-step preambles may be separate from 4-step preambles. Network may indicate (e.g., via broadcast signaling) to the wireless devices whether the 4-step RACH and 2-step RACH resources (e.g., ROs, preambles, etc.) are shared or not.

Figure 17:
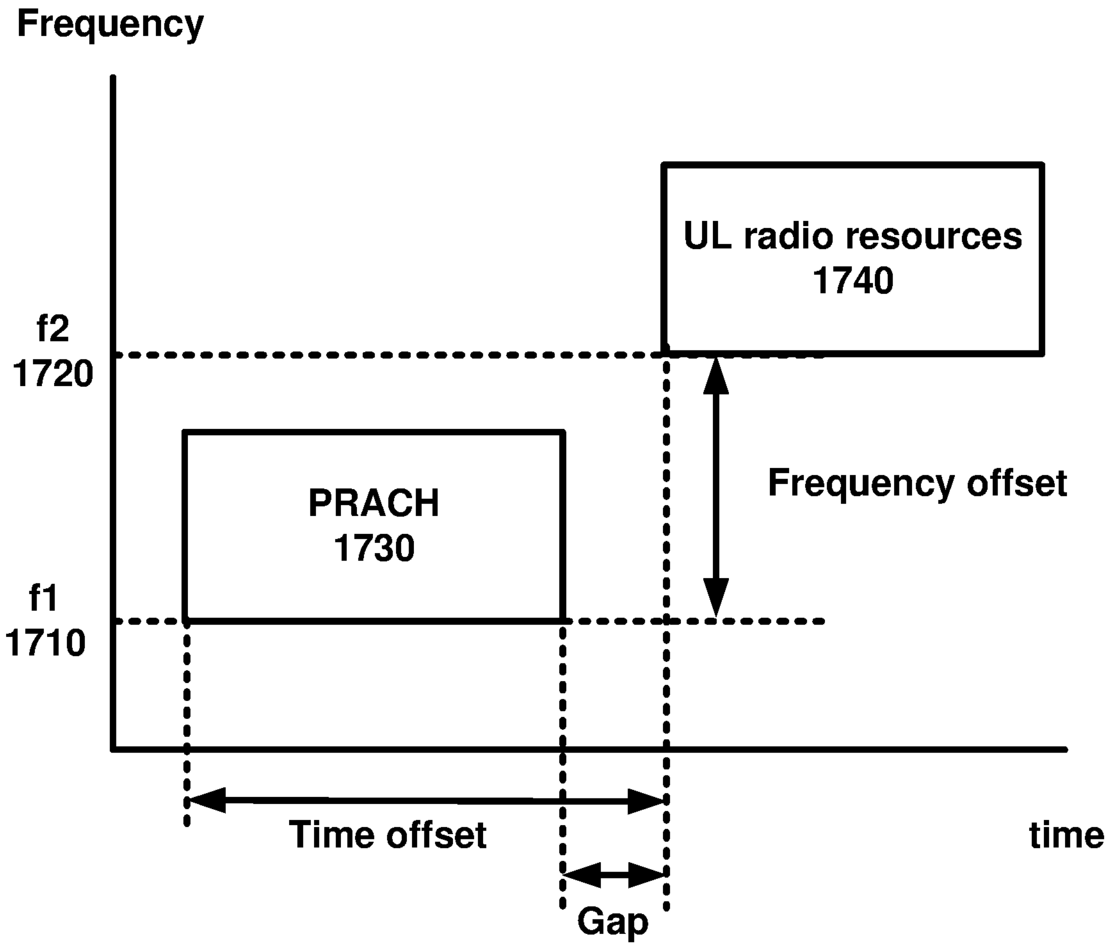
FIG. 17 shows an example of radio resource allocation for a two-step RA procedure, according to some embodiments.

FIG. 17 is an example of radio resource allocation for a two-step RA procedure, according to some embodiments. If a frequency offset (as shown in FIG. 17) is zero, PRACH 1730 and UL radio resources 1740 may be time-multiplexed. If a time offset (as shown in FIG. 17) is zero, PRACH 1730 and UL radio resources 1740 may be frequency-multiplexed. The frequency offset (as shown in FIG. 17) may be an absolute number in units of Hz, MHz, and GHz, and/or a relative number, e.g., one of frequency indices predefined/preconfigured. The time offset (as shown in FIG. 17) may be an absolute number in units of micro-second, milli-second, or second and/or a relative number, e.g., in terms of subframe, slot, mini-slot, OFDM symbol.

In two-step RACH procedure, preamble and payload may be both transmitted in MsgA. However, the receiver sensitivity for the preamble and payload may be different. Hence, it is possible that the base station may detect the preamble successfully but fail to detect the payload part, although the base station may configure the payload transmitting power offset to the preamble to compensate the different receiver sensitivity. In this situation, there may be two possible alternatives for the next step: fall back to a four-step RACH procedure, or retransmission of payload in MsgA.

Fallback from two-step RACH procedure to four-step RACH procedure may work as follows: when the base station only detects the preamble and has no correct knowledge of the payload, the base station may send the content identical with the Msg2 to the wireless device at the second step. The Msg2 transmission may be identical to Msg2 transmission of 4-step RACH. The Msg2 PDCCH may be scrambled by/addressed to RA-RNTI. The RA-RNTI may be calculated based on the resources used for preamble transmission in MsgA. The remainder of the procedure may be identical to 4-step RACH. The wireless device may take the same behavior on the reception of message at second step as the Msg2 reception in a four-step RACH procedure. Once the MsgB identical with Msg2 is received by the wireless device, the wireless device may transmit the Msg3 according to the UL grant in the received RAR of Msg2. The fallback mechanism may avoid the retransmission of contention-based RA (CBRA) preamble and keep the same latency of the four-step RA procedure.

Once MsgA preamble is transmitted, the wireless device may start a MsgB-ResponseWindow (configured by RRC), at a first PDCCH occasion. The wireless device may monitor the PDCCH of the SpCell for a random access response identified by MsgB-RNTI while the MsgB response window is running. In response to a transmission of a PRACH and a PUSCH, or to a transmission of only a PRACH if the PRACH preamble is mapped to a valid PUSCH occasion, the wireless device may attempt to detect a DCI (e.g. DCI format 1_0) with CRC scrambled by a corresponding MsgB-RNTI during the MsgB response window. The window may start at a first symbol of an earliest CORESET the UE is configured to receive PDCCH (e.g., for Type1-PDCCH CSS set), that is at least one symbol, after a last symbol of the PUSCH occasion corresponding to the PRACH transmission. The symbol duration may correspond to the SCS for Type1-PDCCH CSS set. The length of the window in number of slots, based on the SCS for Type1-PDCCH CSS set, may be provided by msgB-ResponseWindow.

A MsgB-RNTI associated with a PRACH occasion in which a random access preamble is transmitted, may be computed as:

$$\text{MSG}B\text{-RNTI}=1+s\_\text{id}+14\times t\_\text{id}+14\times 80\times f\_\text{id}+14\times 80\times 8\times \text{ul\_carrier\_id}+14\times 80\times 8\times 2$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may monitor the PDCCH of the SpCell for Random Access Response identified by the C-RNTI while the msgB-ResponseWindow is running, e.g., if C-RNTI MAC CE was included in the MSGA. If notification of a reception of a PDCCH transmission of the SpCell is received from lower layers, and if a valid downlink assignment has been received on the PDCCH for the MSGB-RNTI and the received TB is successfully decoded, the wireless device may set a preamble backoff value to the backoff indicator (if present in MsgB, otherwise, zero). If the MsgB contains a fall-back RAR with a RAPID matching the transmitted preamble index, the wireless device may take the TC-RNTI received in the fallback RAR and/or process the UL grant in the fallback RAR and proceed with Msg3 transmission. If the MsgB contains a success RAR, the wireless device may take the C-RNTI received in the success RAR and/or apply the timing advance and/or consider the random access procedure successfully completed.

If msgB-ResponseWindow expires, and the Random Access Response Reception has not been considered as successful based on descriptions above, the wireless device may increment PREfAMBLE_TRANSMISSION_COUNTER by 1. If the PREAMBLE_TRANSMISSION_COUNTER reaches a maximum value, the wireless device may fallback to 4-step RACH.

MsgB may be sent when the preamble in MsgA is detected. MsgA PUSCH contents may be same as Msg3 contents of 4-step RACH. MsgB contents may be similar to that of combined Msg2 and Msg4 contents of 4-step RA type. The content of MsgB may be different depending on whether the payload in MsgA is successfully decoded or not. For the case both the MsgA preamble and payload are successfully detected and decoded, the message of the second step is the MsgB for two-step RACH contention resolution. The RAPID in RAR may be redundant as contention resolution ID e.g. C-RNTI disclosed in the payload may fulfill contention resolution purpose. The UL grant may be optional in this case and may be used to schedule the possible uplink data packets after the RACH procedure, for example when Buffer Status Report (BSR) is reported in MsgA. For the case that the preamble is successfully detected but the payload is not successfully decoded, the wireless device may fall back to four-step RACH, where the message of second step may be identical to Msg2, comprising RAR that indicates RAPID and a TC-RNTI, and an UL grant for Msg3. The wireless device may alternatively retransmit the payload in MsgA. In this case a NACK may be indicated in the message of the second step. The message may further comprise an UL grant for retransmission, TA (timing advance) command, TC-RNTI, power control command and other HARQ information if necessary.

Triggers for a four-step RACH procedure may be applied for a two-step RACH procedure as well. The most promising use cases for two-step RACH may comprise unlicensed band, small cell, and handover. In unlicensed band, a wireless device may need to perform LBT before accessing the channel. When the four-step RACH is adopted, there may be multiple LBT at either wireless device and/or base station side, which also results in higher channel access failure probability during random access procedure. Therefore, it is important to simplify RACH procedure to reduce the number of LBT in unlicensed band. Two-step RACH was proposed to apply for unlicensed band. Different from the four-step RACH, the simplified procedure of two-step RACH can be beneficial to complete RACH procedure more quickly. In a small cell, the transmission propagation delay of the wireless devices may be small, such that it may be compensated by normal cyclic prefix (CP) for data transmission. In such case, two-step RACH can be useful to reduce the signaling overhead of RACH procedure. Besides, there may be no TA issue for wireless devices operating in small cell, for example because TA is zero/negligible. For these wireless devices, two-step RACH may be beneficial to quickly get ready for data transmission. Moreover, in unlicensed band, small cells are most likely to be deployed. Therefore, two-step RACH may be most promising in this case.

A wireless device may be informed by the network in the HO command about the TA of the target cell, e.g. if the wireless device is handing over from an SCell to a PCell. In this case, there may be no TA issue for the wireless device and TA may not be necessary to obtain by RACH procedure. Therefore, two-step RACH may be beneficial to quickly complete the handover procedure. For example, a two-step RACH procedure with PUSCH only in MsgA may be considered. However, considering the cell range may not be limited, the TA may be useful when using the two-step RACH. The wireless device may omit the preamble in MsgA when, for example, the wireless device receives the TA value of the target cell during the handover. So, MsgA may only include the PUSCH payload when, for example, the TA is acquired by the HO command. The design of two-step RACH may be reused for the two-step RACH without preamble (RACH-less or RACH-skip or PUSCH-only), retaining the benefit of low latency. MsgA in two-step RACH may comprise PRACH preamble and PUSCH. MsgA in two-step RACH may comprise PUSCH.

The base station may perform beam sweeping to receive the PUSCH transmission of MsgA. For PUSCH transmission of MsgA, beam correspondence may need to be addressed, for example to avoid beam sweeping. It may be necessary for FR2 to associate the PUSCH of MsgA and the received SSB. For FR1, although wide beam may be used, association between the time and frequency resource of the PUSCH (PUSCH occasion) and SSB may be beneficial for the base station, because it may reduce the power consumption for beam sweeping. The PUSCH occasion may be associated with a given SSB. The association between SSB and PUSCH occasion may be configured by SIB/MIB. The beam or SSB index information may be explicitly carried in the payload in MsgA, however, the base station may not be able to decide the right beam of Msg2/MsgB in case the payload is not successfully decoded.

Two-step RACH may support short and long PRACH preamble formats. Two-step RACH may support PRACH configuration with multiple ROs within a PRACH slot. Two-step RACH may support PRACH preamble mapping to multiple PUSCH allocations, where the PUSCH allocations may be FDM and/or TDM. Two-step RACH may support PRACH and PUSCH in a single slot. One or more PRACH preambles may be mapped to one DMRS. The base station may use DMRS of the PUSCH in MsgA for channel estimation. The base station may use the PRACH preamble for channel estimation of the PUSCH in MsgA when, for example, the PRACH and the PUSCH resources are close in time and/or frequency. Thus, the base station may detect whether the DMRS collided, and thus, whether to use the DMRS for the channel estimation, for example, based on the detected PRACH preamble. The ratio of the PRACH/DMRS used in the mapping of the PRACH preambles to the PUSCH DMRS may be selected based on the proximity of the PRACH and the PUSCH resources. One or more preambles may be mapped to a PUSCH in a unique time and frequency resource. This may reduce the likelihood of failed PUSCH decoding due to collision but may increase the two-step RACH physical layer overhead in the uplink.

A wireless device may be configured with a four-step RACH configuration regardless of whether two-step RACH configuration exists or not. Thus, when the base station configures the wireless device with both four-step and two-step RACH resources, the wireless device may need to select know which type of RACH to use to initiate a RACH procedure. The base station may indicate which type of PRACH to use to the wireless device, and/or the wireless device may select which type of PRACH to use based on, for example, the trigger event, and/or prioritized rule, etc. It may not matter to the network which type of RACH the wireless device selects, for example because trigger events of two-step and four-step RACH may be the same, and/or cell radiuses supported by two-step and four-step RACH may be the same. Therefore, the wireless device may select whether to initiate a two-step RACH or four-step RACH (e.g. in initial access), and the base station may give assistive guide and/or some predefined rule to help the wireless device make the selection. The wireless device supporting two-step RACH may always select two-step RACH as long as a received target power for the preamble and PUSCH transmission may be achieved. The wireless device may select between a two-step RACH and a four-step RACH based on RSRP. The wireless device may select two-step RACH, for example in case the measured RSRP exceeds a threshold (e.g., a pre-defined or a pre-configured threshold). The base station may select four-step RACH, for example in case the measured RSRP is below the threshold.

In an example, a wireless device may receive RRC configuration of RACH parameters with coverage enhancement. In an example, a base station may transmit to a wireless device one or more RRC messages comprising configuration parameters of a PRACH configuration (e.g., PRACH-Config IE) for a RA procedure. The configuration parameters may comprise a frequency hopping parameter (e.g., prach-Hopping Offset), an initial PRACH CE level (e.g., initial-CE-level), a list of RSRP thresholds (e.g., rsrp-ThresholdsPrachInfoList) for PRACH resource set selection, and one or more PDCCH configuration parameters (e.g., mpdcch-startSF-CSS-RA). The list of RSRP thresholds may comprise a number of RSRP threshold values for determining a CE level, from a plurality of CE levels, for PRACH. The first element may correspond to RSRP threshold 1, the second element correspond to RSRP threshold 2 and so on. The number of RSRP thresholds present in rsrp-ThresholdsPrachInfoList may be equal to a number of CE levels configured in prach-ParametersListCE minus one. The configuration parameters may indicate a list of PRACH resource sets (e.g., PRACH-ParametersListCE), each PRACH resource set corresponding to a respective CE level of the plurality of CE levels and being associated with one or more PRACH parameters (e.g., in PRACH-ParametersCE IE). The one or more PRACH parameters, for a CE level, may comprise: a PRACH configuration index (e.g., prach-ConfigIndex), a number of PRACH repetitions per attempt for the CE level (e.g., numRepetitionPerPreamble-Attempt), a maximum number of preamble transmission attempts for the CE level (e.g., maxNumPreambleAttemptCE), an initial PRACH CE level (e.g., initial-CE-level), a frequency offset parameter (e.g., prach-FreqOffset), a starting subframe indication (e.g., prach-StartingSubframe), a frequency hopping parameter (e.g., prach-HoppingConfig), one or more PDCCH configuration parameters (e.g., mpdcch-NumRepetition-RA indicating a number of repetition of PDCCH transmission) and etc. In an example, the base station may transmit to the wireless device one or more RRC messages of a RA procedure comprising configuration parameters indicating a maximum number of preamble transmission (e.g., preamble TransMax, or preambleTransMax-CE) for performing RA preamble transmissions before declaring a failure.

Figure 18A:
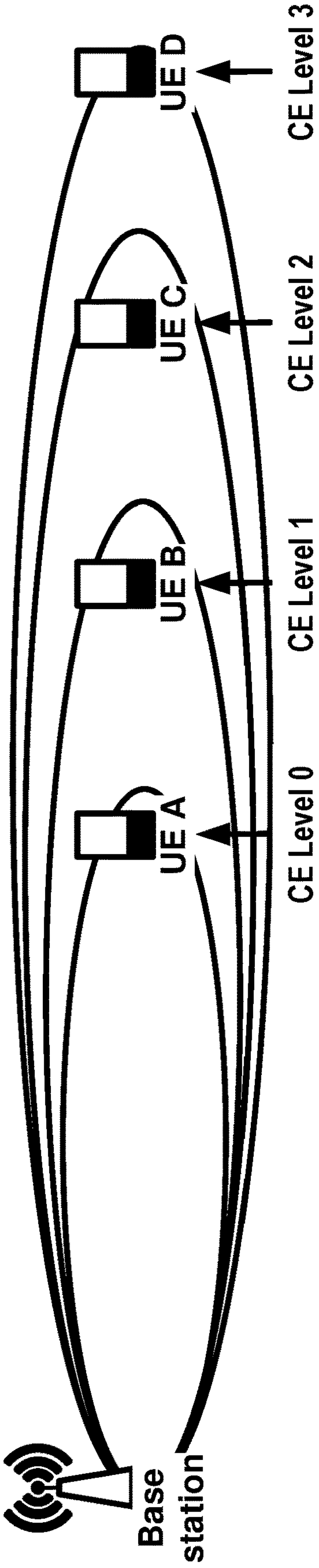
FIG. 18A shows an example of coverage enhancement levels, according to some embodiments.

FIG. 18A shows an example of coverage enhancement levels, according to some embodiments. In an example, a base station may transmit to a wireless device one or more RRC messages comprising configuration parameters of a RA procedure for coverage enhancement. As shown in FIG. 18A, the wireless device may be one of: a first wireless device (e.g., UE A) located in a cell coverage of a first CE level (e.g., CE Level 0), a second wireless device (e.g., UE B) located in a cell coverage of a second CE level (e.g., CE Level 1), a third wireless device (e.g., UE C) located in a cell coverage of a third CE level (e.g., CE Level 2), a fourth wireless device (e.g., UE D) located in a cell coverage of a fourth CE level (e.g., CE Level 3), and etc. The wireless device may determine a CE level, for the RA procedure, based on a RSRP of a pathloss RS and a RSRP threshold corresponding to the CE level and perform the RA procedure based on the determined CE level.

Figure 18B:
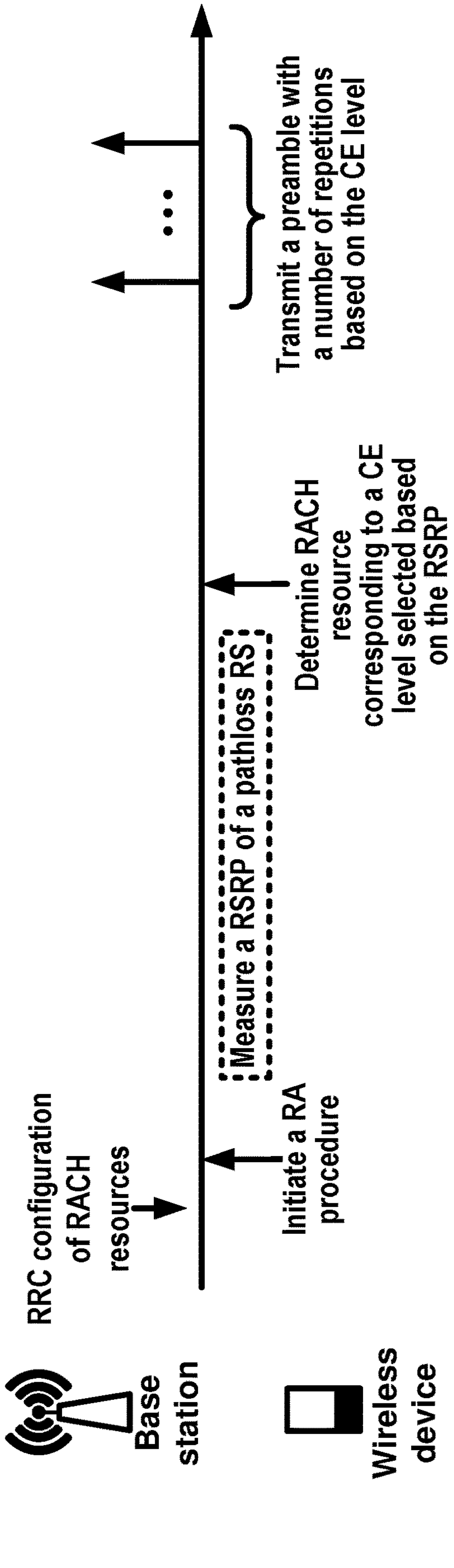
FIG. 18B shows an example of a RACH procedure with coverage enhancement, according to some embodiments.

FIG. 18B shows an example of RACH procedure with coverage enhancement, according to some embodiments. In an example, each RACH resource set is associated with a respective CE level of a plurality of CE levels. The wireless device may determine a CE level, for the RA procedure, based on comparing a measured RSRP and a RSRP threshold, of the plurality of RSRP thresholds, corresponding to the CE level of the plurality of CE levels. In an example, if a RSRP threshold, of the plurality of RSRP thresholds, corresponding to CE level 3 is configured and the measured RSRP is less than the RSRP threshold of CE level 3 and the wireless device is capable of supporting CE level 3, the wireless device may determine the CE level as CE level 3 for the RA procedure. If a RSRP threshold, of the plurality of RSRP thresholds, corresponding to CE level 2 is configured and the measured RSRP is less than the RSRP threshold of CE level 2 and greater than the RSRP threshold of CE level 3, and the wireless device is capable of supporting CE level 2, the wireless device may determine the CE level as CE level 2 for the RA procedure. If a RSRP threshold, of the plurality of RSRP thresholds, corresponding to CE level 1 is configured and the measured RSRP is less than the RSRP threshold of CE level 1 and greater than the RSRP threshold of CE level 3 and the RSRP threshold of CE level 2, and the wireless device is capable of supporting CE level 1, the wireless device may determine the CE level as CE level 1 for the RA procedure. If the measured RSRP is higher than the RSRP threshold of CE level 1, the wireless device may determine the CE level as CE level 0.

Based on the determined CE level (e.g., CE level 3, CE level 2, CE level 1 and/or CE level 0), the wireless device may determine a RACH resource (e.g., a preamble and/or a RACH occasion) for the RA procedure. The wireless device may transmit the preamble with a number of repetitions (e.g., numRepetitionPerPreambleAttempt) by using the RACH occasion. The number (e.g., numRepetitionPerPreambleAttempt) may be configured for the CE level in the RRC messages. In response to transmitting the preamble with the number of repetitions, the wireless device may monitor PDCCH for receiving a RA response (e.g., after a last preamble repetitions).

The wireless device may monitor a PDCCH for receiving a response for the transmitting the preamble. The wireless device may monitor the PDCCH after a last repetition of the preamble transmission. The wireless device may determine whether the response is received during the monitoring the PDCCH (e.g., when a RAR response window is running). In response to the response being received, the wireless device may perform Message 3 transmission, based on example of FIG. 13A. The wireless device may select the RAR window (ra-ResponseWindowSize) and Contention resolution window (mac-ContentionResolutionTimer) corresponding to the selected CE level and PRACH.

In an example, the size of RAR window may increase with the number of preamble repetitions increasing per CE level. Once the Random Access Preamble is transmitted, the UE may monitor the PDCCH of the SpCell for Random Access Response(s) identified by the RA-RNTI defined below, in the RA Response window. The RA Response window for CE UE may start at the subframe that contains the end of the last preamble repetition plus three subframes, and has length ra-ResponseWindowSize for the corresponding enhanced coverage level.

For CE, RA-RNTI associated with the PRACH in which the Random Access Preamble is transmitted, is computed as:

$$RA\text{-}RNTI = 1 + \text{t\_id} + 10 * \text{f\_id} + 60 * \left(\text{SFN\_id mod } \left(W\text{max}/10\right)\right)$$

where t_id may be an index of a first subframe of the specified PRACH ($0 \le t\_id < 10$), f_id may be an index of the specified PRACH within that subframe, in ascending order of frequency domain ($0 \le f\_id < 6$), SFN_id may be an index of a first radio frame of the specified PRACH, and Wmax may be 400, maximum possible RAR window size in subframes for UEs in enhanced coverage.

Increased RAR window may extend beyond a duration of a system frame. The offset added to the RA-RNTI formula compared to legacy LTE UE (60*(SFN_id mod (Wmax/10))) is to avoid collision between DCIs addressed to CE UEs in different system frames.

The usage scenarios that have been identified for 5G are enhanced mobile broadband (eMBB), massive machine-type communication (mMTC), and Ultra-Reliable and Low Latency communication (URLLC). Yet another identified area to locate the boundary between mMTC and URLLC would be time sensitive communication (TSC). In particular, mMTC, URLLC, and TSC are associated with novel IoT use cases that are targeted for vertical industries. It is envisaged that eMBB, mMTC, URLLC, and TSC use cases may all need to be supported in the same network.

One objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such an environment include, e.g., pressure sensors, humidity sensors, thermometers, motion sensors, accelerometers, actuators, etc. It is desirable to connect these sensors and actuators to 5G radio access and core networks. The massive industrial wireless sensor network (IWSN) use cases and requirements described in 3GPP TR 22.804, TS 22.104, TR 22.832 and TS 22.261 include not only URLLC services with very high requirements, but also relatively low-end services with the requirement of small device form factors, and/or being completely wireless with a battery life of several years.

Similar to connected industries, 5G connectivity can serve as a catalyst for the next wave of smart city innovations. As an example, 3GPP TS 22.804 describes smart city use cases and requirements for smart city use cases. The smart city vertical covers data collection and processing to more efficiently monitor and control city resources and to provide services to city residents. The deployment of surveillance cameras is an essential part of the smart city but also of factories and industries.

Finally, the wearables use case includes smart watches, rings, eHealth related devices, medical monitoring devices, etc. One characteristic for the wearables use case is that the device is small in size.

As a baseline, the requirements for these use cases, also known as NR-Light, are device complexity, device size, and deployment scenarios. For device complexity, the main motivation for the new device type is to lower the device cost and complexity as compared to high-end eMBB and URLLC devices of Rel-15/Rel-16. This is the case for industrial sensors. For device size, the requirement for most use cases is that the standard enables a device design with compact form factor. For deployment scenarios, the system should support all FR1/FR2 bands for FDD and TDD. Use case specific requirements may include industrial wireless sensors, for which communication service availability is 99.99% and end-to-end latency less than 100 ms; the reference bit rate is less than 2 Mbps (potentially asymmetric, e.g., UL heavy traffic) for all use cases and the device is stationary; the battery should last at least few years; for safety related sensors, latency requirement is lower than, e.g., 5-10 ms. Use case specific requirements may include video surveillance, for which reference economic video bitrate would be 2-4 Mbps, latency <500 ms, reliability 99%-99.9%. High-end video (e.g., for farming) would require 7.5-25 Mbps. It is noted that traffic pattern is dominated by UL transmissions. Use case specific requirements may include wearables. Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks).

Recognizing UE features and parameters with lower end capabilities, relative to Release 16 eMBB and URLLC NR, may help to serve the use cases mentioned above. Potential UE complexity reduction features may include: reduced number of UE RX/TX antennas; reduced UE bandwidth (e.g. Rel-15 SSB bandwidth may be reused and L1 changes minimized); Half-Duplex-FDD; relaxed UE processing time; and relaxed UE processing capability. UE power saving may be enabled and battery lifetime enhancements may be considered for reduced capability UEs (RedCap UEs) in applicable use cases (e.g., delay tolerant use case). For example, by enabling reduced PDCCH monitoring by smaller numbers of blind decodes and CCE limits; and/or by enabling extended DRX for RRC Inactive and/or Idle; and/or enabling RRM relaxation for stationary devices. Functionalities may be enabled that mitigate or limit the performance degradation of such features and complexity reductions, e.g., coverage recovery to compensate for potential coverage reduction due to the device complexity reduction. Standardization framework and principles may be studied for how to define and constrain such reduced capabilities, considering the definition of a limited set of one or more device types and considering how to ensure those device types are used for the intended use cases. Functionalities may be studied that will allow devices with reduced capabilities (RedCap UEs) to be explicitly identifiable to networks and network operators and allow operators to restrict their access if desired.

As described above, many types of use scenarios are being envisaged and enabled for interfacing with 5G technologies. In some embodiments, these use scenarios are enabled through UEs that have different capabilities. For example, a UE may be one of and/or a variation/combination of the following types of wireless devices: an NB-IoT device, an eMTC device, an NR-Light (sometimes referred to as NR-Lite) device, a URLCC device, or an eMBB device. The NB-IoT device type and the eMTC device type may be part of the lower-power wide area IoT use case whereas the URLCC device type and the eMBB device type are for the full NR use case. For example, the eMBB device type may be a legacy UE such as a smartphone. In some embodiments, the RedCap UEs described above may be an NR-Light device type. In some embodiments, the RedCap UEs may be an NB-IoT device type or an eMTC device type. Unlike UEs of the URLCC device type or the eMBB device types, RedCap UEs may have limited hardware and related capabilities.

In some embodiments, reduction of UE bandwidth may be beneficial in terms of UE complexity reduction, e.g., in frequency range 1 and/or frequency range 2 (FR1 and/or FR2). For determining a RedCap UE bandwidth, one or more of the following may be considered: reusing legacy initial access scheme, SSB bandwidth, CORESET #0 configurations, initial BWP bandwidth, data rates needed for RedCap use cases, leverage of the LTE ecosystem (e.g., using the same bandwidth as LTE), UE cost saving consideration, UE power saving consideration, PDCCH performance (e.g., implication on the aggregation level), scheduling flexibility, or a combination thereof.

For example, a UE bandwidth reduction to 20 MHz or lower (e.g., 5/10/15 MHz) in FR1 may be considered. The lowest bandwidth capability may not be less than LTE Category *1bis* modem (20 MHz). For example, for low-end use cases, a 20 MHz UE bandwidth may be enough to achieve a data rate requirement. For example, for high-end use cases, such as small size wearables, 20 MHz may not be enough to achieve the 150 Mbps DL peak data rate for single antenna case. Considering that initial access should support different RedCap UEs, a 20 MHz bandwidth may be considered as the baseline for initial access in FR1. For example, 20 MHz may be useful for future RedCap unlicensed devices to support a Listen-Before-Talk (LBT) bandwidth of 20 MHz. For example, RedCap UEs may support at least a maximum of 20 MHz bandwidth in FR1. In FR1, the existing configuration options for SSB and CORESET #0 may be preserved, while reducing the specification impact when RedCap is introduced in Rel-17. The market acceptance of RedCap may be weakened if enabling RedCap support in the network comes at the cost of losing certain configuration options for SSB or CORESET #0. In FR1, CORESET #0 bandwidth can be up to 17.28 MHz. Therefore, a RedCap UE can be expected to support at least 20 MHz maximum channel bandwidth, at least during initial access. 20 MHz may also be considered as a sweet spot that balances device cost and required data rate for various services. Further reduction of maximum UE bandwidth may lead to diminishing gain in cost reduction and power saving, but significant loss in coverage, data rates, latency, scheduling flexibility, and coexistence with legacy NR UEs. For example, a 10 MHz bandwidth may be considered because it does not require specification change for initial access. For the low-to-mid end data rate services, no MIMO is needed if 20 MHz is assumed, which is beneficial for devices with small form factors. If a smaller bandwidth is used, e.g. 10 MHz, MIMO or CA might be needed for low-to-mid end data rate services, which can be challenging for certain devices. For example, 20 MHz channel bandwidth may be supported, and smaller bandwidth such as 10 MHz may also be considered at least for use cases not requiring high peak data rate such as low-end wearables.

In FR2, even more than in FR1, UE bandwidth reduction is a key feature to significantly reduce UE complexity and cost. For FR2, the RedCap UE may support 50 MHz and/or 100 MHz maximum UE bandwidth at least for initial access. A supported bandwidth of less than 80-100 MHz may have impacts due to PBCH and coreset selection. A supported bandwidth of 80 MHz may not provide significant UE cost savings and going below 80 MHz may have large specification impacts and legacy network impacts. 50 MHz and 100 MHz bandwidths are already specified for FR2, and may be preferred over the other proposals in order to minimize the impacts on specifications, implementations and deployments. In FR2, even though the maximum SSB bandwidth can be up to 57.6 MHz and CORESET #0 bandwidth can be up to 69.12 MHz, these SSB and CORESET #0 configuration options can still be used in cells supporting 50 MHz RedCap UEs. For example, a UE may need to skip certain SSB or PDCCH subcarriers outside of the UE receive bandwidth. This will result in some coverage loss that should be studied and that can be mitigated through suitable coverage recovery solution should SSB and PDCCH become the coverage limiting channels.

The legacy mobile broadband networks were designed to optimize performance mainly for human type of communications and thus, are not designed or optimized to meet the machine type communications (MTC) related requirements. The primary objective of MTC specific designs is to focus on the lower device cost, enhanced coverage, and reduced power consumption. To further reduce the cost and power consumption, it may be beneficial to further reduce the transmission/reception bandwidth of legacy systems (e.g., LTE or New Radio). The transmission/reception bandwidth for both control and data channels may be reduced (e.g., to 5 MHz or 10 MHz or 20 MHz or 50 MHz or 100 MHz). In general, it is envisioned that a large number of MTC/RedCap devices will be deployed for specific services within one cell in near future. When such a massive number of MTC/RedCap devices attempt to access and communicate with the network, multiple MTC regions/bandwidths (e.g., 20 MHz bandwidths) may be allocated by the base station.

A baseline UE bandwidth capability in FR1 may be 20 MHz. This bandwidth may be assumed during the initial access procedure and/or after the initial access procedure. An FR1 RedCap UE may optionally support a maximum bandwidth larger than 20 MHz after initial access. A baseline UE bandwidth capability in FR2 may be 100 MHz. This bandwidth may be assumed during the initial access procedure and/or after the initial access procedure. A same maximum UE bandwidth capability in a band may apply to radio frequency (RF) and/or baseband. The maximum UE bandwidth capability in a band may apply to data and/or control channels. The maximum UE bandwidth capability in a band may apply to DL and/or UL.

For FR1 FDD bands and FR2 bands where a non-RedCap UE is required to be equipped with a minimum of 2 Rx branches, a minimum number of Rx branches supported by a RedCap UE may be 1. A maximum number of DL MIMO layers may be 1 for a RedCap UE with 1 Rx branch. 2 Rx branches may be supported by a RedCap UE. A maximum number of DL MIMO layers may be 1 or 2 for a RedCap UE with 2 Rx branch. For FR1 TDD bands where a non-RedCap UE is required to be equipped with a minimum of 4 Rx branches, a minimum number of Rx branches supported by a RedCap UE may be one or two. A maximum number of DL MIMO layers may be 1 for a RedCap UE with 1 Rx branch. A maximum number of DL MIMO layers may be 1 or 2 for a RedCap UE with 2 Rx branch. For FR2 bands where a non-RedCap UE is required to be equipped with a minimum of 2 Rx branches, for a RedCap UE with 1 Rx branch, the maximum number of DL MIMO layers may be 1. For a RedCap UE with 2 Rx branches, the maximum number of DL MIMO layers may be 1 or 2.

A maximum mandatory modulation for RedCap may be relaxed, e.g., 64QAM instead of 256QAM for FR1 DL, 16QAM instead of 64QAM for FR1 UL, 16QAM instead of 64QAM for FR2 DL, and 16QAM instead of 64QAM for FR2 UL.

MIMO layer for RedCap may be restricted to one or two layers. Transport block size (TBS) may implicitly be restricted due to reduced UE bandwidth and/or reduced number of MIMO layers. Other TBS restrictions may or may not be considered for RedCap UE.

For FR1, under the consideration of potential reduced antenna efficiency due to device size limitations, a loss (e.g., maximum isotropic loss (MIL)) of PUSCH and/or Msg3 may be worse than that of the bottleneck channel for the reference NR UE and coverage recovery may be needed. The amount of coverage recovery may be up to 3 dB. For other UL channels, coverage recovery may not be needed. For FR1 including both FDD and TDD bands and RedCap UE with 2 Rx and reduced antenna efficiency, the losses of all the downlink channels may be better than that of the bottleneck channel for the reference NR UE and coverage recovery may not be needed. For RedCap UE with 1 Rx and reduced antenna efficiency, dependent on frequency bands and the assumption of DL power spectral density (PSD), the need for coverage recovery can be different. For example, for carrier frequency of 4 GHz with DL PSD 24 dBm/MHz, coverage recovery may be needed for the downlink channels of Msg2, Msg4 and PDCCH CSS. For other carrier frequencies or DL PSD other than 24 dBm/MHz, coverage recovery may not be needed for the downlink channels. For FR2, there may be no assumption of reduced antenna efficiency for RedCap UE and the losses of the UL channels may be the same as the reference NR UE and coverage recovery for UL channels may not be needed. For RedCap UE with 100 MHz BW and 1Rx, although there may be performance loss from reducing the number of Rx branches to 1, the losses of the DL channels may be better that that of the bottleneck channel for the reference NR UE and coverage recovery for DL channels may not be needed. For RedCap UE with 50 MHz BW and 1Rx, coverage recovery may be needed for PDSCH, e.g., when the same target data rate as the reference NR UE is assumed, and the amount of coverage recovery to be considered may be approximately [2-3 dB].

Coverage recovery for broadcast PDCCH (e.g., PDCCH monitored in a Type0/0A/1/2/3-PDCCH CSS) may comprise PDCCH repetition, compact DCI, new aggregation level (AL) [e.g., 12, 24 or 32], PDCCH transmission via CORESET or search space bundling, PDCCH-less mechanism for SIB1 and/or SI message. Coverage recovery for PUSCH may comprise cross-slot or cross-repetition channel estimation, lower DM-RS density in time domain, enhancements on PUSCH repetition Type A and/or Type B, frequency hopping or BWP switching across a larger system bandwidth. Coverage recovery for PDSCH may comprise the use of the lower-MCS table, larger aggregation factor for PDSCH reception, cross-slot or cross-repetition channel estimation, increasing the granularity of PRB bundling, frequency hopping or BWP switching across a larger system bandwidth. Coverage recovery for Msg2 PDSCH may comprise TBS scaling and/or Msg2 PDSCH repetition. A mechanism for differentiating enhanced UE (supporting coverage recovery) and legacy UE may be needed. The mechanism may comprise separate PRACH configurations (e.g., separate PRACH occasions and/or preambles). Coverage recovery for Msg3 may comprise repetition for Msg3 PUSCH initial and/or retransmission. Coverage recovery for Msg4 PDSCH may comprise a scaling factor for TBS determination, PDSCH repetition, and/or using a lower-MCS table.

Identification of RedCap UEs may be done during Msg1 (PRACH) transmission. The options may comprise separate initial UL BWP, and/or separate PRACH resources, and/or PRACH preamble partitioning. Identification of RedCap UEs may be done during Msg3 (PUSCH) transmission. The options may comprise using the spare bit in existing Msg3 definition; extending the Msg3 size to carry additional one or more bits, indicating RedCap UE type(s). Identification of RedCap UEs may be done after Msg4 acknowledgement, e.g., during Msg5 (PUCCH) transmission and/or part of UE capability reporting. Identification of RedCap UEs may be done during MsgA (PRACH+PUSCH) transmission, e.g., if 2-step RACH is supported for RedCap UEs.

Early identification of RedCap UE type(s) during transmission of Msg1 may be necessary for: coverage recovery (including link adaptation) for one or more of: Msg2 PDCCH/PDSCH, Msg3 PUSCH and PDCCH scheduling Msg3 reTx, Msg4 PDCCH/PDSCH or PUCCH in response to Msg4, Msg5 PUSCH and associated PDCCH (e.g., if it is determined that coverage recovery for RedCap UEs is necessary for one of more of these channels); identifying UE minimum processing times capabilities for PDSCH processing and PUSCH preparation (e.g., if relaxations to UE min processing times are defined for N1 and N2); identifying UE capability for UL modulation order for Msg3 and Msg5 scheduling (e.g., if relaxations to max UL modulation order (i.e., UL modulation order restricted to lower than 64QAM) are introduced); identifying UE max bandwidth capability for Msg3 and Msg5 scheduling and PUCCH in response to Msg4. If early identification of RedCap UE type(s) during Msg1 transmission is not supported, identification of RedCap UE type(s) during transmission of Msg3 may be necessary for coverage recovery (including link adaptation) for one or more of: Msg4 PDCCH/PDSCH, Msg5 PUSCH and associated PDCCH.

Identification of RedCap UE type(s) during transmission of Msg1 may enable efficient handling of different UE minimum processing times between RedCap and non-RedCap UEs for: minimum timing between PDSCH carrying RAR and start of Msg3 PUSCH; minimum timing between PDSCH carrying Msg4 and the corresponding HARQ-ACK feedback; minimum timing between PDCCH with the reTx grant and the corresponding Msg3 PUSCH retransmission, if relaxed UE min processing times are introduced for RedCap UEs. Identification of RedCap UE type(s) during transmission of Msg1 may enable coverage recovery, including link adaptation, for any one or more of: broadcast PDCCH, PDSCH associated with Msg2, PDSCH associated with Msg4, and PUSCH associated with Msg3, if coverage recovery is needed for these channels. The option of configuring separate initial UL BWPs, in addition to the above pros, may enable addressing congestion (if congestion may occur) in the initial UL BWP that may otherwise need to be restricted to the mandatory required BW for RedCap UEs in the band/FR.

Identification of RedCap UE type(s) during transmission of Msg1 may result in potential reduction in PRACH user capacity (for the options based on separation of PRACH preambles), impacting both RedCap and non-RedCap UEs respectively, e.g., if the total PRACH resources in the cell is not increased. The exact impact may depend on numbers of device type(s)/sub-types/capabilities to be identified and exact details of PRACH preamble partitioning schemes. Identification of RedCap UE type(s) during transmission of Msg1 may result in potential increase in UL overhead from PRACH (for the options based on separation of PRACH resources), impacting both RedCap and non-RedCap UEs. Identification of RedCap UE type(s) during transmission of Msg1 may result in potential increase in UL overhead and complexity in configuration and maintenance of multiple initial UL BWP for the gNodeB, for the option of configuring separate initial UL BWPs. Identification of RedCap UE type(s) during transmission of Msg1 may result in higher impact to RAN1 and RAN2 specifications as well as increased SIB signaling overhead compared to other options. The indication mechanisms in this category may be limiting in terms of the number of further sub-types/capabilities within RedCap device type that may be distinguished, if such sub-types/capability indication are introduced.

Identification of RedCap UE type(s) during transmission of Msg3 may enable coverage recovery (if needed) and/or appropriate link adaptation for PDSCH (and associated PDCCH and PUCCH) for Msg4, and scheduling of Msg5. The option of extending Msg3 size may offer good scalability in the number of bits for such UE identification; e.g., if sub-types of RedCap device types (if defined) are to be indicated in Msg3. If only the spare bit in Msg3 is used, it would consume the single spare bit currently available in Msg3 payload, and this may not be desirable. The option of only using the spare bit in Msg3 scales poorly—limiting to a single-bit indication may not be sufficient if intending to distinguish between further sub-types/capabilities within RedCap device type, if RedCap UE sub-types/capabilities are defined in the context of RedCap UE identification. Cannot facilitate additional coverage recovery (including separate link adaptation) for broadcast PDCCH and/or Msg2 PDSCH, and/or Msg3 PUSCH (and associated PDCCH) for RedCap UEs. If extended Msg3 size is introduced, mechanisms to enable detection between use of legacy Msg3 and extended Msg3 definitions necessary. If UE minimum processing times are relaxed, cannot facilitate scheduling with separate minimum timing relationships for RedCap UEs (compared to non-RedCap UEs) between PDSCH carrying RAR and start of Msg3 PUSCH; minimum timing between PDCCH with the reTx grant and the corresponding Msg3 PUSCH retransmission. This could result in increased initial access latency for non-RedCap UEs. Extending Msg3 size may degrade reliability/coverage of Msg3. Extending Msg3 size may not address the issue where Msg3 is scheduled with a bandwidth/hopping range larger than the maximum RedCap UE bandwidth in the UL initial BWP.

Identification of RedCap UE type(s) during transmission of Msg5 or in UE capability report may offer a simple option for indication of RedCap UE type, including possibility of indicating further RedCap sub-types/capabilities if introduced. Identification of RedCap UE type(s) during transmission of Msg5 or in UE capability report may not facilitate additional coverage recovery (if needed) or separate link adaptation for broadcast PDCCH and/or Msg2 and/or Msg4 PDSCH, and/or Msg3 PUSCH for RedCap UEs. Too conservative scheduling and link adaptation for all UEs imply increased system overead for initial access in the initial DL and UL BWPs. If UE minimum processing times are relaxed, identification of RedCap UE type(s) during transmission of Msg5 or in UE capability report cannot facilitate scheduling with separate minimum timing relationships for RedCap UEs between PDSCH carrying RAR and start of Msg3 PUSCH; minimum timing between PDSCH carrying Msg4 and the corresponding HARQ-ACK feedback; minimum timing between PDCCH with the reTx grant and the corresponding Msg3 PUSCH retransmission. This could result in increased initial access latency for non-RedCap UEs. Identification of RedCap UE type(s) during transmission of Msg5 or in UE capability report cannot address the issue where Msg3 or PUCCH in response to Msg4 or Msg5 is scheduled with a bandwidth/hopping range larger than the maximum RedCap UE bandwidth in the UL initial BWP.

A wireless device may receive a DCI (e.g., DCI format 1_0) with CRC scrambled by RA-RNTI or MsgB-RNTI. The DCI may be received in response to a preamble transmission using a PRACH occasion associated with the RA-RNTI or MsgB-RNTI. The DCI may indicate a DL grant for receiving a Msg2/MsgB PDSCH comprising MAC PDU consisting of the random access response (e.g., RAR and/or fallbackRAR and/or successRAR). The DCI may comprise the following information: Frequency domain resource assignment which is indicated based on a size of CORESET 0 if CORESET 0 is configured for the cell or based on a size of initial DL bandwidth part if CORESET 0 is not configured for the cell; Time domain resource assignment; VRB-to-PRB mapping; Modulation and coding scheme; Transport Block (TB) scaling; LSBs of SFN; and/or Reserved bits.

Figure 19:
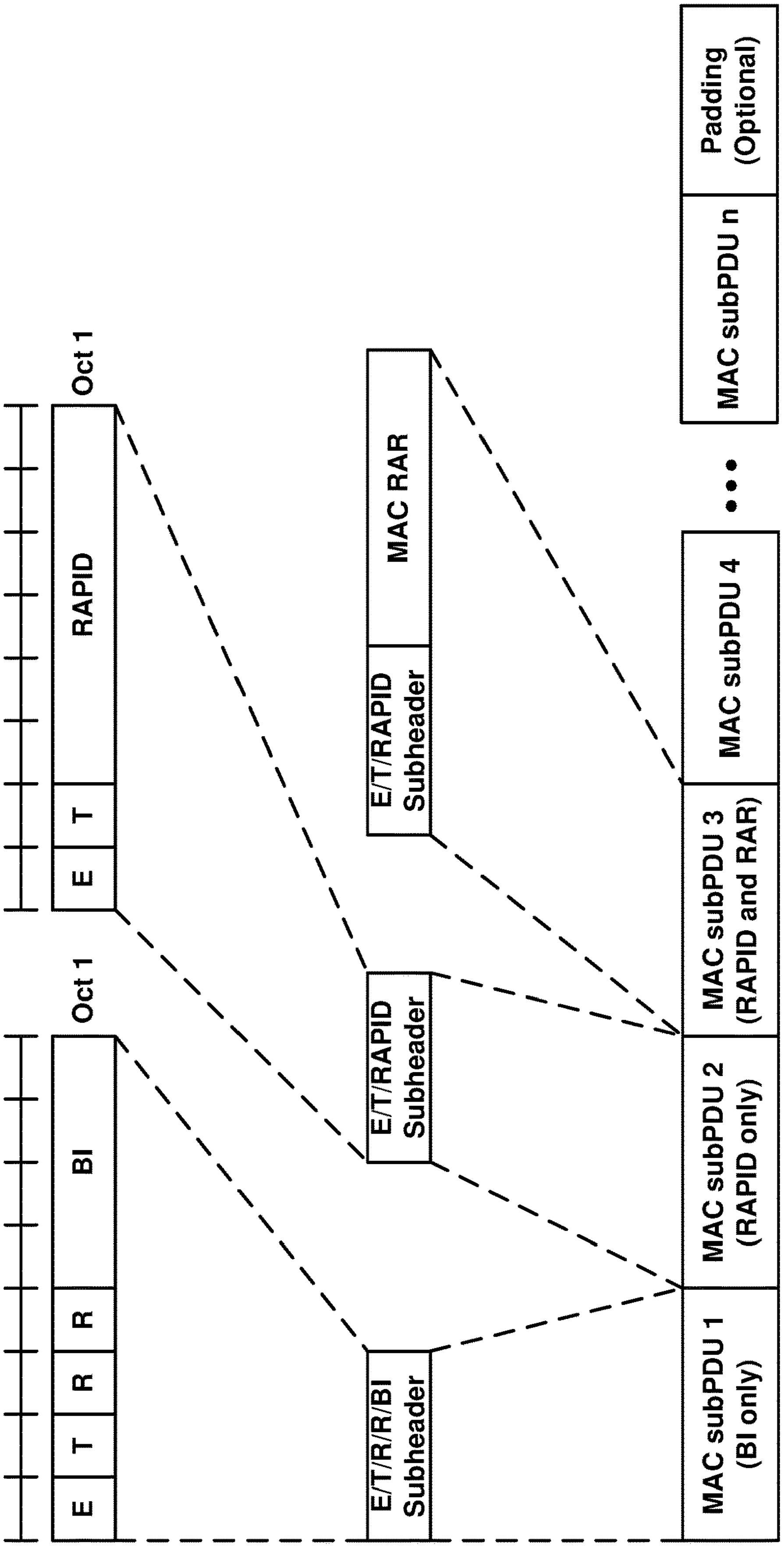
FIG. 19 shows an example of a MAC PDU including MAC RARs, according to some embodiments.

FIG. 19 shows an example of MAC PDU including MAC RARs, according to some embodiments. A MAC PDU may include one or more MAC subPDUs and optionally padding. Each MAC subPDU may include one of the following: a MAC subheader with Backoff Indicator only; a MAC subheader with RAPID only (e.g. acknowledgment for SI request); or a MAC subheader with random access preamble ID (RAPID) and MAC RAR. As shown in FIG. 19, a MAC subheader with Backoff Indicator may include five header fields E/T/R/R/BI. A MAC subPDU with Backoff Indicator only is placed at the beginning of the MAC PDU, if included. 'MAC subPDU(s) with RAPID only' and 'MAC subPDU(s) with RAPID and MAC RAR' may be placed anywhere between MAC subPDU with Backoff Indicator only (if any) and padding (if any). A MAC subheader with RAPID may include three header fields E/T/RAPID as shown in FIG. 19. Padding may be placed at the end of the MAC PDU if present. Presence and length of padding may be implicit based on TB size, and/or size of MAC subPDU(s).

The MAC subheader for RAR may include the following fields. E: The Extension field may be a flag indicating if the MAC subPDU including this MAC subheader is a last MAC subPDU or not in the MAC PDU. The E field may be set to "1" to indicate at least another MAC subPDU follows. The E field may be set to "0" to indicate that the MAC subPDU including this MAC subheader is the last MAC subPDU in the MAC PDU. T: The Type field may be a flag indicating whether the MAC subheader contains a Random Access Preamble ID or a Backoff Indicator. The T field may be set to "0" to indicate the presence of a Backoff Indicator field in the subheader (BI). The T field may be set to "1" to indicate the presence of a Random Access Preamble ID field in the subheader (RAPID). R: Reserved bit (e.g., set to "0"). BI: The Backoff Indicator field may identify the overload condition in the cell. The size of the BI field may be 4 bits. RAPID: The Random Access Preamble IDentifier field may identify the transmitted Random Access Preamble (see clause 5.1.3). The size of the RAPID field may be 6 bits. If the RAPID in the MAC subheader of a MAC subPDU corresponds to one of the Random Access Preambles configured for SI request, MAC RAR may not be included in the MAC subPDU.

FIG. 20A shows an example of a MAC RAR, according to some embodiments. The MAC RAR may be of fixed size as depicted in FIG. 20A, and include the following fields. R: Reserved bit (e.g., set to "0"). Timing Advance Command: The Timing Advance Command field may indicate an index value $T_A$ used to control the amount of timing adjustment that the MAC entity must apply. The size of the Timing Advance Command field may be 12 bits. UL Grant: The Uplink Grant field may indicate the resources to be used on the uplink, as shown in FIG. 20B. The size of the UL Grant field may be 27 bits. Temporary C-RNTI: The Temporary C-RNTI field may indicate the temporary identity that is used by the MAC entity during Random Access. The size of the Temporary C-RNTI field may be 16 bits.

FIG. 20B shows an example of random access response (RAR) uplink grant contents, according to some embodiments. A RAR UL grant may schedule a PUSCH transmission from the UE. Example contents of the RAR UL grant, starting with the MSB and ending with the LSB, are given in Table in FIG. 20B. If the value of the frequency hopping flag is 0, the UE may transmit the PUSCH without frequency hopping; otherwise, the UE may transmit the PUSCH with frequency hopping. The UE may determine the modulation and coding scheme (MCS) of the PUSCH transmission, e.g., from the first sixteen indexes of the applicable MCS index table for PUSCH. The TPC command value may be used for setting the power of the PUSCH transmission. The CSI request field may be reserved. The ChannelAccess-CPext field may indicate a channel access type and CP extension for operation with shared spectrum channel access.

Figure 21:
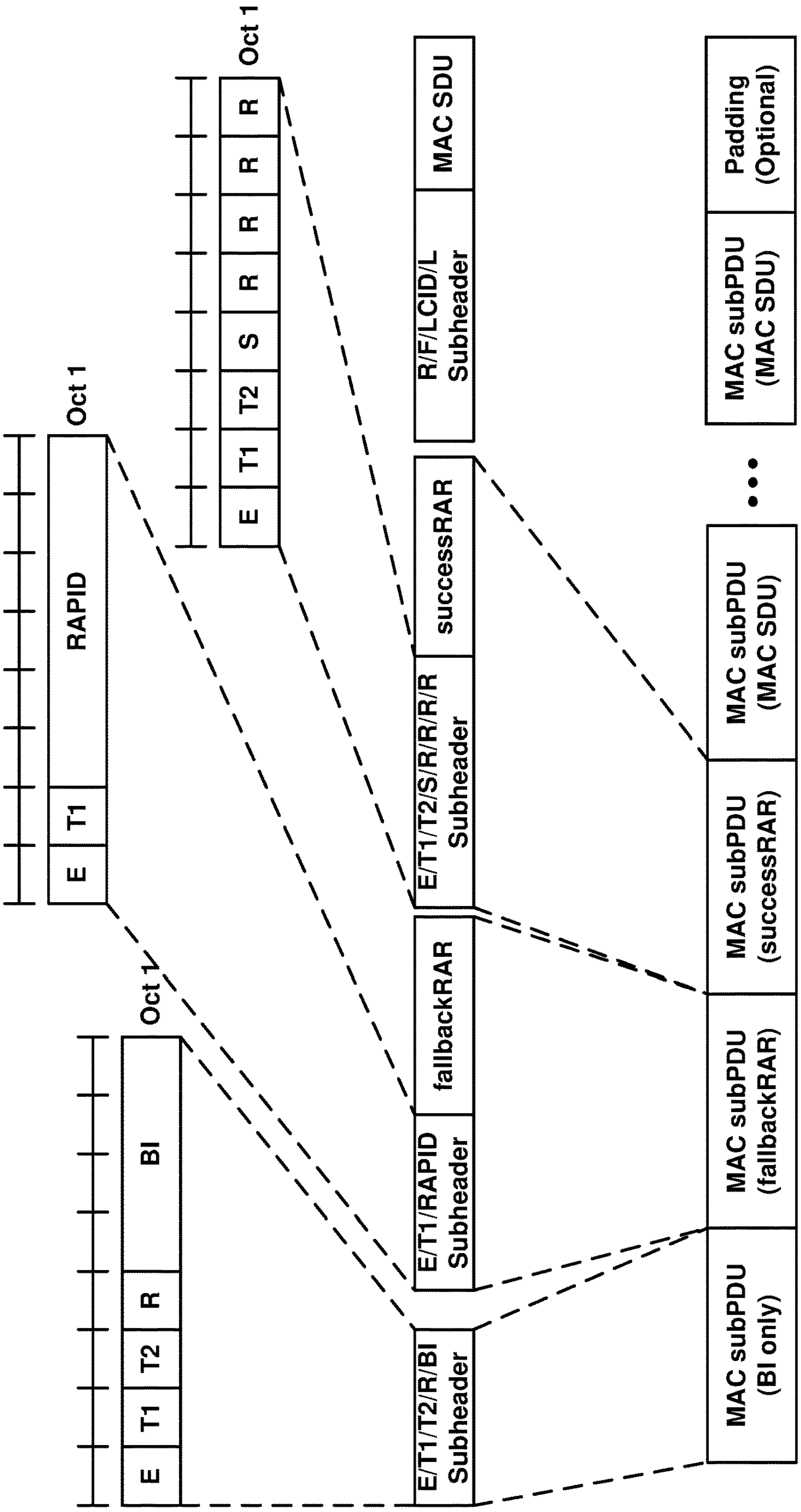
FIG. 21 shows an example of a MsgB MAC PDU, according to some embodiments.

FIG. 21 shows an example of a MsgB MAC PDU, according to some embodiments. A MAC PDU includes one or more MAC subPDUs and optionally padding. Each MAC subPDU MAY includes one of the following: a MAC subheader with Backoff Indicator only; a MAC subheader and fallbackRAR; a MAC subheader and successRAR; a MAC subheader and MAC SDU for CCCH or DCCH; or a MAC subheader and padding. A MAC subheader with Backoff Indicator may include five header fields E/T1/T2/R/BI as shown in FIG. 21. A MAC subPDU with Backoff Indicator only may be placed at the beginning of the MAC PDU, if included. A MAC subheader for fallbackRAR may include three header fields E/T1/RAPID as shown in FIG. 21. A MAC subheader for successRAR may include eight header fields E/T1/T2/S/R/R/R/R as shown in FIG. 21. A MAC subheader for MAC SDU may include the four header fields R/F/LCID/L as shown in FIG. 21. At most one ‘MAC subPDU for successRAR’ indicating presence of ‘MAC subPDU(s) for MAC SDU’ may be included in a MAC PDU. MAC subPDU(s) for MAC SDU may be placed immediately after the ‘MAC subPDU for successRAR’ indicating presence of ‘MAC subPDU(s) for MAC SDU’. If MAC PDU includes MAC subPDU(s) for MAC SDU, the last MAC subPDU for MAC SDU may be placed before MAC subPDU with padding as depicted in FIG. 21. Otherwise, the last MAC subPDU in MAC PDU may be placed before padding. The MAC subPDU with padding may include R/R/LCID MAC subheader. The size of padding in the MAC subPDU with padding can be zero. The length of padding may be implicit based on TB size, and/or size of MAC subPDU(s).

The MAC subheader may include the following fields. E: The Extension field may be a flag indicating if the MAC subPDU including this MAC subheader is a last MAC subPDU (other than MAC subPDU for MAC SDU) or not in the MAC PDU. The E field may be set to “1” to indicate at least another MAC subPDU (other than MAC subPDU for MAC SDU) follows. The E field may be set to “0” to indicate that the MAC subPDU including this MAC subheader is the last MAC subPDU (other than MAC subPDU for MAC SDU) in the MAC PDU. T1: The T1 field may be a flag indicating whether the MAC subheader contains a Random Access Preamble ID or T2. The T1 field is set to “1” to indicate the presence of a Random Access Preamble ID field in the subheader (RAPID). The T1 field is set to “0” to indicate the presence of T2 field in the subheader. T2: The T2 field may be a flag indicating whether the MAC subheader contains a Backoff Indicator (BI) or a MAC SDU indicator (S). The T2 field is set to “0” to indicate the presence of a Backoff Indicator field in the subheader. The T2 field is set to “1” to indicate the presence of the S field in the subheader. S: This field may indicate whether ‘MAC subPDU(s) for MAC SDU’ follow the MAC subPDU including this MAC subheader or not; The S field is set to “1” to indicate presence of ‘MAC subPDU(s) for MAC SDU’. The S field is set to “0” to indicate absence of ‘MAC subPDU(s) for MAC SDU’. R: Reserved bit (e.g., set to “0”). BI: The Backoff Indicator field may identify the overload condition in the cell. RAPID: The Random Access Preamble IDentifier field may identify the transmitted Random Access Preamble.

Figure 22A:
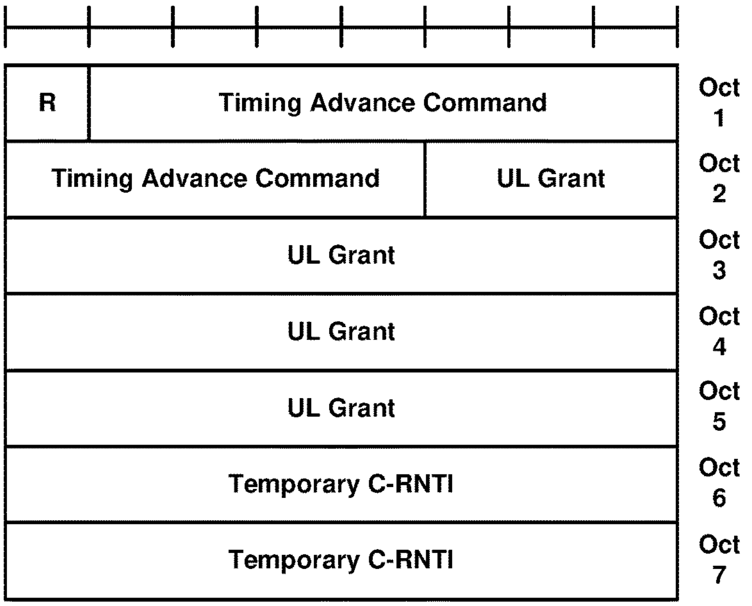
FIG. 22A shows an example of a fallbackRAR, according to some embodiments.

FIG. 22A shows an example of fallbackRAR, according to some embodiments. The fallbackRAR may be of fixed size as depicted in FIG. 22A, and include the following fields. R: Reserved bit (e.g., set to “0”). Timing Advance Command: The Timing Advance Command field may indicate an index value $T_A$ used to control the amount of timing adjustment that the MAC entity must apply. The size of the Timing Advance Command field may be 12 bits. UL Grant: The Uplink Grant field may indicate the resources to be used on the uplink, as shown in FIG. 20B. The size of the UL Grant field may be 27 bits. Temporary C-RNTI: The Temporary C-RNTI field may indicate the temporary identity that is used by the MAC entity during Random Access. The size of the Temporary C-RNTI field may be 16 bits.

Figure 22B:
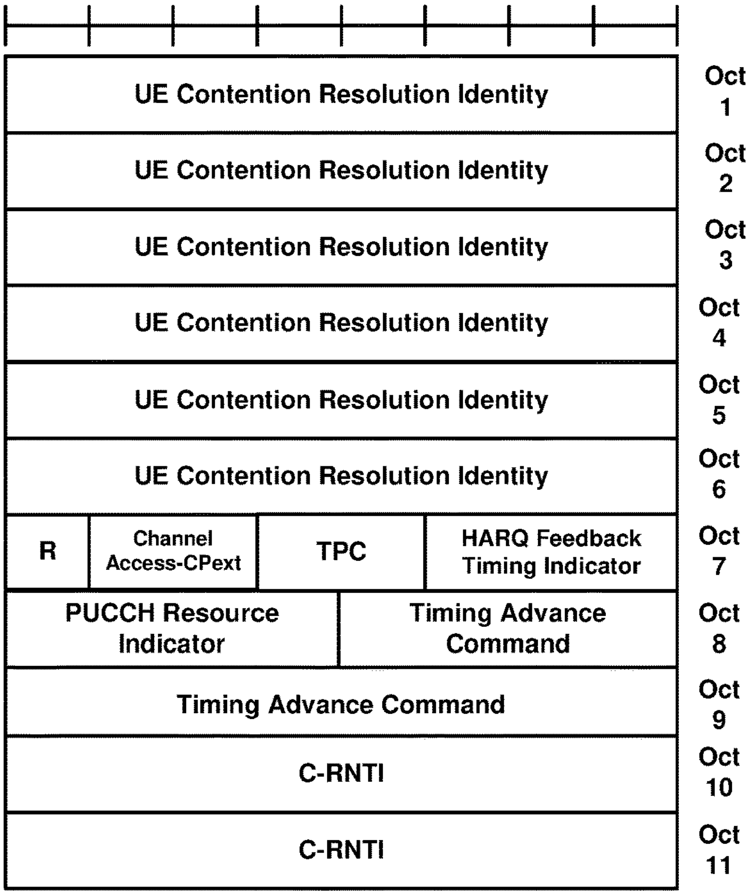
FIG. 22B shows an example of a successRAR, according to some embodiments.

FIG. 22B shows an example of successRAR, according to some embodiments. The successRAR may be of fixed size, and include the following fields. UE Contention Resolution Identity: This field may contain the UL CCCH SDU. If the UL CCCH SDU is longer than 48 bits, this field contains the first 48 bits of the UL CCCH SDU. R: Reserved bit (e.g., set to “0”). ChannelAccess-CPext: The channel access type and CP extension for the PUCCH resource containing the HARQ feedback for MSGB in shared spectrum channel access. The field may only be present when the MSGB HARQ feedback is to be transmitted with shared spectrum channel access. Otherwise, the field may not be present and R bits are present instead. The size of the ChannelAccess-CPext field may be 2 bits. TPC: The TPC command for the PUCCH resource containing HARQ feedback for MSGB. The size of the TPC field may be 2 bits. HARQ Feedback Timing Indicator: The PDSCH-to-HARQ feedback timing indicator field for MSGB HARQ feedback. The size of the HARQ Feedback Timing Indicator field may be 3 bits. PUCCH Resource Indicator: The PUCCH resource indicator for HARQ feedback for MSGB. The size of the PUCCH resource Indicator field may be 4 bits. Timing Advance Command: The Timing Advance Command field may indicate the index value $T_A$ used to control the amount of timing adjustment that the MAC entity has to apply. The size of the Timing Advance Command field may be 12 bits. C-RNTI: The C-RNTI field indicates the identity that is used by the MAC entity upon completion of Random Access. The size of the C-RNTI field may be 16 bits.

In an example, a network may group (e.g., multiplex) MAC subPDUs comprising random access responses and/or back-off indicators for multiple UEs in a single MAC PDU. A PDSCH (e.g., Msg2/MsgB PDSCH) comprising the MAC subPDUs may be scheduled by a DCI scrambled by RA-RNTI/MsgB-RNTI. MAC subheaders in the MAC PDU may identify the RAPID of the transmitted preambles. For example, multiple UEs may select different preambles while selecting/using the same PRACH occasion for transmitting the preambles. As a result, the RA-RNTI/MsgB-RNTI values associated with the preamble transmission by multiple UEs may be the same. Examples of RNTI calculation for random access response (for 2-step and 4-step RACH) are given below, which are determined based on the physical resources in time and frequency of the RACH occasion used for preamble transmission.

For coverage enhancement, RA-RNTI associated with the PRACH in which the Random Access Preamble is transmitted, is computed as:

$$\text{RA-RNTI}=1+t\_id+10*f\_id+60*(\text{SFN}\_id \bmod (W\,max/10))$$

where t_id may be an index of a first subframe of the specified PRACH (0≤t_id<10), f_id may be an index of the specified PRACH within that subframe, in ascending order of frequency domain (0≤f_id<6), SFN_id may be an index of a first radio frame of the specified PRACH, and Wmax may be 400, maximum possible RAR window size in subframes for UEs in enhanced coverage.

An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

A MsgB-RNTI associated with a PRACH occasion in which a random access preamble is transmitted, may be computed as:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

In an example, a network may not group (e.g., multiplex) MAC subPDUs comprising random access responses and/or back-off indicators for multiple UEs in a single MAC PDU. For example, different characteristic of uplink and/or downlink channels designed for some UEs/UE types in the cell may prevent their RAR/MsgB MAC sub-PDUs to be included in a MAC PDU comprising RAR/MsgB MAC sub-PDUs of other UEs. For example, separate BWPs/channels/RACH resources configured for some UEs/UE types may have different overload/congestion conditions, and thus different back-of indicator values from other UEs in the cell, which may prevent their BI MAC sub-PDUs to be included in a MAC PDU comprising BI MAC sub-PDUs of other UEs.

For example, Reduced Capability (RedCap) UEs may require modified handling of different uplink and/or downlink signals and channels. For example, due to the reduced capability (e.g., reduced supported bandwidth, and/or limited antennas, and/or restricted processing capabilities, and/or prolonged processing time, etc.) the RedCap UE may not be able to effectively use cell-specific resources that have been designed for legacy UEs without those hardware restrictions. For example, RedCap UEs may not be able to support a CORESET and/or search space and/or DL/UL BWP; and/or monitor/receive PDCCH and/or PDSCH; and/or transmit via a PRACH and/or PUSCH and/or PUCCH, that are configured with a bandwidth larger than the maximum supported bandwidth of RedCap (e.g., 20 MHz in FR1 and 100 MHz in FR2). In another example, RedCap UEs may not be able to receive a downlink channel and transmit an uplink channel subsequently wherein the time gap in between is shorter than a relaxed processing time supported by RedCap. In another example, due to limited antennas and/or other restrictions, RedCap UE may not be able to transmit/receive using similar parameters as legacy UEs; for example, coverage recovery techniques may be required for RedCap channels and/or signals for a comparable performance with legacy UEs.

For a RedCap UE in RRC_CONNECTED mode, the network may be able to configure UE-specific parameters and schedule resources in an appropriate/suitable way for the specific RedCap restriction/reduced capabilities. However, during initial access, it may not be as simple, because the resources and/or parameters are not UE-specific, but common (e.g., cell-specific and/or group-specific). For example, broadcast PDSCH (SIB), common CORESET #0, RA search space, common PRACH/Msg1/MsgA resources, Msg2/MsgB PDCCH/PDSCH, Msg3 PUSCH, Msg4 PDCCH/PDSCH, etc., configured for legacy UEs may not be supportable by RedCap UEs. Network may have to configure separate parameters/resources/channels for RedCap and/or modify legacy configurations/channels such that RedCap UEs can also support them. For example, network may limit a bandwidth of initial DL/UL BWPs and/or CORESET #0 and/or common PRACH/PDCCH/PDSCH/PUSCH/PUSCH resources. For example, the network may schedule transmissions and receptions via common channels during initial access with relaxed timing and/or coverage recovery techniques. However, this may dramatically degrade a performance of legacy UEs. For example, a data rate of legacy UEs may drop and/or their latency and/or power consumption may significantly increase. Also, a congestion in common BWPs/channels may be increased considering the increased number of UEs (legacy plus RedCap) and the enforced restrictions on resources.

In a cell supporting RedCap UEs, early identification of RedCap UEs from legacy UEs may be desired for the network to differentiate/tailor one or more configuration parameters and/or resources for RedCap signals and channels during initial access. Identification of RedCap UEs may be done during Msg1 (PRACH) transmission. The options may comprise separate initial UL BWP, and/or separate PRACH resources, and/or PRACH preamble partitioning. Early identification of RedCap UE type(s) during transmission of Msg1 may be necessary for: coverage recovery (including link adaptation) for one or more of: Msg2 PDCCH/PDSCH, Msg3 PUSCH and PDCCH scheduling Msg3 reTx, Msg4 PDCCH/PDSCH or PUCCH in response to Msg4, Msg5 PUSCH and associated PDCCH (e.g., if it is determined that coverage recovery for RedCap UEs is necessary for one of more of these channels); identifying UE minimum processing times capabilities for PDSCH processing and PUSCH preparation (e.g., if relaxations to UE min processing times are defined for N1 and N2); identifying UE capability for UL modulation order for Msg3 and Msg5 scheduling (e.g., if relaxations to max UL modulation order (i.e., UL modulation order restricted to lower than 64QAM) are introduced); or identifying UE max bandwidth capability for Msg3 and Msg5 scheduling and PUCCH in response to Msg4.

Identification of RedCap UE type(s) during transmission of Msg1 may enable efficient handling of different UE minimum processing times between RedCap and non-RedCap UEs for: minimum timing between PDSCH carrying RAR and start of Msg3 PUSCH; minimum timing between PDSCH carrying Msg4 and the corresponding HARQ-ACK feedback; minimum timing between PDCCH with the reTx grant and the corresponding Msg3 PUSCH retransmission, e.g., if relaxed UE min processing times are introduced for RedCap UEs. Identification of RedCap UE type(s) during transmission of Msg1 may enable coverage recovery, including link adaptation, for any one or more of: broadcast PDCCH, PDSCH associated with Msg2, PDSCH associated with Msg4, or PUSCH associated with Msg3, e.g., if coverage recovery is needed for these channels. The option of configuring separate initial UL BWPs, in addition to the above advantages, may enable addressing congestion (if congestion occurs) in the initial UL BWP that may otherwise need to be restricted to the mandatory required BW for RedCap UEs in the band/FR. As a result of early identification of RedCap UEs, legacy (e.g., non-RedCap) UEs may not suffer restricted configurations and degraded performance.

In an example, a network may identify RedCap UEs during Msg1/MsgA transmission, e.g., based on dedicated preamble and/or dedicated PRACH occasion and/or dedicated initial UL BWP. In an example, the network may not schedule a Msg2/MsgB PDSCH using a same/single DCI for RedCap and non-RedCap UEs. In an example, the network may not group (e.g., multiple) RAR transmissions (e.g., Msg2 or MsgB) of RedCap and non-RedCap UEs in a same/single PDSCH. For example, Msg2/MsgB PDCCH and/or PDSCH for RedCap may require coverage recovery techniques. For example, Msg2/MsgB PDCCH (broadcast PDCCH) of RedCap UEs may require a compact DCI format and/or repetition (e.g., more than non-RedCap repetitions), and/or smaller bandwidth and/or frequency hopping. For example, Msg2/MsgB PDSCH of RedCap UEs may require repetition (e.g., more than non-RedCap UEs) and/or TBS scaling and/or smaller bandwidth and/or frequency hopping. As described above, these RedCap UEs may require such modifications due to reduced hardware capabilities as compared to UEs having full NR capabilities (e.g., such as eMBB and URLLC device type).

In an example, network may not use a same/single MAC subPDU to for indicating back-off indicator and/or RAR to RedCap and non-RedCap UEs. For example, the content of the MAC subPDU for RedCap UEs may not be the same as those for non-RedCap UEs. For example, a BI value for RedCap may be different. For example, timing advance command and/or UL grant for RedCap may be different (e.g., following different scheduling criteria). For example, RedCap UEs may require longer PDSCH processing and/or PUSCH preparation time for Msg3 transmission. For example, the frequency resource allocation for RedCap Msg3 PUSCH may follow a restricted bandwidth (e.g., with and/or without hopping). For example, Msg3 PUSCH for a RedCap UE may require more numbers of repetitions than non-RedCap a UE.

Supporting the requirements for RedCap UE may enable/enhance initial access of these UEs. Separating one or more configurations and/or channels for RedCap UEs during initial access may avoid degrading the non-RedCap UE performance due to the RedCap restrictions. There is a need to enable effective separation of one or more initial access resources for receiving random access response to an identified RedCap UE. The present disclosure provides one or more solutions for partitioning radio resources of RedCap UE from non-RedCap UE to enable receiving dedicated random access response and/or back-off indicator that is designed for/addressed to one or more RedCap UEs.

One or more UE types/categories may be defined for wireless devices. The one or more UE types/categories may be defined based on an operating frequency band and/or one or more capabilities of the UE. The one or more capabilities may comprise: reduced bandwidth; reduced antennas; relaxed processing time; restricted processing capabilities such as modulation and coding capability, etc. A UE type/category may be associated with one or more of the capabilities considered for RedCap devices, and/or one or more enhancements considered for coverage recovery/enhancement and/or small data transmission and/or a combination thereof. A first capability associated with a UE type/category may be mandatory for RedCap UEs. A second capability associated with a UE type/category may be optional for RedCap UEs. A third capability associated with a UE type/category may be mandatory for legacy UEs. A fourth capability associated with a UE type/category may be optional for legacy UEs.

Throughout this disclosure, a "first type of UE" and/or a "first-type UE" may refer to RedCap UE and/or NR-Light (NR-lite) and/or enhanced UE (e.g., supporting coverage enhancement). For example, proposals for "RedCap UE" may be applied to other types of special UEs (e.g., as opposed to legacy/non-RedCap/non-enhanced UEs of NR Rel. 16 and before), for example, to an "enhanced UE" and/or UEs supporting small data transmission, etc. In an example, an enhanced UE may require separate signaling/design from legacy UEs to enable use of the enhanced features (e.g., higher data rates, power, processing capabilities, etc.). In an example, being a first-type UE may refer to a use case scenario of the wireless device. For example, an eMBB, URLLC, NR-Light, eMTC, mMTC, or NB-IoT device may have different capabilities and may be associated with different UE types/categories.

Based on existing technologies, a base station may configure at least one separate/additional initial DL BWP for first type UEs (e.g. RedCap UEs). For example, the base station may transmit (e.g., broadcast) one or more RRC messages (e.g., SIB) to wireless device in a cell, comprising first type UEs and second type UEs (e.g., legacy UEs). The one or more RRC messages may indicate/configure a first initial DL BWP for first type UEs and a second initial DL BWP for second type UEs. The separate/additional initial DL BWP may have a bandwidth less than or equal to a first value (e.g., a RedCap supported bandwidth capability of: 20 MHz in FR1 and 100 MHz in FR2), whereas the second BWP (e.g., for legacy UEs) may have a bandwidth greater than the first value. The separate/additional initial DL BWP may or may not overlap with legacy (e.g., non-RedCap/non-enhanced) initial DL BWP. The initial UL BWP of the first type UEs may or may not be separated. In an example, base station may configure separate/additional CORESET(s) and/or search space(s) for the first type UEs. A separate initial DL BWP/CORESET may address congestion in the legacy/non-RedCap initial DL BWP/CORESET (e.g., for the second type UEs), however, a base station overhead for configuring and maintenance of the additional BWP/CORESET may be increased.

In an example, a first type UE may transmit a preamble via a first PRACH occasion, indicating the UE identity (e.g., as RedCap UE) and/or the associated capability(ies)/enhancements. In an example, a legacy UE (e.g., a second type UE) may transmit a preamble via a second PRACH occasion. The second PRACH occasion may be the first PRACH occasion. The base station may transmit a first DCI for the first type UE via a PDCCH monitoring occasion associated with a search space (e.g., ra-SearchSpace) in the first (separate/additional) initial DL BWP. The base station may transmit a second DCI for the second (e.g., legacy) UE via a PDCCH monitoring occasion associated with a search space (e.g., ra-SearchSpace) in the second (legacy) initial DL BWP. If the initial DL BWP(s) and the search spaces of the first type UEs do not overlap with those of second type (e.g., legacy) UEs, then separate DCIs scheduling separate Msg2/MsgB PDSCH for the first type UE may be feasible based on the search space partitioning. However, if the initial DL BWP(s) and/or the search spaces of the first type UEs overlap/are shared/common with those of second type UEs, then the first DCI scheduling Msg2/MsgB PDSCH for the first type UE may collide with the second DCI scheduling Msg2/MsgB PDSCHs for the second type (e.g., legacy) UE. For example, DCI collision may happen if the RA-RNTI/MsgB-RNTI values associated with the first PRACH occasion and the second PRACH occasion are the same. In that case, e.g. RA-RNTI/MsgB-RNTI collision, the first type UE and the second type UE may not be able to detect a respective DCI correctly.

One or more embodiments may provide an improved design for first type UE initial access, and more specifically, random access response reception, such that a dedicated signaling based on the respective features of the UE is enabled, while a signal collision with legacy UEs is avoided.

In an example, to enable separate random access response and/or back-off indicator reception for first type UEs, the network may divide/partition one or more CORESETs and/or associated search spaces between the first type UEs and the second type UEs. For example, a base station may transmit one or more RRC messages (e.g., SIB) to the first type UEs and/or the second type UEs of a cell. The one or more RRC messages may comprise configuration parameters of a cell. The one or more RRC messages may indicate: an initial DL BWP; and/or one or more CORESETs of the initial DL BWP. In an example, at least two CORESETs may be configured in an initial DL BWP. A first CORESET may be for/associated with the second type (e.g., legacy) UEs and a second CORESET may be for/associated with the first-type UEs. In an example, radio resources of a CORESET may be divided/partitioned between second type UEs and first type UEs.

For example, frequency domain resources of the CORESET may comprise at least two sets of frequency domain resources (RBs). For example, a first parameter (e.g., bitmap) may indicate one or more first RBs for a first subset of the CORESET, and a second parameter (e.g., a second bitmap) may indicate one or more second RBs for a second subset of the CORESET. For example, the one or more second RBs may be a subset of one or more first RBs. For example, the one or more first RBs and the one or more second RBs may be disjoint. In an example, the wireless device may determine the one or more second RBs based on a predefined rule, e.g., a first portion of the RBs of the CORESET, and/or a portion of the duration of the CORESET, e.g., based on one or more offsets. In an example, the one or more second RBs may have a second CCE to REG mapping. For example, the first subset of the CORESET may be for/associated with legacy UEs, and the second subset of the CORESET may be for/associated with the first type UEs.

For example, a search space may be configured for/associated with the CORESET. The legacy UEs may monitor one or more first monitoring occasions of the search space that overlap with and/or are associated with the first subset of the CORESET. The first type UEs may monitor one or more second monitoring occasions of the search space that overlap with and/or are associated with the second subset of the CORESET. In an example, a first search space may be associated with the first subset of the CORESET and a second search space may be associated with the second subset of the CORESET. For example, one or more parameters may indicate an association of a search space with a subset of the CORESET. For example, an association of one or more search spaces with one or more subsets of a CORESET may be based on a rule (e.g., in increasing order of ID and/or index of starting RB, etc.). In an example, if the second subset of CORESET is not configured, the second search space may be associated with the (entire) CORESET and/or the first subset of the CORESET.

The one or more RRC messages may comprise configuration parameters of at least one search space associated with a first CORESET (e.g., ra-SearchSpace). For example, a first search space may be configured for/dedicated to legacy UEs (e.g., ra-SearchSpace), and/or a second search space may be configured for/dedicated to the first type UEs (e.g., ra-SearchSpace-FirstType, ra-SearchSpace-RedCap, ra-SearchSpace-CE, etc.). For example, monitoring occasions of the first search space and the second search space may not overlap/be shared. In an example, if second search space is not configured in the initial DL BWP, the first type UEs may use the first search space, e.g., monitor PDCCH candidates of the first search space.

In response to receiving a first preamble from a legacy UE, the base station may transmit a first DCI scheduling Msg2/MsgB in one or more first monitoring occasions of the first search space. The legacy UE may monitor the one or more first monitoring occasions of the first search space to receive the first DCI with CRC scrambled by a first RNTI (e.g., RA-RNTI/MsgB-RNTI). The first RNTI may be calculated based on a first PRACH occasion used by the legacy UE for transmitting the first preamble. In response to receiving a second preamble from a first type UE, the base station may transmit a second DCI scheduling Msg2/MsgB in one or more second monitoring occasions of the second search space. The first type UE may monitor the one or more second monitoring occasions of the second search space to receive the second DCI with CRC scrambled by a second RNTI (e.g., RA-RNTI/MsgB-RNTI). The second RNTI may be calculated based on a second PRACH occasion used by the first type UE for transmitting the second preamble. In an example, the first RNTI and the second RNTI may have same values. For example, the first PRACH occasion and the second PRACH occasion may be the same. However, since the one or more first monitoring occasions of the first search space are separate from/do not overlap with the one or more second monitoring occasions of the second search space, the first DCI and the second DCI can be transmitted successfully (e.g., without collision) via the separate/non-overlapping radio resources.

In an example, the one or more RRC messages may comprise configuration parameters of a search space, indicating at least two sets of monitoring occasions (e.g., PDCCH candidates) associated with the search space. For example, the search space may comprise at least two sets of PDCCH monitoring occasions. A first set of monitoring occasions of the search space may be configured for legacy UEs, and/or a second set of monitoring occasions of the search space may be configured for first type UEs. In an example, wireless devices may determine division/partitioning of monitoring occasions of the search space based on a rule. For example, a first type UE may determine a first portion of the monitoring occasions (e.g., in time and/or frequency domain) comprising the second set of monitoring occasions. For example, the configuration parameters may indicate a division/partitioning of the (entire) monitoring occasions of the search space. For example, the configuration parameters may comprise/indicate at least two monitoring slot periodicity and offset values, each for a set of monitoring occasions. For example, the configuration parameters may comprise/indicate at least two durations. For example, a first duration may be for a first set of monitoring occasions, and a second duration may be for a second set of monitoring occasions. For example, the at least two durations may be consecutive durations that start based on a same periodicity and offset. For example, the configuration parameters may comprise/indicate at least two sets of monitoring symbols within a slot: a first set of symbols for a first set of monitoring occasions and/or a second set of symbols for a second set of monitoring occasions. In an example, the configuration parameters may comprise/indicate at least two values for number of PDCCH candidates per aggregation level (AL): a first value for a first number of candidates per AL for/associated with the first set of monitoring occasion, and/or a second value for a second number of candidates per AL for/associated with the second set of monitoring occasions. For example, a legacy UE may monitor the first set of monitoring occasions and a first-type UE (e.g., RedCap or enhanced UE) may monitor the second set of monitoring occasions, e.g., for receiving DCI scheduling Msg2/MsgB. For example, a bandwidth of the second set may be compatible with a bandwidth requirement of first type UEs. For example, processing requirements of the second set (e.g., MCS, TBS, etc.) may be compatible with processing capabilities of first type UEs.

Figure 23:
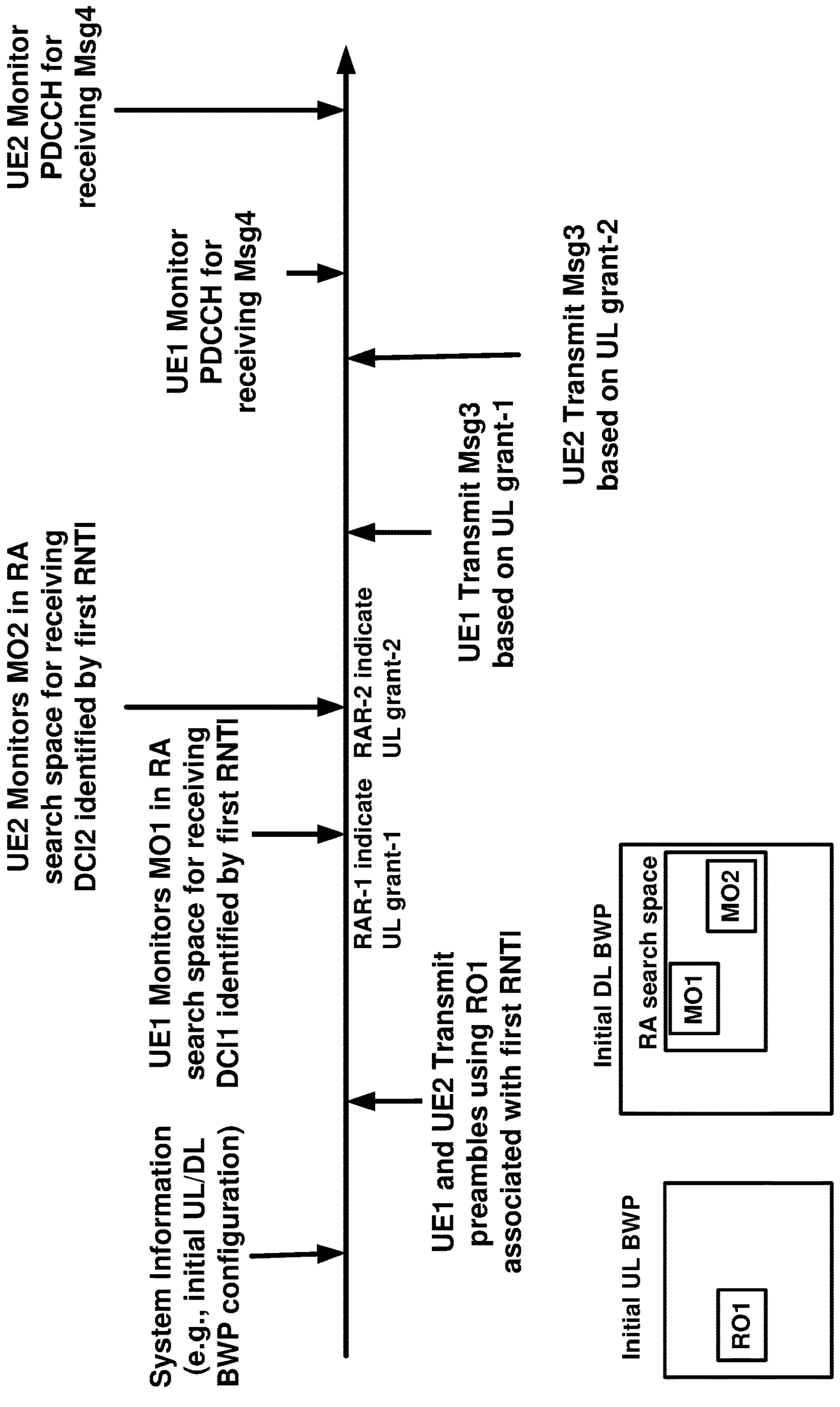
FIG. 23 shows an example of random access response reception for two types of UEs, according to some embodiments.

FIG. 23 shows an example of random access response reception for two types of UEs, according to some embodiments. UE1 may be a legacy UE and UE2 may be a first type UE (e.g., RedCap and/or enhanced UE). The base station (BS) transmits RRC message(s) comprising system information (e.g., SIB1) to UE1 and UE2. The system information may indicate an initial UL BWP and an initial DL BWP for both UEs. Configuration parameters of the system information may indicate a first RACH occasion (RO1) in the initial UL BWP. RO1 may be associated with a first RNTI (E.g., RA-RNTI and/or MsgB-RNTI). The configuration parameters may indicate at least two preambles/preamble formats associated with RO1. For example, configuration parameters may comprise a first preamble index/group/format for legacy UEs access associated with RO1. For example, configuration parameters may comprise a second preamble index/group/format for first type UEs access associated with RO1. UE1 may transmit a first preamble based on the first preamble index/group/format via RO1. UE2 may transmit a second preamble based on the second preamble index/group/format. The second preamble may indicate a type and/or capability(ies) of UE2. For example, based on the second preamble, the BS may determine that UE2 is a first type UE (e.g., identify UE2).

UE1 and UE2 may determine a value of the first RNTI based on time and frequency resources of RO1. Configuration parameters may indicate a search space in the initial DL BWP, e.g., random access search space. The search space may comprise one or more first monitoring occasions (MOs) and one or more second monitoring occasions. For example, the one or more second monitoring occasions may be dedicated to first type UEs. UE1 may determine the one or more first monitoring occasions (e.g., MO1) of the search space for receiving a first DCI, e.g., based on one or more parameters in the system information and/or one or more predefined rules/parameters. UE2 may determine the one or more second monitoring occasions (e.g., MO2) of the search space for receiving a second DCI, e.g., based on one or more parameters in the system information and/or one or more predefined rules/parameters.

As shown in FIG. 23, UE1 may receive DCI1 from MO1 of the search space. DCI1 may schedule a PDSCH-1 comprising RAR1/MsgB1 and/or BI1, e.g., for legacy UEs. In an example, PDSCH-1 may comprise UL grant-1 for Msg3 transmission, e.g., for legacy UEs. In an example, PDSCH-1 may comprise a fallback RAR comprising UL grant-1 for Msg3 transmission, e.g., for legacy UEs. UE1 may transmit Msg3 using the UL grant-1, and monitor PDCCH for receiving a corresponding Msg4. In an example, PDSCH-1 may comprise a success RAR indicating a first PUCCH resource, e.g., for legacy UEs. UE1 may transmit a HARQ feedback associated with PDSCH-1.

As shown in FIG. 23, UE2 may receive DCI2 from MO2 of the search space. DCI2 may schedule a PDSCH-2 comprising RAR2/MsgB2 and/or BI2, e.g., for first type UEs. In an example, PDSCH-2 may comprise UL grant-2 for Msg3 transmission, e.g., for first type UEs. In an example, PDSCH-2 may comprise a fallback RAR comprising UL grant-2 for Msg3 transmission, e.g., for first type UEs. For example, a second time offset from PDSCH-2 to a PUSCH-2 indicated by UL grant-2 for Msg3 transmission may be larger than a first time offset from PDSCH-1 to a PUSCH-1 indicated by UL grant-1 for Msg3 transmission (e.g., compatible with relaxed processing time of first type UEs). For example, a second bandwidth of PUSCH-2 may be smaller than a first bandwidth of PUSCH-1, e.g., for supporting a first type UE bandwidth restriction. For example, PDSCH-2 and/or PUSCH-2 and/or PDCCH-2 comprising DCI2 may be scheduled with one or more link adaptation techniques to compensate for one or more limitations/enhancements of first type UEs. UE2 may transmit Msg3 using the UL grant-2, and monitor PDCCH for receiving a corresponding Msg4. In an example, PDSCH-2 may comprise a success RAR indicating a second PUCCH resource, e.g., for first type UEs. UE2 may transmit a HARQ feedback associated with PDSCH-2. For example, a second time offset from Msg4/MsgB PDSCH-2 to a PUCCH-2 for UE2 may be larger than a first time offset from Msg4/MsgB PDSCH-1 to a PUCCH-1 for UE1 (e.g., compatible with relaxed processing time of first type UEs).

As shown in FIG. 23, configuring separate/additional/non-overlapping search spaces and/or PDCCH monitoring occasions for first type UEs may enable separate/dedicated signaling and/or handling of the random access procedure for the first type UEs, and thus, improving an initial access of legacy UEs and/or first type UEs. For example, collision of DCIs scheduling separate random access responses for legacy UEs and first type UEs, wherein the DCIs are scrambled by a same RNTI, may be avoided. However, this option may result in increased DL overhead and complexity as well as limiting available resources for legacy and/or first type UEs.

Embodiments may enable separation of one or more channels/signals for dedicated and efficient handling of random access procedure for first type UEs. One or more embodiments may avoid increased complexity and shortage of radio resources for legacy and/or first type UEs.

RACH partitioning may be considered for early identification of multiple new and/or different features, such as RedCap, Small Data Transmission (SDT), coverage enhancement, and slicing. For example, RRC/SIB1 may configure a first RACH configuration for RedCap to indicate reduced capabilities to the network in MSG1 so that the network can adapt subsequent transmissions. For example, RRC/SIB1 may configure a second RACH configuration for SDT to enable the UE to request a larger MSG3 size (or MSGA size in case of 2-step RA). For example, RRC/SIB1 may configure a third RACH configuration for coverage enhancement to enable the UE to indicate need for coverage enhancement (esp. for request of MSG3 repetition). For example, RRC/SIB1 may configure a fourth RACH configuration for slicing to indicate high priority slice to the network and to achieve slice isolation also for RACH.

This approach increases the number of separate RACH configurations for different emerging features and may increase the RA-RNTI/MsgB-RNTI collision problem, as the likelihood that different ROs from different RACH configurations are mapped to the same RA-RNTI/MsgB-RNTI is increased (for example, all parameters/indexes of the ROs in the RA-RNTI/MsgB-RNTI formula have the same value).

RNTI collision may lead to a UE ending up decoding and interpreting a RAR/MsgB that was not directed to it. For example, in case an RNTI collision happens, a UE decodes a RAR that was directed to another UE, assuming that it is able to decode this RAR it will then send a Msg3 in the same resources as the second UE. The problem is more relevant if the RAR received is carrying different information, or information that were not expected by the UE. For instance, in case of Coverage Enhancement, the RAR would likely carry the number of repetitions to apply in Msg3. A UE that does not support Coverage Enhancement would not be able to interpret this RAR correctly.

One approach to address the increased likelihood of collisions may be to configure a gNB to avoid a PRACH configuration that leads to time-aligned ROs so that all RNTIs generated are always distinct. This approach, however, would be complicated to implement and would considerably reduce the system flexibility. On the other hand, the RNTIs not used by one PRACH configuration might be re-used by the additional PRACH configurations. The gNB may need to be configured to avoid RNTI collision by moving the RNTIs along the available address space in a coherent way. For example, the additional PRACH configurations can use the RNTI addresses that are not used by the legacy PRACH configuration in that specific scenario. Embodiments enable having an additional custom RNTI offset associated to the additional PRACH configurations in RRC signaling.

In an example, a base station may transmit a RRC message (e.g., SIB) comprising configuration parameters of an initial DL BWP, and one or more search spaces in the initial DL BWP. The one or more search spaces may comprise a random access search space. The initial DL BWP and/or the RA search space may be common/shared for legacy UEs and first type UEs. The base station may transmit separate DCIs, e.g., scheduling random access responses for legacy UEs and first type UEs. However, with shared/common PDCCH monitoring occasions, a first UE may not be capable of determining whether the DCI is directed to the first UE. To avoid blind decoding of two or more DCI formats scrambled by a same RNTI in a common search space, a separation of RNTIs (e.g., RA-RNTI and/or MsgB-RNTI) may be needed for first type UEs. However, an allowed range of RNTI values is limited. Also, existing technologies do not differentiate the RNTI used for receiving random access response based on a UE type/capability and the random access type (e.g. 2-step RACH and 4-step RACH) at the same time. For example, based on existing technologies, RA-RNTI and/or MsgB-RNTI of first type UEs and legacy UEs may overlap and thus the RAR reception and the random access procedure may fail or be delayed. For example, based on existing technologies, the RA-RNTI of first type UEs and legacy UEs may be partitioned (e.g., based on an offset), however, the RA-RNTI of first type UEs may collide with MsgB-RNTI of legacy UEs. In some embodiments, to address possible collision problems, a new definition of RA-RNTI and MsgB-RNTI for first type UEs may be needed that: avoids collision with either of legacy RNTIs, stays within the allowed range of RNTI, and also, does not require legacy UEs to decode Msg2/MsgB intended for first type UEs.

In an example, depending on the early identification method of first type UEs, the RNTI separation may be different. An efficient separation of RA-RNTIs and/or MsgB-RNTIs is desired. For example, it may be desired to consider the separate/dedicated resources allocated to first type UE in designing the separate RA-RNTI/MsgB-RNTI formula.

In an example, a base station may transmit one or more RRC messages (e.g., SIB) to legacy UEs and first type UEs of a cell. The one or more RRC messages may comprise configuration parameters of two or more initial UL BWPs of the cell. For example, a first UE (e.g., legacy UE) may receive a first RRC message (e.g., first SIB1) indicating/configuring a first initial UL BWP. The first initial UL BWP may be for legacy UE access and/or communication. The first RRC message may comprise first configuration parameters indicating: first random access channel (RACH) resources/occasions (e.g., 2-step RACH and/or 4-step RACH) in the first initial UL BWP; and/or first preambles (e.g., preamble format(s) and/or preamble group(s) and/or preamble indexes) for random access via the first RACH resources/occasions; and/or first PUSCH resources associated with the first RACH resources/occasions and/or first preambles in the first initial UL BWP (e.g., MsgA PUSCH resources and/or Msg3 PUSCH resources).

A second UE (e.g., a first type UE, RedCap UE, enhanced UE, etc.) may receive a second RRC message (e.g., a second SIB1) indicating/configuring a second initial UL BWP. The second RRC message may be the first RRC message. The second initial UL BWP may be dedicated/appropriate for first type of UEs (e.g., RedCap UEs and/or enhanced UEs supporting coverage enhancement/recovery). The second RRC message may comprise second configuration parameters indicating: second RACH resources/occasions (e.g., 2-step RACH and/or 4-step RACH) in the second initial UL BWP; and/or second preambles (e.g., preamble format(s) and/or preamble group(s) and/or preamble indexes) for random access via the second RACH resources/occasions; and/or second PUSCH resources associated with the second RACH resources/occasions and/or second preambles in the second initial UL BWP (e.g., MsgA PUSCH resources and/or Msg3 PUSCH resources). The first initial UL BWP may or may not overlap with the second initial UL BWP. The first RACH resources/occasions/preambles may or may not overlap with second RACH resources/occasions/preambles. For example, the first RACH resources may comprise one or more RACH occasions, and the second RACH resources may comprise the one or more RACH occasions.

Figure 24:
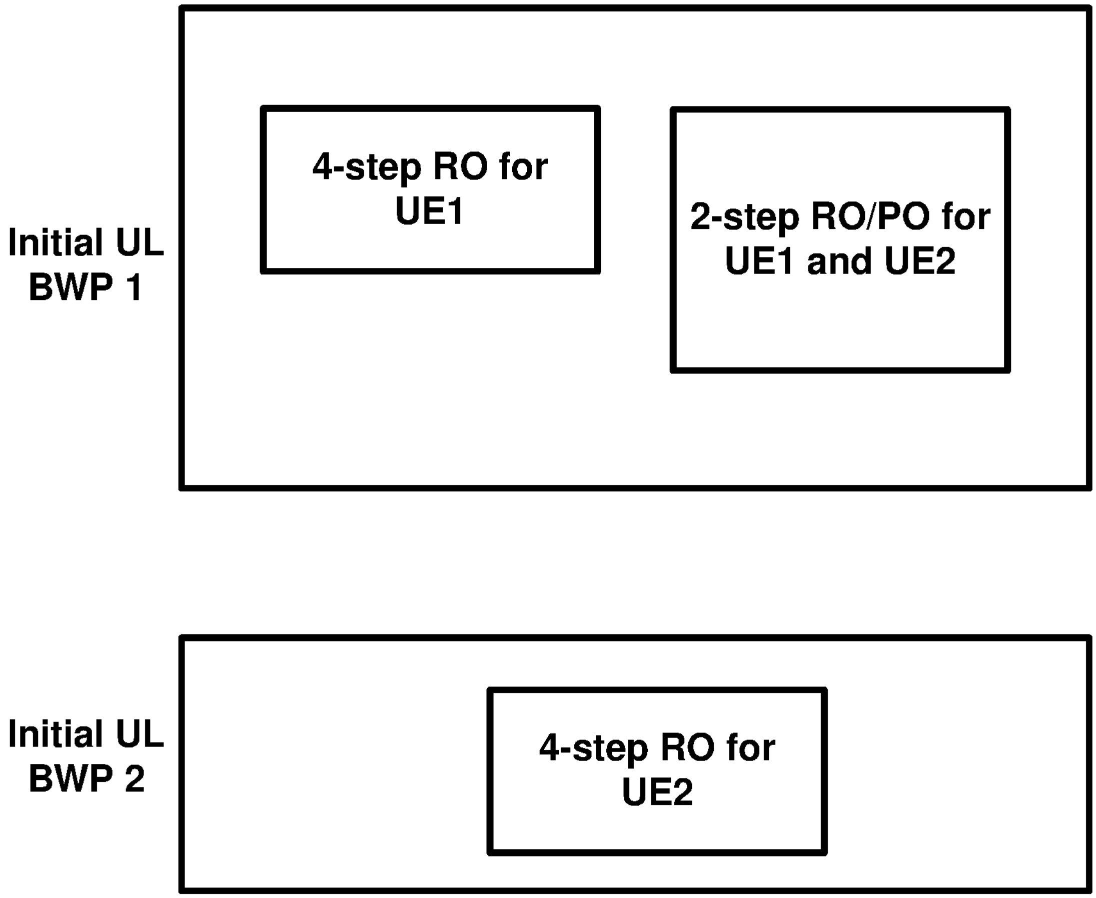
FIG. 24 shows an example of multiple initial UL, according to some embodiments.

FIG. 24 shows an example of multiple initial UL BWPs, according to some embodiments. One or more RRC messages (e.g., SIB) may comprise configuration parameters indicating initial UL BWP-1 and initial UL BWP-2. For example, initial UL BWP-2 may have a first bandwidth (e.g., restricted bandwidth supporting RedCap UEs). Initial UL BWP-1 may be a cell-specific/common/shared BWP, e.g., for legacy UE (UE1) and, if allowed/configured first type UE (UE2). The configuration parameters may indicate RACH resources (e.g., ROs and/or preambles) associated with 4-step RA in the initial UL BWP-1. For example, the configuration parameters may indicate that the 4-step RA resources in the initial UL BWP-1 are for legacy UEs (e.g., UE1). The configuration parameters may indicate RACH ad PUSCH resources associated with 2-step RA (e.g., ROs and/or preambles and/or PUSCH occasions—POs) in the initial UL BWP-1. For example, the configuration parameters may indicate that the 2-step RA resources in the initial UL BWP-1 are for legacy UEs (e.g., UE1) and first type UEs (e.g., UE2). The configuration parameters may indicate second RACH resources associated with 4-step RA in the initial UL BWP-2. For example, the configuration parameters may indicate that the second 4-step RA resources in the initial UL BWP-2 are for first type UEs (e.g., UE2). In an example, it may be a predefined rule that 4-step ROs/RACH resources in each initial UL BWP are dedicated to different types of UEs, while 2-step ROs/RACH resources and/or POs in an initial UL BWP are shared/common between different types of UEs. In an example, a UE may not expect the initial UL BWP-2 to comprise 2-step RACH resources.

In an example, the second UE may receive configuration parameters of the first initial UL BWP and the second initial UL BWP. The second UE may not expect the first initial UL BWP to overlap with the second initial UL BWP. In an example, if the one or more RRC messages do not comprise configuration parameters of a second initial UL BWP, the second UE may not access the cell. In an example, if the one or more RRC messages do not comprise configuration parameters of a second initial UL BWP, the second UE may use the first initial UL BWP to access the cell. In an example, the second UE may use the first initial UL BWP and/or the second initial UL BWP. In an example, the first UE may use the first initial UL BWP and/or the second initial UL BWP. In an example, the first UE may not use the second initial UL BWP. In an example, the first UE may not expect to receive configuration parameters of the second initial UL BWP.

The first UE may receive the first configuration parameters indicating a first initial DL BWP. The first initial DL BWP may comprise a first search space. The second UE may receive the second configuration parameters indicating a second initial DL BWP. The second initial DL BWP may comprise a second search space. The second initial DL BWP may be the first initial DL BWP. The second UE may or may not receive configuration parameters of a second (e.g., separate/additional) initial DL BWP. For example, the second UE may receive configuration parameters indicating the second initial UL BWP if the configuration parameters indicate a second initial DL BWP and/or vice versa. For example, the second UE may not expect to receive configuration parameters of a second initial UL BWP, if it has not received configuration parameters of a second initial DL BWP.

In an example, the first initial DL BWP and the second initial DL BWP may overlap, but the first initial UL BWP and the second initial UL BWP may not overlap. In an example, first RACH occasion and second RACH occasions may not overlap (may be separate), but the first search space and the second search space may overlap. For example, depending on network implementation, a single or multiple initial DL BWPs may be configured. For example, depending on network implementation, a single or multiple initial UL BWPs may be configured.

A differentiation of first type UEs may be based on the physical resources of the second initial UL BWP used for transmitting a preamble. For example, dedicated preamble format/index and/or dedicated/separate RACH occasion may indicate the type/capabilities of UEs. For example, in response to receiving a second (dedicated) preamble format/index the base station may determine that the UE is a first type UE. For example, in response to receiving a preamble via a second (dedicated) RACH occasion the base station may determine that the UE is a first type UE. The second RACH occasion may be in the first initial UL BWP (e.g., shared/common initial UL BWP). The second RACH occasion may be in the second initial UL BWP (e.g., dedicated/separate initial UL BWP). The second RACH occasion may or may not overlap with a first RACH occasion in the first initial UL BWP, e.g., depending on whether dedicated/separate or shared/common preambles are configured for the second RACH resources/second initial UL BWP.

The first UE may transmit a first preamble via a first RO in the first initial UL BWP. The second UE may transmit a second preamble via a second RO in the second initial UL BWP. The base station may identify the type/capability(ies) of the second UE (e.g., first type UE) based on the second preamble and/or the second RO.

Separating of initial UL BWPs for first type UEs may enable configuring appropriate bandwidth and/or SCS and/or TDD/half FDD configuration for the dedicated UL BWP that is compatible with the specific features of the first type UEs. Moreover, a performance of legacy UEs may not be affected by introducing limitations to the initial UL BWP configuration. Also, a congestion in the initial UL BWP may be addressed. Also, for early identification of first type UEs, no PRACH resource partitioning will be needed, which may otherwise reduce/exhaust PRACH capacity of the cell. However, configuration and maintenance of additional initial UL BWPs may increase a complexity and overhead of the base station. Proper configuration and resource allocation in the two or more initial UL BWPs are expected, e.g., such that RACH occasions do not overlap in time and/or frequency domain.

In response to receiving the first preamble, the base station may transmit a first DCI (e.g. legacy DCI for legacy UEs) via a first search space (e.g., RA search space) of the first initial DL BWP. The first DCI may be scrambled by a first RA-RNTI/MsgB-RNTI. The first RA-RNTI/MsgB-RNTI may be determined based on indexes of time resources and frequency/carrier resources of the first RO. In response to receiving the second preamble, the base station may transmit a second DCI (e.g. legacy DCI for legacy UEs) via a second search space (e.g., RA search space) of the second initial DL BWP. The second DCI may be scrambled by a second RA-RNTI/MsgB-RNTI. The second RA-RNTI/MsgB-RNTI may be determined based on indexes of time resources and frequency/carrier resources of the second RO.

In an example, the first initial DL BWP may overlap with the second initial DL BWP. For example, the first search space may overlap (partially or fully) with the second search space. In an example, the first search space may be the second search space. In an example, the indexes of time and frequency and carrier resources of the first RO in the first initial UL BWP may be same as the indexes of time and frequency and carrier resources of the second RO in the second initial UL BWP. For example, first RO may be configured based on first RACH configuration parameters, and may have same indexes in time and frequency and carrier domain as the second RO which may be configured based on second RACH configuration parameters. For example, the first RACH configuration parameters for the first initial UL BWP, and the second RACH configuration parameters for the second initial UL BWP, may comprise similar parameters/values for: s_id (index of a first OFDM symbol of a PRACH occasion) and t_id (index of a first slot of a PRACH occasion in a system frame) and f_id (index of the PRACH occasion in the frequency domain). For example, the parameters of RACH occasion configuration may be BWP-specific, and in different BWPs, the parameters may have same values. For example, the parameters of (e.g., s_id and t_id and f_id ul_carrier_id) the first RO and the second RO may have same values, although in different initial UL BWPs. For example, the first UE may select the first RO with first parameters (e.g., s_id and t_id and f_id ul_carrier_id) in the first initial UL BWP. For example, the second UE may select the second RO with second parameters (e.g., s_id and t_id and f_id ul_carrier_id) in the second initial UL BWP. For example, the first parameters and the second parameters may be the same. For example, the first UE and the second UE may select the same carrier (e.g., NUL or SUL) based on a RSRP measurement. Thus, the RA-RNTI/MsgB-RNTI values associated with the first RO and the second RO may be the same. Thus, the DCIs comprising random access responses of the first UE and the second UE may collide.

FIG. 25 shows an example of RACH occasions in two initial UL BWPs, according to some embodiments. First RACH configuration parameters may indicate first ROs in in the initial UL BWP-1 (e.g., RO-1 to RO-12). The first RACH configuration parameters may indicate: four FDMed ROs (e.g., Msg1-FDM=4); and a first RACH configuration index indicating slot n, and starting symbol 0 for RO-1 to RO-4, and starting symbol m for RO-5 to RO-8 and starting symbol 2m for RO-9 to RO-12. The parameters associated with, for example, RO-5 are as follows: s_id=m, t_id=n, and f_id=0.

As shown in FIG. 25, second RACH configuration parameters may indicate second ROs in in the initial UL BWP-2 (e.g., RO-1 to RO-4). The second RACH configuration parameters may indicate: two FDMed ROs (e.g., Msg1-FDM=2); and a second RACH configuration index indicating slot n, and starting symbol 0 for RO-1 to RO-2, and starting symbol m for RO-3 to RO-4. The parameters associated with, for example, RO-3 are as follows: s_id=m, t_id=n, and f_id=0.

Based on existing technologies, if the uplink carrier of the initial UL BWP-1 and initial UL BWP-2 have the same index (e.g., 0 if both are NUL, and/or 1 if both are SUL), then RA-RNTI and/or the MsgB-RNTI associated with, for example, RO-5 in the initial UL BWP-1 and RO-3 in initial UL BWP-2 may be the same. Although the two ROs may actually have different (non-overlapping) time and frequency resources and/or even different RO index, yet the parameters determining the RA-RNTI and MsgB-RNTI values associated with both of them are equal, and thus, the RA-RNTI and MsgB-RNTI values are equal. Thus, the Msg2/MsgB DCIs addressed to different UEs using RO-5 in initial UL BWP-1 and RO-3 in initial UL BWP-2 may collide. It may not be practical/possible for the base station to avoid such index overlaps, and an efficient solution may be desired.

Embodiments may propose one or more solutions for differentiating the RA-RNTI and/or MsgB-RNTI values associated with ROs configured for first type UEs. The ROs configured for first type UEs may be in the common initial UL BWP. The ROs configured for first type UEs may be in a separate/additional/dedicated UL BWP (e.g., initial UL BWP). In an example, the RA-RNTI formula and/or the MsgB-RNTI formula for the first type UEs may be separated/different from legacy UEs. The new/separate RA-RNTI/MsgB-RNTI formula may consider the dedicated resources defined/configured for the first type UEs for initial access, e.g., separate initial UL BWP and/or separate preamble indexes/formats, etc.

In an example, one or more offsets may be defined for the RA-RNTI/MsgB-RNTI of first type UEs. For example, a maximum range of the legacy RA-RNTI/MsgB-RNTI formula (e.g., 14×80×8×2×2) may be added as an offset to the RA-RNTI/MsgB-RNTI of first type UEs. For example, a first type UE may determine an RA-RNTI/MsgB-RNTI based at least one pre-defined offset. For example, an RRC message may comprise parameters that indicate offset values for the RA-RNTI/MsgB-RNTI of first type UEs. For example, an increase in the range of the RA-RNTI/MsgB-RNTI may be considered that accommodates the new values.

For example, a first type UE may determine an RA-RNTI associated a PRACH occasion as follows:

$$RA\text{-}RNTI = 1 + \text{s\_id} + 14 \times \text{t\_id} \times 80 \times \text{f\_id} + 14 \times 80 \times 8'\text{ul\_carrier\_id} + 14 \times 80 \times 8 \times 2 \times 2$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

For example, a first type UE may determine a MsgB-RNTI associated a PRACH occasion as follows:

$$MSGB\text{-}RNTI = 1 + \text{s\_id} + 14 \times \text{t\_id} + 14 \times 80 \times \text{f\_id} + 14 \times 80 \times 8 \times \text{ul\_carrier\_id} + 14 \times 80 \times 8 \times 2 \times 2 \times 2$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

In an example, a range of indexes for PRACH occasions of first type UEs may be limited. For example, s_id may be an index of a first OFDM symbol of the PRACH occasion (e.g., 0≤s_id<s_1, where s_1<14), t_id may be an index of a first slot of the PRACH occasion in a system frame (e.g., 0≤t_id<t_1, where t_1<80), f_id may be an index of the PRACH occasion in the frequency domain (e.g., 0≤f_id<f_1, where f_1<8). For example, a first type UE may determine an RA-RNTI associated a PRACH occasion as follows:

$$RA\text{-}RNTI = 1 + \text{s\_id} + \text{s\_1} \times \text{t\_id} + \text{s\_1} \times \text{t\_1} \times \text{f\_id}\ \text{s\_1} \times \text{t\_1} \times \text{f\_1} \times \text{ul\_carrier\_id} + 14 \times 80 \times 8 \times 2 \times 2$$

For example, the first type UE may determine a MsgB-RNTI associated a PRACH occasion as follows:

$$MSGB\text{-}RNTI = 1 + \text{s\_id} + \text{s\_1} \times \text{t\_id} + \text{s\_1} \times \text{t\_1} \times \text{f\_id} + \text{s\_1} \times \text{st\_1} \times \text{f\_1} \times \text{ul\_carrier\_id} + 14 \times 80 \times 8 \times 2 \times 2 + \text{s\_1} \times \text{t\_1} \times \text{f\_1} \times 2$$

In an example, first type UEs may only use a first uplink carrier in a cell: e.g., NUL or SUL. For example, the RRC configuration of the cell (e.g., PRACH configuration) may indicate which uplink carriers a first type UE may use. For example, if a first parameter is present in PRACH configuration of the first type UE, the first type UEs may use a respective UL carrier. For example, if a rsrp-ThresholdSSB-SUL for first type UEs is configured and/or configured with a first value, then a first type UE may select SUL if RSRP is below the configured value. For example, a first type UE may determine an RA-RNTI associated a PRACH occasion as follows:

$$RA\text{-}RNTI = 1 + \text{s\_id} + 14\times\text{t\_id} + 14\times 80\times\text{f\_id} + 14\times 80\times 8\times 2\times 2$$

For example, the first type UE may determine a MsgB-RNTI associated a PRACH occasion as follows:

$$MDGB\text{-}RNTI = 1 + \text{s\_id} + 14\times\text{t\_id} + 14\times 80\times\text{f\_id} + 14\times 80\times 8\times 2\times 2 + 14\times 80\times 8$$

In an example, a first type UE may only use a first uplink carrier in a cell for a first type RA procedure. For example, 4-step RACH resources may be configured for first type UEs in the NUL and/or the SUL carriers. For example, 2-step RACH resources may be configured for first type UEs only in the NUL carrier or the SUL carrier. For example, a first type UE may not expect to receive configuration parameters of 2-step PRACH for SUL. For example, a first type UE may determine an RA-RNTI associated a PRACH occasion as follows:

$$RA\text{-}RNTI = 1 + \text{s\_id} + 14\times\text{t\_id} + 14\times 80\times\text{f\_id} + 14\times 80\times 8\times\text{ul\_carrier\_id} + 14\times 80\times 8\times 2\times 2$$

wherein ul_carrier_id may be a UL carrier used for a preamble transmission (e.g., 0 for an NUL carrier, and 1 for an SUL carrier). For example, the first type UE may determine a MsgB-RNTI associated a PRACH occasion as follows:

$$MSGB\text{-}RNTI = 1 + \text{s\_id} + 14\times\text{t\_id} + 14\times 80\times\text{f\_id} + 14\times 80\times 8\times 2\times 2\times 2$$

wherein the RPACH occasion is either associated with NUL or SUL (e.g., based on predefined rule or parameters in RRC configuration).

In an example, if a cell/initial UL BWP is configured with/comprises 2-step RACH resources, then the first type UE may indicate the identity/capability(ies) in the MsgA PUSCH transmission. For example, a separation/differentiation of MsgB-RNTI values may not be needed in that case. For example, the first type UE may determine the MsgB-RNTI based on the formula of legacy UEs.

In an example, a first type UE may always select/use 2-step RACH, e.g., if configured. A separated RA-RNTI may not be defined for first type UEs in that case. For example, the first type UE may use the formula for legacy UEs to determine a RA-RNTI value. A separate MsgB-RNTI formula may be defined for the first type UE. For example, the first type UE may determine a MsgB-RNTI associated a PRACH occasion as follows:

$$MSGB\text{-}RNTI = 1 + \text{s\_id} + 14\times\text{t\_id} + 14\times 80\times\text{f\_id} + 14\times 80\times 8\times\text{ul\_carrier\_id} + 14\times 80\times 8\times 2\times 2$$

In an example, one or more separate/dedicated initial UL BWPs may be configured for first type UEs. A first type UE may be associated with a first initial UL BWP. For example, the first type UE may select a first PRACH occasion in the first initial UL BWP. The first initial UL BWP may have a first index. For example, the RRC configuration of the first initial uplink BWP may indicate the first index. For example, a UE may determine the indexes of initial UL BWPs based on a rule, e.g., based on increasing order of starting PRBs. The first type UE may determine the RA-RNTI/MsgB-RNTI based on a UL BWP index. For example, the first type UE may determine the RA-RNTI/MsgB-RNTI associated with the first PRACH occasion of the first initial UL BWP as follows:

$$RA-RNTI = 1 + \text{s\_id} + 14\times\text{t\_id} + 14\times 80\times\text{f\_id} + 14\times 80\times 8\times\text{ul\_carrier\_id} + 14\times 80\times 8\times 2\times\text{BWP\_id} + 14\times 80\times 8\times 2\times 2$$

$$\begin{aligned} MsgB-RNTI = {} & 1 + \text{s\_id} + 14\times\text{t\_id} + 14\times 80\times\text{f\_id} + 14\times 80\times 8\times\text{ul\_carrier\_id} + 14\times 80\times 8\times 2\times\text{BWP\_id} + \\ & 14\times 80\times 8\times 2\times 2 + 14\times 80\times 8\times 2\times x = \\ & +\text{s\_id} + 14\times\text{t\_id} + 14\times 80\times\text{f\_id} + 14\times 80\times 8\times\text{ul\_carrier\_id} + \\ & 14\times 80\times 8\times 2\times\text{BWP\_id} + 14\times 80\times 8\times 2\times(2+x) \end{aligned}$$

where BWP_id may be an index of an UL BWP (e.g., the first initial UL BWP) of the PRACH occasion (e.g., 0≤BWP_id<x−1). For example, x may be an integer: 2, 3, . . . . For example, x may be a maximum allowed number of UL BWPs/initial UL BWPs configured in a cell at a given time. For example, an allowed range of RA-RNTI/MsgB-RNTI may be increased to accommodate the above values.

In an example, the initial UL BWP index/offset may be integrated with the frequency index (f_id). For example, the first type UE may determine the RA-RNTI/MsgB-RNTI associated with a PRACH occasion of a first initial UL BWP as follows:

$$RA\text{-}RNTI = 1 + \text{s\_id} + 14\times\text{t\_id} + 14\times 80\times(\text{f\_ID} + \text{BWP\_offset\_1}) + 14\times 80\times(8 + \text{BWP\_offset\_1})\times\text{ul\_carrier\_id}$$

$$\begin{aligned} MsgB\text{-}RNTI = {} & 1 + \text{s\_id} + 14\times\text{t\_id} + 14\times 80\times(\text{f\_id} + \text{BWP\_offset\_1} + \text{BWP\_offset\_2}) + \\ & 14\times 80\times(8 + \text{BWP\_offset\_1} + \text{BWP\_offset\_2})\times\text{ul\_carrier\_id} \end{aligned}$$

where BWP_offset_1 and/or BWP_offset_2 may be equal to a predefined numbers (e.g., 4 or 6 or 8, etc.) and/or may be given by one or more RRC parameters. BWP_offset_1 and/or BWP_offset_2 may be determined based on an index of an UL BWP (e.g., the first initial UL BWP) of the PRACH occasion. In an example, the cell may not be configured with 2-step RACH resources for legacy UEs.

In example shown in FIG. 24, only separating/differentiating RA-RNTIs of first type UEs associated with a 4-step RACH may be considered. For example, a same/shared MsgB-RNTI may be defined/considered for first type UEs performing 2-step RACH. For example, UE1 in FIG. 24 (a legacy UE) may transmit a 4-step RACH preamble using a first RO in initial UL BWP-1. UE1 may determine the associated RA-RNTI based on a first formula. For example, UE2 in FIG. 24 (a first type UE) may transmit a 4-step RACH preamble using a second RO in initial UL BWP-2. UE2 may determine the associated RA-RNTI based on a second formula. The second formula may be different from the first formula, e.g., by one or more offsets. For example, UE1 in FIG. 24 (a legacy UE) may transmit a 2-step RACH preamble using a third RO in initial UL BWP-1. UE1 may determine the associated MsgB-RNTI based on a third formula. For example, UE2 in FIG. 24 (a first type UE) may transmit a 2-step RACH preamble using a fourth RO in initial UL BWP-1 or initial UL BWP-2. UE2 may determine the associated MsgB-RNTI based on a fourth formula. The fourth formula may be the same as the third formula.

In an example, a bases station may split/share RACH resources configured in an initial UL BWP among legacy UEs and first type UEs. For example, base station may transmit an RRC message comprising configuration parameters of one or more initial UL BWPs. For example, configuration parameters may indicate time resources and frequency resources of plurality of PRACH occasions in an initial UL BWP. A first type UE may receive the configuration parameters. The first type UE may determine one or more PRACH occasions from the plurality of PRACH occasions, e.g., based on a rule (a first portion of the plurality of PRACH occasions), or based on a RRC parameter/indication. For example, the one or more PRACH occasions may be dedicated to first type UEs, used for differentiating first type UEs. However, a signaling of such partitioning may be complicated, and a flexibility in scheduling dedicated RACH resources for first type UEs may be limited.

In an example, the base station may transmit one or more RRC messages comprising configuration parameters of one or more initial UL BWPs. For example, first configuration parameters may indicate time resources and frequency resources of first PRACH occasions in a first initial UL BWP. For example, second configuration parameters may indicate time resources and frequency resources of second PRACH occasions in a second initial UL BWP. The second PRACH occasions may be for first type UEs. An example, of such PRACH occasions are depicted in FIG. 25. As shown in FIG. 25, the ROs in the initial UL BWP may have same index in time and frequency domains (s_id and t_id and f_id and ul_carrier_id). To avoid a RA-RNTI/MsgB-RNTI collision, separation of RA-RNTI/MsgB-RNTI of first type UEs may be defined/considered based on at least one offset. The at least one offset may be for frequency index (e.g., f_id), and/or for time slot index (t_id) and/or symbol index (s_id) of the RO of first type UEs. The at least one offset may be defined/configured based on the maximum respective values for legacy UEs.

In an example, the base station may transmit one or more RRC messages comprising configuration parameters of one initial UL BWP. For example, first configuration parameters may indicate time resources and frequency resources of first PRACH occasions in the initial UL BWP. For example, second configuration parameters may indicate time resources and frequency resources of second PRACH occasions in the initial UL BWP. The second PRACH occasions may be for first type UEs. In an example, first configuration parameters may comprise the second configuration parameters.

Figure 26:
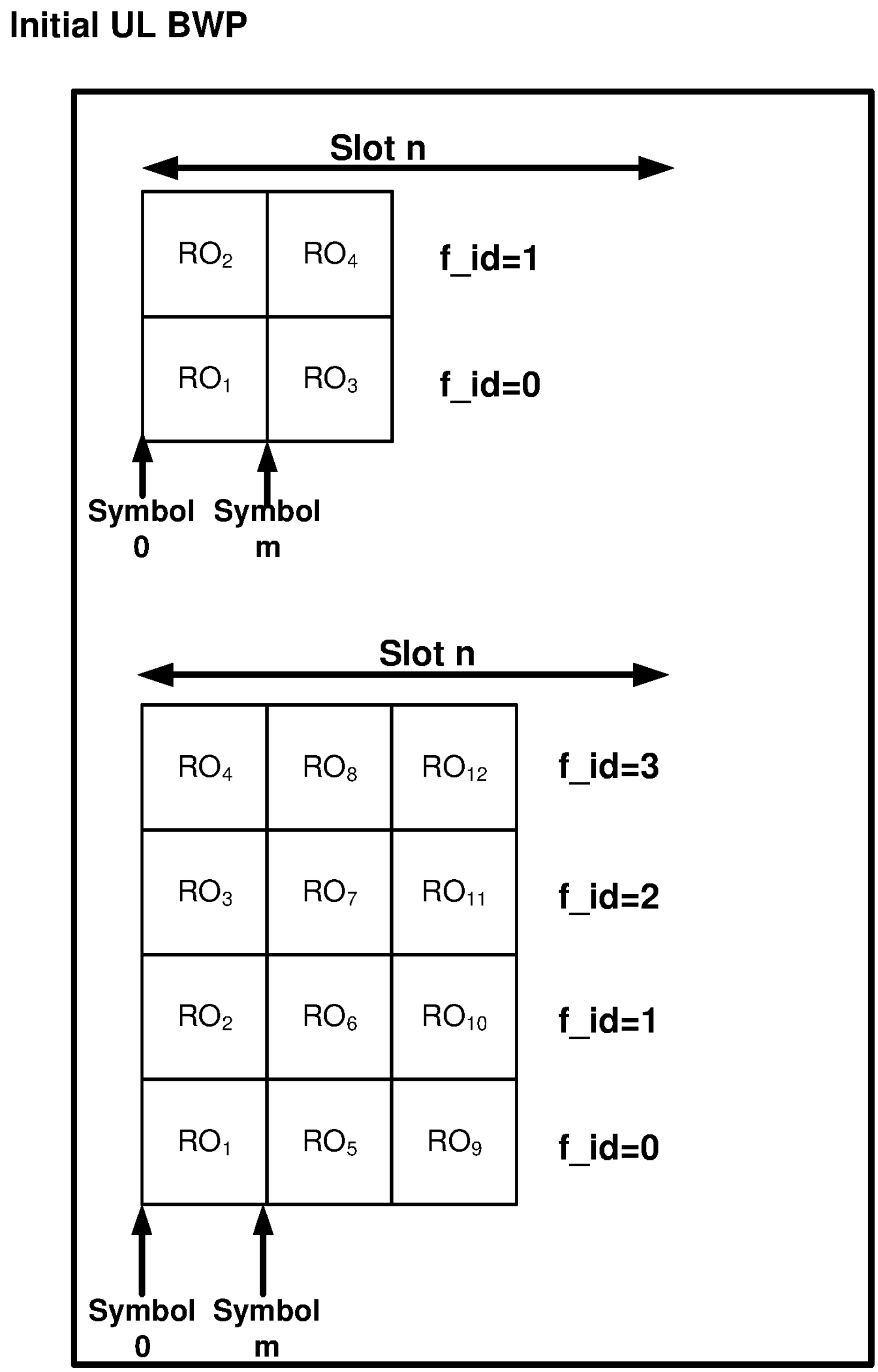
FIG. 26 shows an example of RACH occasions in an initial UL BWP, according to some embodiments.

FIG. 26 shows an example of RACH occasions in an initial UL BWP, according to some embodiments. For example, a UE may receive first configuration parameters indicating first ROs (RO-1 to RO-12: lower ROs) in slot n. For example, a UE may receive second configuration parameters indicating second ROs (RO-1 to RO-4: upper ROs) in slot n. The first configuration parameters may indicate a first frequency start and a first FDM number for the first ROs. The second configuration parameters may indicate a second frequency start and a second FDM number for the second ROs. The first ROs and the second ROs may not overlap. The first ROs may be for legacy UEs. The second ROs may be for first type UEs. A UE may determine indexes, e.g., f_id, of FDMed ROs within a RACH configuration based on increasing order of frequencies, starting from the start frequency of the RACH configuration. A first RO may have a first f_id based on the first configuration parameters, and a second RO may have a second f_id based on the second configuration parameters. The first f_id and the second f_id may be equal. For example, RO1, RO2, RO5, RO6 of the lower block, may respectively have same RA-RNTI/MsgB-RNTI values as RO1, RO2, RO3, RO4 of the upper block. To avoid a RA-RNTI/MsgB-RNTI collision, separation of RA-RNTI/MsgB-RNTI of first type UEs may be defined/considered based on at least one offset. The at least one offset may be for frequency index (e.g., f_id), and/or for time slot index (t_id) and/or symbol index (s_id) of the RO of first type UEs. The at least one offset may be defined/configured based on the maximum respective values for legacy UEs.

A first type UE may receive the configuration parameters. For example, a first RRC message may comprise first configuration parameters of first PRACH occasions (ROs) in a first UL BWP (e.g., a first initial UL BWP). For example, a second RRC message may comprise second configuration parameters of second PRACH occasions (ROs) in a second UL BWP (e.g., a second initial UL BWP). The second RRC message may be the first RRC message. The second initial UL BWP may be the first initial UL BWP. The first configuration parameters may comprise the second configuration parameters. The first type UE may determine RACH occasions in the second initial UL BWP based on the second configuration parameters (e.g., ROs in initial UL BWP-2 in FIG. 25 or ROs in upper part of initial UL BWP in FIG. 26). The first type UE may select a first RO (e.g., RO-3 in FIG. 25 or FIG. 26) for transmitting a preamble. The first type UE may determine indexes of the first RO, e.g., symbol index s_id, slot index in the frame t_id, frequency index f_id, and UL carrier index ul_carrier_id. For example, for RO-3: s_id=m, t_id=n, and f_id=0.

In an example, the first type UE may determine RA-RNTI/MsgB-RNTI of the first RO as follows:

$$RA\text{-}RNTI = 1 + s\_id + s\_1 \times t\_id + s\_1 \times t\_1 \times (f\_id + f\_offset) + s\_1 \times t\_1 \times f\_1 \times ul\_carrier\_id + 14 \times 80 \times 8 \times 2 \times 2$$

Or:

$$RA\text{-}RNTI = 1 + s\_id + s\_1 \times t\_id + s\_1 \times t\_1 \times (f\_id + f\_offset) \bmod f\_1 + s\_1 \times t\_1 \times f\_1 \times ul\_carrier\_id + 14 \times 80 \times 8 \times 2 \times 2$$

For example, s_id may be an index of a first OFDM symbol of the PRACH occasion (e.g., $0 \leq s\_id < s\_1$, where $s\_1 \leq 14$), t_id may be an index of a first slot of the PRACH occasion in a system frame (e.g., 0≤t_id<t_1, where t_1≤80), f_id may be an index of the PRACH occasion in the frequency domain (e.g., 0≤f_id<f_1, where f_1≤8). For example, f_offset may be an integer between zero and a maximum f_id of legacy UEs, e.g., 0≤f_offset≤8. For example, the first type UE may determine a MsgB-RNTI associated a PRACH occasion as follows:

$$MSGB\text{-}RNTI = 1 + s\_id + s\_1 \times t\_id + s\_1 \times t\_1 \times (f\_id + f\_offset) + s\_1 \times t\_1 \times f\_1 \times ul\_carrier\_id + 14 \times 80 \times 8 \times 2 \times 2 + s\_1 \times t\_1 \times f\_2 \times 2$$

Or:

$$MSGB\text{-}RNTI = 1 + s\_id + s\_1 \times t\_id + s\_1 \times t\_1 \times (f\_id + f\_offset) \bmod f\_1 + s\_1 \times t\_1 \times f\_1 \times ul\_carrier\_id + 14 \times 80 \times 8 \times 2 \times 2 + s\_1 \times t\_1 \times f\_2 \times 2$$

In an example, the first type UE may determine RA-RNTI/MsgB-RNTI of the first RO as follows:

$$RA\text{-}RNTI = 1 + s\_id + 14 \times t\_id + 14 \times 80 \times (f\_id + f\_offset) + 14 \times 80 \times 8 \times ul\_carrier\_id$$

Or:

$$RA\text{-}RNTI = 1 + s\_id + 14 \times t\_id + 14 \times 80 \times (f\_id + f\_offset) \bmod 8 + 14 \times 80 \times 8 \times ul\_carrier\_id$$

For example, the first type UE may determine a MsgB-RNTI associated a PRACH occasion as follows:

$$MsgB\text{-}RNTI = 1 + s\_id + 14 \times t\_id + 14 \times 80 \times (f\_id + f\_offset) + 14 \times 80 \times 8 \times ul\_carrier\_id + 14 \times 80 \times 8 \times 2$$

Or:

$$MsgB\text{-}RNTI = 1 + s\_id + 14 \times t\_id + 14 \times 80 \times (f\_id + f\_offset) \bmod 8 + 14 \times 80 \times 8 \times ul\_carrier\_id + 14 \times 80 \times 8 \times 2$$

In an example, f_offset may depend on a maximum value of frequency index for legacy UEs. For example, for first type UEs, f_id may be between zero and a first value. The first value may be a maximum number of FDMed ROs that RRC may configure for first type UEs (e.g., 2 or 4 or 6 or 8, etc.). The first value may be determined based on f_offset, e.g., f_id<8-f_offset. For example, due to a limited bandwidth of a shared BWP, a sum of the first value and the f_offset (e.g., total number of FDMes ROs for legacy and first type UEs) may be limited. The limit may be pre-defined and/or indicated by at least one RRC parameter. For example, f_offset may be 4, if a number of FDMed ROs (e.g., Msg1-FDM) for legacy UEs is selected from a first of numbers equal to or lower than 4, e.g. {1,2,4}. For example, for first type UEs we may have: 0≤f_id<4. For example, f_offset may be 6, if a number of FDMed ROs (e.g., Msg1-FDM) for legacy UEs is selected from a first of numbers equal to or lower than 6, e.g. {1,2,4,6}. For example, for first type UEs we may have: 0≤f_id<2. For example, f_offset may be 8, if a number of FDMed ROs (e.g., Msg1-FDM) for legacy UEs is selected from a first of numbers equal to or lower than 6, e.g. {1,2,4,8}. For example, for first type UEs we may have: 0≤f_id<0, which may imply no RO for first type UEs. As a result, an RNTI space may be divided between legacy UEs and first type UEs.

In an example, a first type UE may determine indexes of ROs in frequency domain based on an offset. For example, the first type UE may receive RRC parameters comprising first RACH configuration indicating first RACH occasions in a first initial UL BWP. The first ROs may be multiplexed in frequency domain (FDMed). For example, the RRC parameters may indicate a first frequency start and a first number of FDMed ROs (e.g., M). In existing technologies, the UE may determine indexes of the FDMed ROs for RA-RNTI/MsgB-RNTI calculation, e.g., f_id∈{0, 1, . . . , M−1}, starting from the first frequency start in increasing order of frequency. The UE may number PRACH frequency resources $n_{ra}$∈ {0, 1, . . . , M−1}, where M is a higher layer parameter (e.g., msg1-FDM or MsgA-RO-FDM), in increasing order within the associated initial UL BWP during initial access, starting from the lowest frequency.

For example, RRC parameters may comprise second RACH configuration indicating second RACH occasions in a second initial UL BWP. For example, the second initial UL BWP may be the first initial UL BWP. The second ROs may be FDMed. For example, the RRC parameters may indicate a second frequency start and a second number of FDMed ROs (e.g., M2). The first ROs may not overlap with second ROs. A UE may determine indexes of the second FDMed ROs for RA-RNTI/MsgB-RNTI calculation, e.g., f_id∈{0, 1, . . . , M2-1}, starting from the second frequency start in increasing order of frequency. Therefore, f_id of two or more ROs, one from the first RACH configuration and another from the second RACH configuration, may be equal, and the respective RA-RNTI/MsgB-RNTI values may collide.

In an example, to avoid RA-RNTI/MsgB-RNTI collision, the first type UE may determine indexes of the FDMed ROs for RA-RNTI/MsgB-RNTI calculation, based on a first offset. For example, the first type UE may determine frequency indexes of ROs starting from the first frequency start in increasing order of frequency, wherein the indexes start from f_offset. For example, f_id∈{$f_{offset}$, $f_{offset}$+1, . . . , $f_{offset}$+M−1}. In an example, a value of f_offset may be predefined. In an example, RRC parameter(s) may indicate the value of f_offset. For example, f_offset may be a maximum value of frequency indexes of second ROs (f_id) associated with second RACH configuration.

FIG. 27 shows an example of indexing frequency resources of RACH occasions, according to some embodiments. As shown in FIG. 27, first RACH configuration may indicate first ROs in initial UL BWP-1. Second RACH configuration may indicate second ROs in initial UL BWP-2. Time indexes (e.g., symbol index s_id and slot index t_id) of one or more ROs in the initial UL BWP-1 and initial UL BWP-2 may be the same. A first UE that receives first RACH configuration, may determine first indexes of frequency resources of first ROs in initial UL BWP-1. First frequency indexes of first ROs may start from 0. A second UE (e.g., a first type UE) that receives second RACH configuration, may determine second indexes of frequency resources of second ROs in initial UL BWP-2 based on an offset. Second frequency indexes of second ROs may start from the offset. A value of the offset in this example is 4. The offset may be equal to a maximum number of FDMed ROs (first ROs)

indicated by the first RACH configuration. As a result, the RA-RNTI/MsgB-RNTI values associated with first ROs and second ROs may not overlap/collide.

Figure 28:
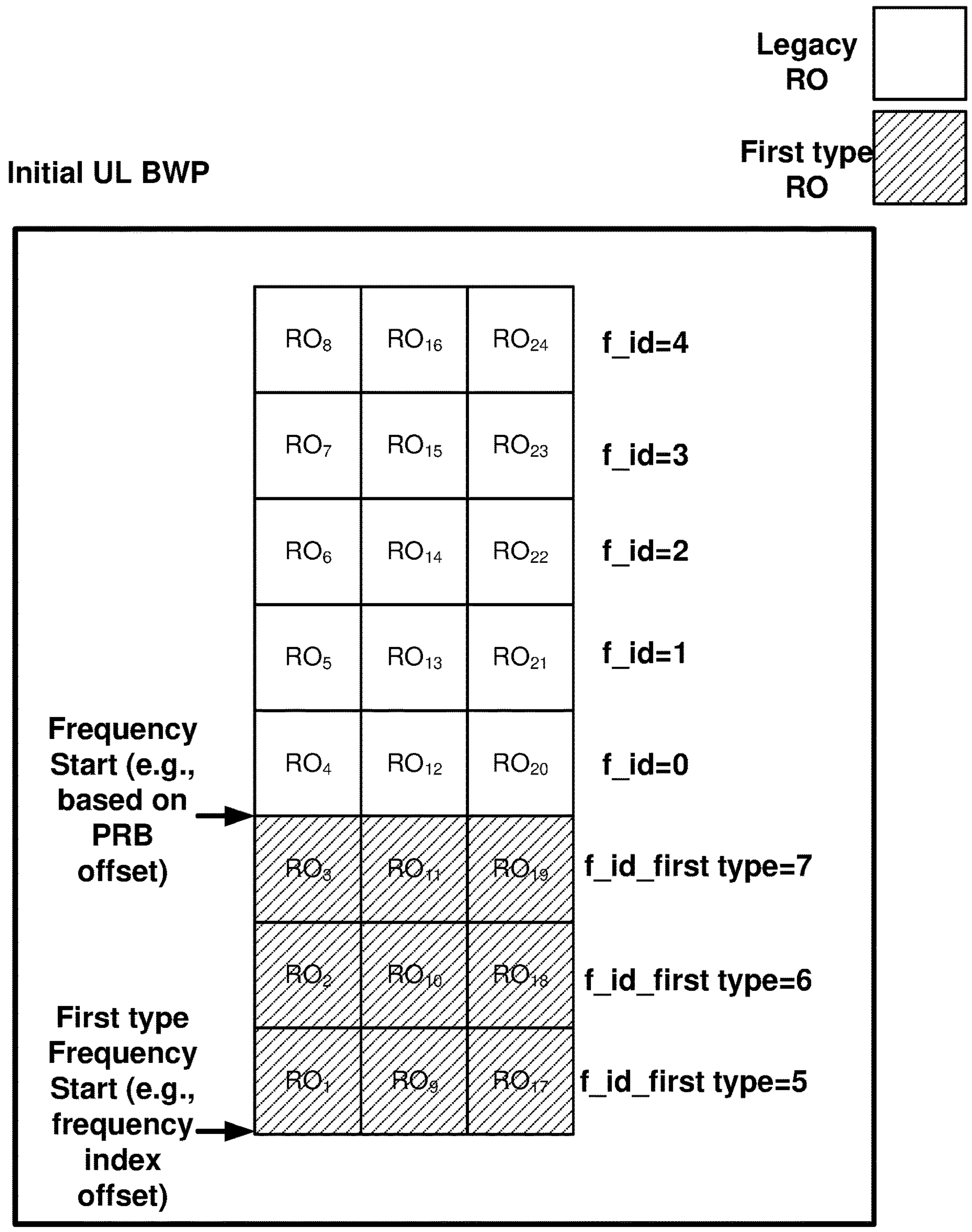
FIG. 28 shows an example of indexing frequency resources of RACH, according to some embodiments.

FIG. 28 shows an example of indexing frequency resources of RACH occasions, according to some embodiments. A single RACH configuration may indicate all ROs in the initial UL BWP (e.g. 24 ROs). For example, a first RACH configuration may indicate legacy ROs (plane ROs in FIG. 28 for legacy UEs). For example, a second RACH configuration may indicate first type ROs (hashed ROs in FIG. 28 for first type UEs). For example, the first RACH configuration may comprise the second RACH configuration. The first RACH configuration may indicate a first frequency start and/or a first number of FDMed ROs (e.g., 5) for legacy ROs. The second RACH configuration may indicate a second frequency start and/or a second number of FDMed ROs (e.g., 3) for first type ROs. In an example, a single RACH configuration may indicate a frequency start (the lowest frequency) and a number of FDMed ROs (e.g., 8 in FIG. 28), for all ROs in the initial UL BPW. A UE may determine which ROs are for legacy UEs and/or which ROs are for first type UEs, for example, based on a rule and/or RRC indication. For example, in FIG. 28, first/lowest M frequency resources in each column (FDMed ROs) may be for the first type UEs, and the rest for legacy UEs (M=3). In another example, last/highest M frequency resources in each column (FDMed ROs) may be for the first type UEs, and the rest for legacy UEs. A legacy UE may index/determine indexes of frequency resources of the first ROs allocated to legacy UEs in increasing frequency starting from 0. A first type UE may index/determine indexes of frequency resources of the second ROs allocated to first type UEs in increasing frequency starting from an offset. The first type UE may determine the offset based on a rule and/or RRC parameter. In FIG. 28, offset is 5 (e.g., Msg1−FDM=8 and M=3, and offset=8−3=5).

In an example, the base station may partition ROs in an initial UL BWP between legacy UEs and first type UEs in time domain. The ROs may be indicated by first RACH configuration parameters and/or second RACH configuration parameters. In an example, the second RACH configuration parameters may be the first RACH configuration parameters. For example, at least one slot of one or more slots in a frame comprising ROs may be allocated to first type UEs. For example, at least one RO of one or more ROs in a PRACH slot may be allocated to first type UEs. The allocation of ROs to first type UEs may be predefined and or based on RRC indication/parameter (e.g. a rule: first m slot/RO, and/or every m other slots/ROs). In an example, base station may separately configure first ROs in a frame/slot for legacy UEs and second ROs in a frame/slot for first type UEs, via separate parameters. The first ROs and the second ROs may not overlap and/or may not have same slot index within a frame and/or same starting symbol index within a slot.

The RA-RNTI/MsgB-RNTI associated with first ROs and second ROs may not overlap/collide, due to partitioning of time domain indexes of the first ROs and second ROs. For example, a first type UE may determine RA-RNTI/MsgB-RNTI of the first RO as follows:

$$RA\text{-}RNTI = 1 + (s\_id + s\_offset) + s\_1 \times t\_id + s\_1 \times t\_1 \times f\_id + s\_1 \times t\_1 \times f\_1 \times ul\_carrier\_id + 14 \times 80 \times 8 \times 2 \times 2$$

-continued

Or:

$$RA\text{-}RNTI = 1 + (s\_id + s\_offset) \bmod s\_1 + s\_1 \times t\_id + s\_1 \times t\_1 \times f\_id + s\_1 \times t\_1 \times f\_1 \times ul\_carrier\_id + 14 \times 80 \times 8 \times 2 \times 2$$

For example, s_id may be an index of a first OFDM symbol of the PRACH occasion (e.g., 0≤s_id<s_1, where s_1≤14), t_id may be an index of a first slot of the PRACH occasion in a system frame (e.g., 0≤t_id<t_1, where t_1≤80), f_id may be an index of the PRACH occasion in the frequency domain (e.g., 0≤f_id<f_1, where f_1≤8). For example, s_offset may be an integer between zero and a maximum s_id of legacy UEs, e.g., 0≤s_offset≤14. For example, the first type UE may determine a MsgB-RNTI associated a PRACH occasion as follows:

$$MSGB\text{-}RNTI = 1 + (s\_id + s\_offset) + s\_1 \times t\_id + s\_1 \times t\_1 \times f\_id + s\_1 \times t\_1 \times f\_1 \times ul\_carrier\_id + 14 \times 80 \times 8 \times 2 \times 2 + s\_1 \times t\_1 \times f\_1 \times 2$$

Or:

$$MSGB\text{-}RNTI = 1 + (s\_id + s\_offset) \bmod s\_1 + s\_1 \times t\_id + s\_1 \times t\_1 \times f\_id + s\_1 \times t\_1 \times f\_1 \times ul\_carrier\_id + 14 \times 80 \times 8 \times 2 \times 2 + s\_1 \times t\_1 \times f\_1 \times 2$$

In an example, a first type UE may determine RA-RNTI/MsgB-RNTI of the first RO as follows:

$$RA\text{-}RNTI = 1 + s\_id + s\_1 \times (t\_id + t\_offset) + s\_1 \times t\_1 \times f\_id + s\_1 \times t\_1 \times f\_1 \times ul\_carrier\_id + 14 \times 80 \times 8 \times 2 \times 2$$

Or:

$$RA\text{-}RNTI = 1 + s\_id + s\_1 \times (t\_id + t\_offset) \bmod t\_1 + s\_1 \times t\_1 \times f\_id + s\_1 \times t\_1 \times f\_1 \times ul\_carrier\_id + 14 \times 80 \times 8 \times 2 \times 2$$

For example, s_id may be an index of a first OFDM symbol of the PRACH occasion (e.g., 0≤s_id<s_1, where s_1≤14), t_id may be an index of a first slot of the PRACH occasion in a system frame (e.g., 0≤t_id<t_1, where t_1≤80), f_id may be an index of the PRACH occasion in the frequency domain (e.g., 0≤f_id<f_1, where f_1≤8). For example, t_offset may be an integer between zero and a maximum t_id of legacy UEs, e.g., 0≤t_offset≤80.

For example, the first type UE may determine a MsgB-RNTI associated a PRACH occasion as follows:

$$MSGB\text{-}RNTI = 1 + s\_id + s\_1 \times (t\_id + t\_offset) + s\_1 \times t\_1 \times f\_id + s\_1 \times t\_1 \times f\_1 \times ul\_carrier\_id + 14 \times 80 \times 8 \times 2 \times 2 + s\_1 \times t\_1 \times f\_1 \times 2$$

Or:

$$MSGB\text{-}RNTI = 1 + s\_id + s\_1 \times (t\_id + t\_offset) \bmod t\_1 + s\_1 \times t\_1 \times f\_id + s\_1 \times t\_1 \times f\_1 \times ul\_carrier\_id + 14 \times 80 \times 8 \times 2 \times 2 + s\_1 \times t\_1 \times f\_1 \times 2$$

A wireless device may receive one or more radio resource control (RRC) messages comprising configuration parameters indicating one or more RACH occasions (ROs). The one or more ROs may be multiplexed in frequency domain (FDMed). The configuration parameters may indicate a start frequency for the one or more ROs, and a number of the one or more ROs to be FDMed. The configuration parameters may indicate a frequency index offset. The wireless device may select a first RO from the one or more ROs. The first RO may be associated with a first RNTI (e.g., RA-RNTI and/or MsgB-RNTI). The wireless device may determine/calculate/compute the first RNTI based on an index of a frequency resource of the first RO and a frequency index offset. The frequency index offset may be predefined. The configuration parameters may indicate the frequency index offset. The wireless device may transmit a preamble using the first RO. The wireless device may monitor one or more PDCCH monitoring occasions identified by the first RNTI for receiving DCI. The DCI may comprise a random access response to the preamble transmission.

The RRC messages may comprise one or more SIB. The wireless device may be associated with a first type among a plurality of types of wireless devices. The first type of wireless device may be associated with one or more reduced/limited capabilities, e.g., reduced/limited supported bandwidth; reduced/limited number of antennas; relaxed processing time; and relaxed processing capability comprising a maximum modulation order; a maximum number of multiple input-multiple output layers; a maximum transport block size; and/or a maximum number of hybrid automatic repeat request processes. The first type of wireless device may be associated with an enhanced feature, supporting coverage enhancement techniques. The wireless device of the first type may operate in a first frequency range and support less than or equal to 20 MHz bandwidth. The wireless device, of the first type, may operate in a second frequency range and support less than or equal to 100 MHz bandwidth. In some embodiments, the other type(s) of wireless devices (i.e., not the first type) may have fully-supported capabilities (e.g., fully supporting NR or 5G). For example, compared to the first type (e.g., RedCap UEs), the other types may have larger supported bandwidth, a greater number of antennas, more strict processing time requirements, etc.

In some embodiments, the plurality of types of wireless devices include use case types. For example, a use case may refer to one of the followings or a variation/combination thereof: eMBB, URLLC, mMTC/eMTC, NR-Light/lite, NB-IoT, RedCap, or Enhanced Coverage UE.

The wireless device may index/determine indexes of frequency resources of the one or more ROs in increasing order, starting from a start frequency indicated by the RRC messages. The wireless device may determine/compute the RNTI associated with the first RO based on a formula comprising: a first index of a first symbol of the first RO; a second index of a first slot of the first RO in a system frame; the index of the frequency resource of the first RO; and the frequency index offset. The formula may comprise the index of the frequency resource of the first RO plus the frequency index offset. The RNTI may be a RA-RNTI and/or a MsgB-RNTI.

The configuration parameters of the RACH may indicate a first initial uplink bandwidth part (BWP) dedicated to wireless devices of the first type. A bandwidth of the first initial uplink BWP may be less than or equal to a supported bandwidth of the first type of wireless devices. The one or more RRC messages may further comprise second configuration parameters of a second RACH in a second initial uplink BWP. A bandwidth of the second initial uplink BWP may be greater than a supported bandwidth of the first type of wireless devices. The one or more RRC messages may further comprise second configuration parameters of a second RACH in a same initial uplink BWP as the RACH.

A wireless device may receive one or more radio resource control (RRC) messages comprising configuration parameters of a random access channel (RACH) indicating a start frequency and a first number of one or more RACH occasions (ROs) multiplexed in frequency domain; and a frequency index offset. The wireless device may determine indexes of frequency resources of the one or more ROs in increasing order, starting from the start frequency, and based on the frequency index offset. The wireless device may select a first RO from the one or more ROs, wherein a radio network temporary identifier (RNTI) associated with the first RO is computed based on an index of a frequency resource of the first RO. The wireless device may transmit a preamble using the first RO. The wireless device may monitor one or more PDCCH monitoring occasions identified by the first RNTI for receiving DCI. The DCI may comprise a random access response to the preamble transmission.

Figure 29:
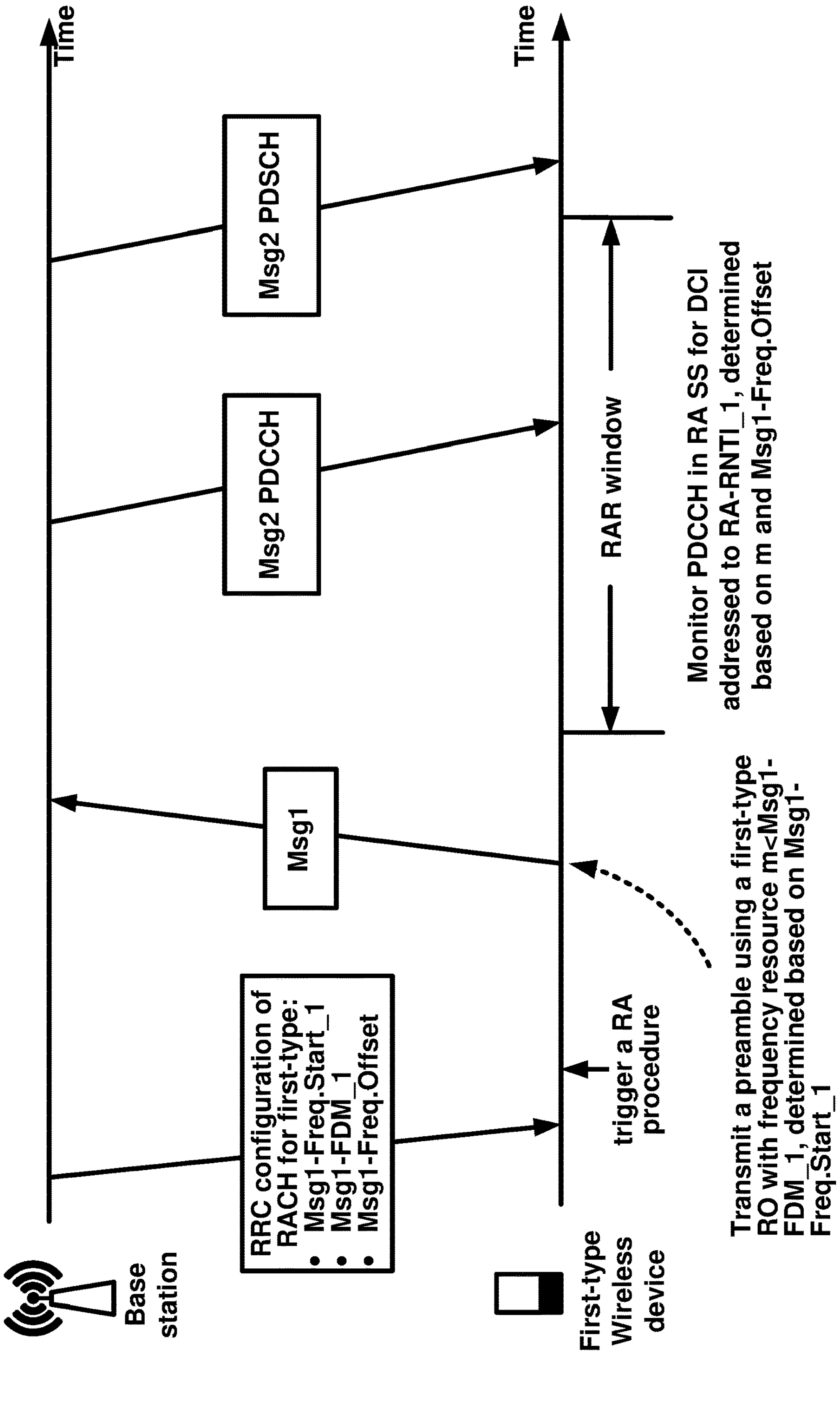
FIG. 29 shows an example of a random access procedure for a first type UE, according to some embodiments.

FIG. 29 shows an example of random access procedure for a first type UE, according to some embodiments. The first type UE may receive RRC configuration parameters of RACH for first type UEs. RRC configuration parameters may indicate a first start frequency (e.g., Msg1-Freq.Start_1); and/or a number of FDM ROs (e.g., Msg1-FDM_1); and/or a frequency index offset (e.g., Msg1-Freq.Offset). The first type UE may trigger a random access procedure. The first type UE may transmit a preamble using a first RO with frequency resource m<Msg1-FDM_1, determined based on Msg1-Freq.Start_1. The first type UE may monitor PDCCH in RA SS, during a RAR window, for a DCI addressed to RA-RNTI_1. The first type UE may determine RA-RNTI_1 based on m and Msg1-Freq.Offset. The DCI may be specific to first type UEs, scheduling a Msg2 PDSCH for first type UEs. The first type UE may receive the DCI and/or the Msg2 PDSCH based on the DCI.

Figure 30:
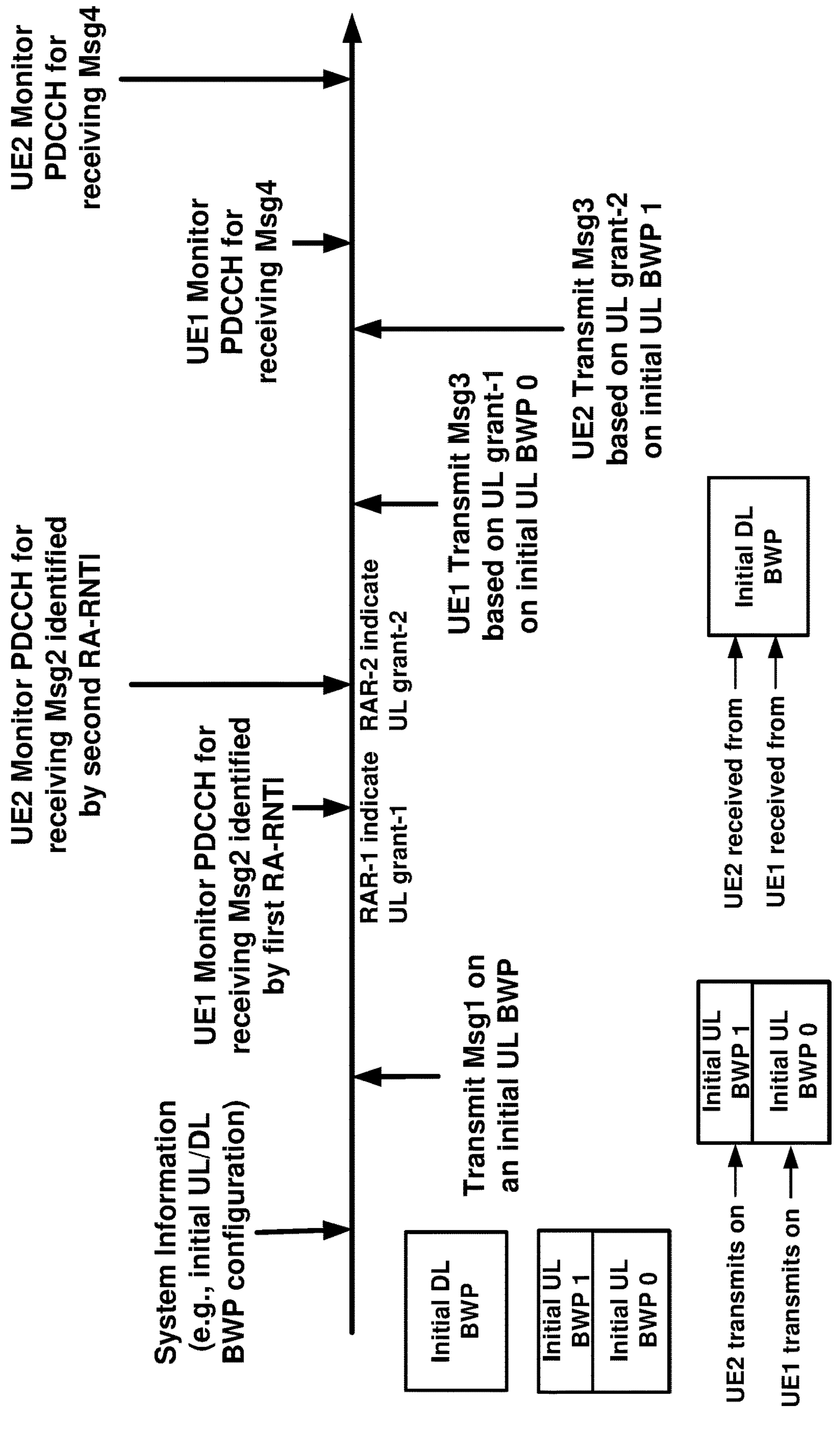
FIG. 30 shows an example of a 4-step random access procedure for a legacy UE and a first type UE with first capabilities, according to some embodiments

FIG. 30 shows an example of 4-step random access procedure for a second type (e.g., legacy) UE and a first type UE with first capabilities, according to some embodiments. The legacy UE (UE1) and the first type UE (UE2) may receive the system information block(s) from the base station, comprising configuration parameters of initial UL BWP(s) and initial DL BWP(s). For example, the configuration parameters may indicate an initial DL BWP and two initial UL BWPs. UE1 and UE2 may trigger random access. UE1 may transmit a preamble using a first RO in initial UL BWP-0. UE2 may transmit a preamble using a second RO in initial UL BWP-1. UE1 may monitor a first PDCCH for receiving Msg2 identified by a first RA-RNTI at time n1. UE2 may monitor a second PDCCH for receiving Msg2 identified by a second RA-RNTI at time n2. The first PDCCH may be the same as the second PDCCH. N1 and n2 may be the same. The first PDCCH and the second PDCCH may be on the initial DL BWP. Base station may transmit separate DCIs addressed to separate RNTIs, wherein the second RA-RNTI may be calculated/determined based on one or more embodiments of the present disclosure. As a result, a separate signaling and handling of the two random access procedure is enabled for legacy and first type UEs, as shown in FIG. 30.

Figure 31:
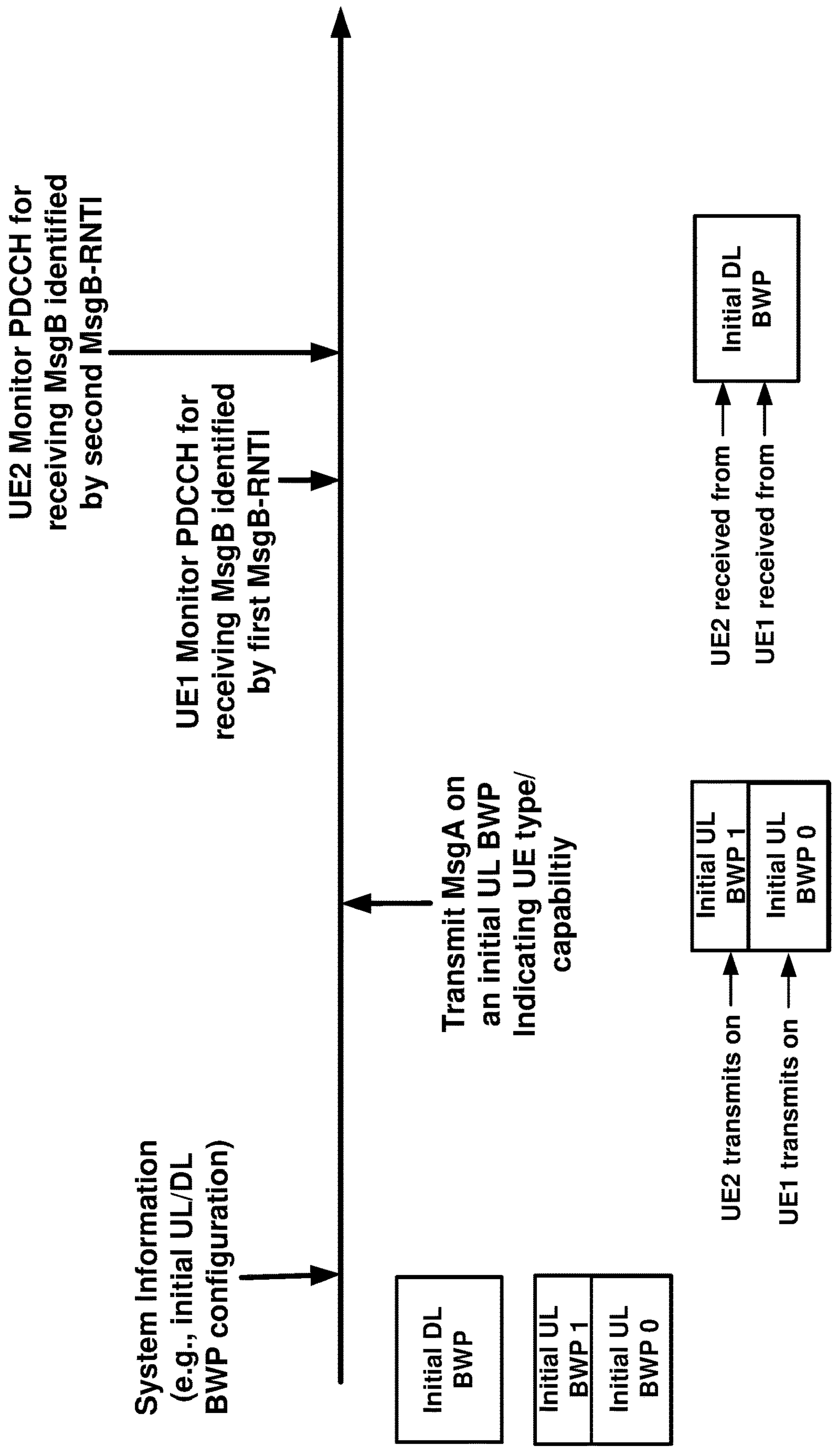
FIG. 31 shows an example of a 2-step random access procedure for a legacy UE and a first type UE with first capabilities, according to some embodiments.

FIG. 31 shows an example of 2-step random access procedure for a second type (e.g., legacy) UE and a first type UE with first capabilities. The legacy UE (UE1) and the first type UE (UE2) may receive the system information block(s)

from the base station, comprising configuration parameters of initial UL BWP(s) and initial DL BWP(s). For example, the configuration parameters may indicate an initial DL BWP and two initial UL BWPs. UE1 and UE2 may trigger random access. UE1 may transmit a preamble and/or PUSCH using a first RO and PO in initial UL BWP-0. UE2 may transmit a preamble and/or PUSCH using a second RO and PO in initial UL BWP-1. UE1 may monitor a first PDCCH for receiving MsgB identified by a first MsgB-RNTI at time n1. UE2 may monitor a second PDCCH for receiving MsgB identified by a second MsgB-RNTI at time n2. The first PDCCH may be the same as the second PDCCH. N1 and n2 may be the same. The first PDCCH and the second PDCCH may be on the initial DL BWP. Base station may transmit separate DCIs addressed to separate RNTIs, wherein the second MsgB-RNTI may be calculated/determined based on one or more embodiments of the present disclosure. As a result, a separate signaling and handling of the two random access procedure is enabled for legacy and first type UEs, as shown in FIG. 31.

What is claimed is:

1. A method comprising:

receiving, by a wireless device, random access configuration parameters of a bandwidth part (BWP) of a cell, indicating:

one or more first random access channel occasions (ROs);

a physical resource block (PRB) offset, with respect to a PRB of the BWP, indicating a first RO of the one or more first ROs; and a frequency resource index offset for the one or more first ROs;

determining frequency resource indexes of the one or more first ROs, in an increasing order starting from the first RO, wherein a first frequency resource index of the first RO is based on the frequency resource index offset;

transmitting a preamble via the first RO; and receiving a response to the preamble, based on a random access identifier determined based on the first frequency resource index.

2. The method of claim 1, wherein the one or more first ROs are frequency multiplexed in one time instance.

3. The method of claim 1, wherein the first RO comprises a lowest frequency resource, indicated by the PRB offset, among the one or more first ROs.

4. The method of claim 1, wherein the first frequency resource index of the first RO is equal to the frequency resource index offset.

5. The method of claim 1, wherein the frequency resource index offset is a predefined value greater than zero.

6. The method of claim 1, further comprising determining the frequency resource index offset based on one or more parameters of the random access configuration parameters.

7. The method of claim 1, further comprising determining the frequency resource index offset based on a quantity of one or more second ROs, indicated by second random access configuration parameters of the BWP.

8. The method of claim 7, wherein the frequency resource index offset is equal to the quantity of the one or more second ROs plus one and wherein the one or more second ROs are frequency multiplexed in one time instance.

9. A wireless device comprising:

one or more processors; and memory storing instructions that, when executed by the one or more processors, cause the wireless device to:

receive random access configuration parameters of a bandwidth part (BWP) of a cell, indicating:

one or more first random access channel occasions (ROs);

a physical resource block (PRB) offset, with respect to a PRB of the BWP, indicating a first RO of the one or more first ROs; and a frequency resource index offset for the one or more first ROs;

determine frequency resource indexes of the one or more first ROs, in an increasing order starting from the first RO, wherein a first frequency resource index of the first RO is based on the frequency resource index offset;

transmit a preamble via the first RO; and receive a response to the preamble, based on a random access identifier determined based on the first frequency resource index.

10. The wireless device of claim 9, wherein the one or more first ROs are frequency multiplexed in one time instance.

11. The wireless device of claim 9, wherein the first RO comprises a lowest frequency resource, indicated by the PRB offset, among the one or more first ROs.

12. The wireless device of claim 9, wherein the first frequency resource index of the first RO is equal to the frequency resource index offset.

13. The wireless device of claim 9, wherein the frequency resource index offset is a predefined value greater than zero.

14. The wireless device of claim 9, further comprising determining the frequency resource index offset based on one or more parameters of the random access configuration parameters.

15. The wireless device of claim 9, further comprising determining the frequency resource index offset based on a quantity of one or more second ROs, indicated by second random access configuration parameters of the BWP.

16. The wireless device of claim 15, wherein the frequency resource index offset is equal to the quantity of the one or more second ROs plus one and wherein the one or more second ROs are frequency multiplexed in one time instance.

17. A non-transitory computer-readable medium comprising instructions that, when executed by one or more processors of a wireless device, cause the wireless device to:

receive random access configuration parameters of a bandwidth part (BWP) of a cell, indicating:

one or more first random access channel occasions (ROs);

a physical resource block (PRB) offset, with respect to a PRB of the BWP, indicating a first RO of the one or more first ROs; and a frequency resource index offset for the one or more first ROs;

determine frequency resource indexes of the one or more first ROs, in an increasing order starting from the first RO, wherein a first frequency resource index of the first RO is based on the frequency resource index offset;

transmit a preamble via the first RO; and receive a response to the preamble, based on a random access identifier determined based on the first frequency resource index.

18. The non-transitory computer-readable medium of claim 17, wherein:

the frequency resource index offset applied to the first RO is a predefined value associated with the wireless device;

the random access configuration parameters are received in one or more radio resource control messages comprising a parameter indicating the frequency resource index offset applied to the first RO; and the frequency resource index offset is determined based on one or more parameters of the random access configuration parameters.

* * * * *